United States Patent [19]

Tamaki et al.

[11] Patent Number: 4,835,716

[45] Date of Patent: May 30, 1989

[54] COMPACT MEASURING APPARATUS CAPABLE OF MEASURING TWO DIFFERENT DATA WITH A SINGLE PRESSURE SENSOR

[75] Inventors: Nobuo Tamaki, Saitama; Masayoshi Okuyama, Tokyo; Yasushi Ida, Tokyo; Toru Yamada, Tokyo, all of Japan

[73] Assignee: Casio Computer Co., Ltd., Tokyo, Japan

[21] Appl. No.: 10,162

[22] Filed: Feb. 2, 1987

[30] Foreign Application Priority Data

Feb. 5, 1986 [JP] Japan .............................. 61-14440[U]
Feb. 10, 1986 [JP] Japan .................................. 61-27208

[51] Int. Cl.⁴ .......................... G01L 7/12; G06F 15/42
[52] U.S. Cl. ........................................ 364/558; 368/14; 368/327; 33/366; 73/300
[58] Field of Search ....................... 364/556, 558, 561; 340/612, 614, 626; 73/37, 37.5, 37.6, 290 R, 299, 300, 301, 426, 427; 33/365, 366, 370; 368/10, 14, 20, 225, 327

[56] References Cited

U.S. PATENT DOCUMENTS

| | | | |
|---|---|---|---|
| 3,837,224 | 9/1974 | Ream, Jr. ............................ | 364/558 |
| 3,857,283 | 12/1974 | Jennings et al. ..................... | 73/300 |
| 3,958,459 | 5/1976 | Shimomura ......................... | 73/384 |
| 4,005,282 | 1/1977 | Jennings ............................. | 364/558 |
| 4,352,168 | 9/1982 | Anderson ............................ | 73/300 |
| 4,586,136 | 4/1986 | Lewis ................................. | 364/558 |
| 4,694,694 | 9/1987 | Vlakancic et al. ................... | 368/14 |

FOREIGN PATENT DOCUMENTS 59-162477 9/1984 Japan .................................. 368/14

Primary Examiner—Felix D. Gruber
Assistant Examiner—Brian M. Mattson
Attorney, Agent, or Firm—Frishauf, Holtz, Goodman & Woodward

[57] ABSTRACT

Only one pressure sensor is employed in a compact measuring apparatus for measuring both depths of water and altitude. A pressure-data generator generates pressure data corresponding to a pressure applied to the single pressure sensor. A water-depth data converter converts this pressure data into water-depth data. An altitude-data converter converts this pressure data into altitude data. The water-depth data and the altitude data are visually displayed on the compact measuring apparatus.

34 Claims, 47 Drawing Sheets

| P | | P0 | |
|---|---|---|---|
| P1 | | AL | |
| P2 | | TM | |
| X | | M | FP |
| N | A | B | C |

| | |
|---|---|
| P | P₀ |
| $P_H$ | $P_W$ |
| $P'_H$ | $P'_W$ |
| $H_{MAX}$ | $W_{MAX}$ |
| $H_{MIN}$ | $W_{MIN}$ |
| AL | TM |
| FP | M | N | A |
| B | | | |

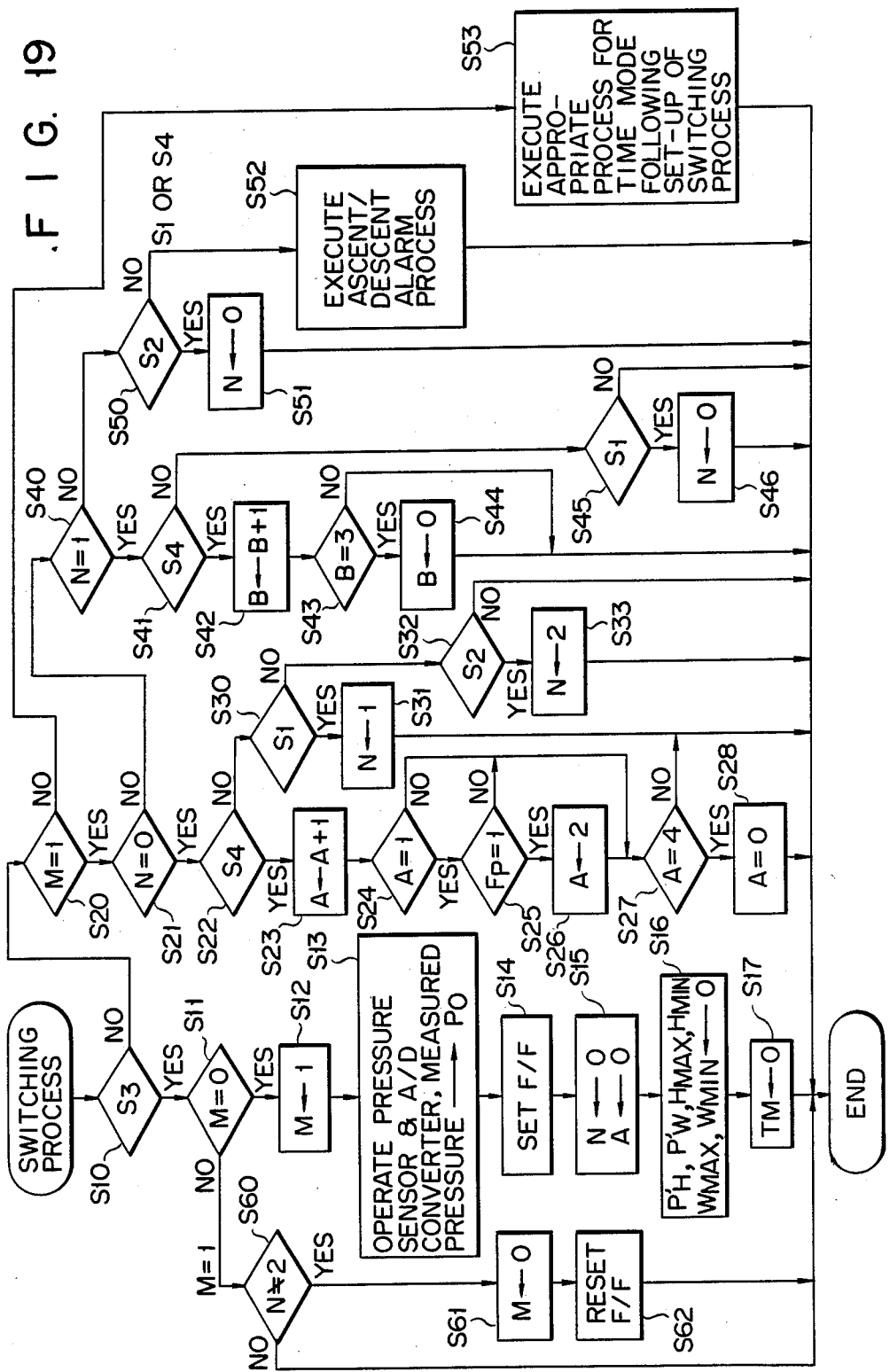

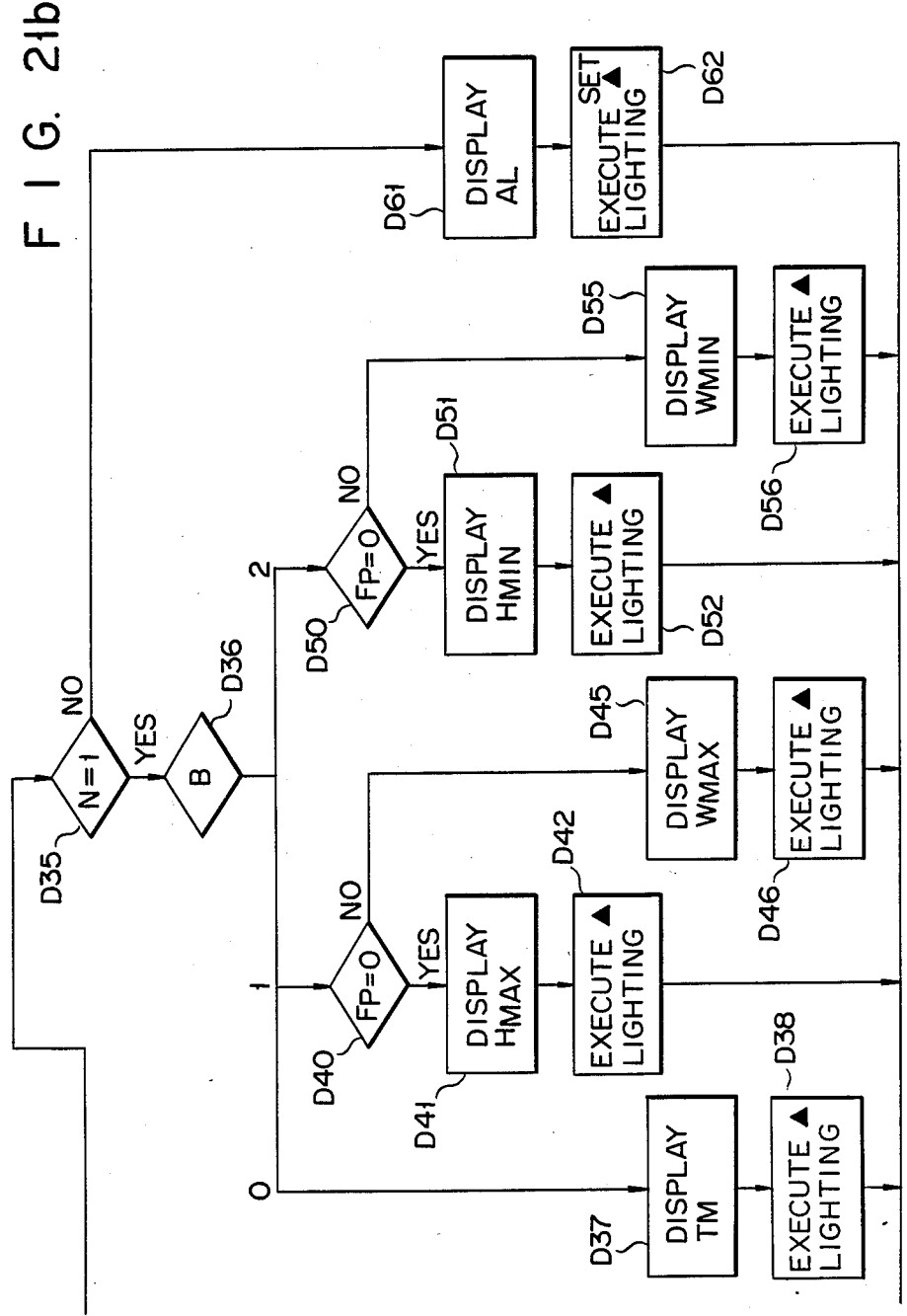

F I G. 25
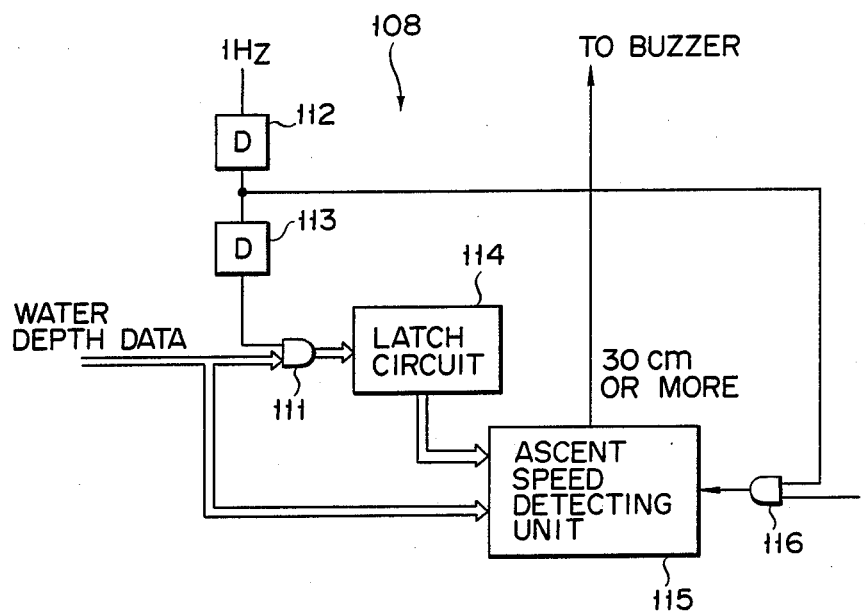
F I G. 26
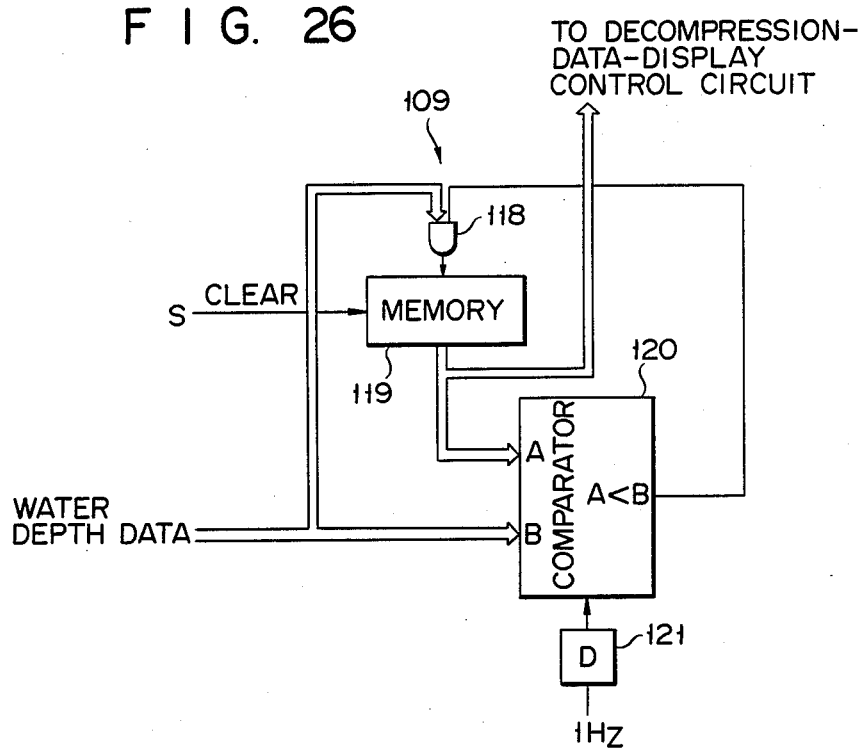

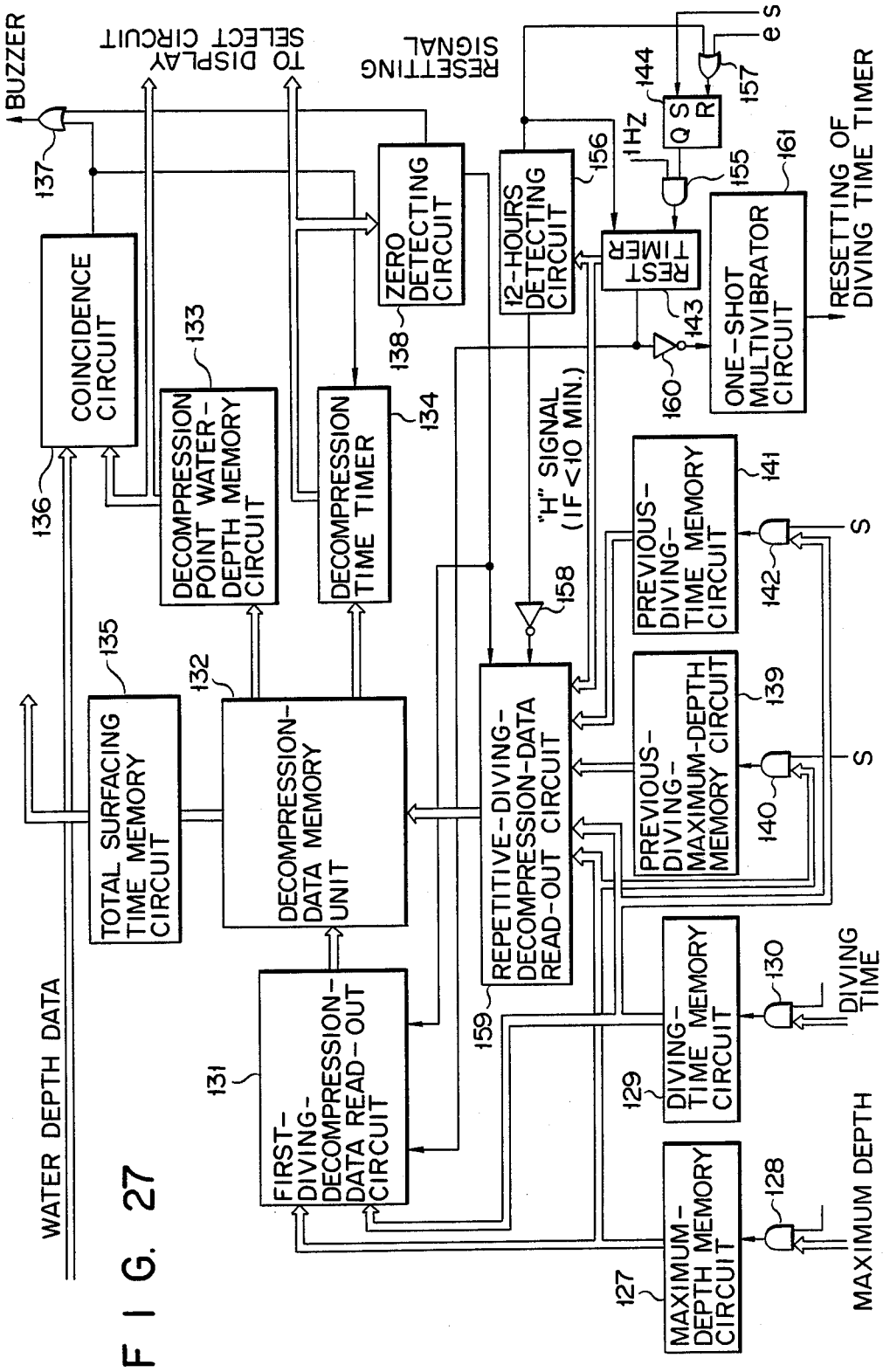
F I G. 27

TABLE FOR NO-COMPRESSION LIMIT DATA

| WATER DEPTH (m) | NO-COMPRESSION LIMIT TIME (min.) | WATER DEPTH (m) | NO-COMPRESSION LIMIT TIME (min.) |
|---|---|---|---|
| 12 | 200 | 36 | 15 |
| 15 | 100 | 39 | 10 |
| 18 | 60 | 42 | 10 |
| 21 | 50 | 45 | 5 |
| 24 | 40 | 48 | 5 |
| 27 | 30 | 51 | 5 |
| 30 | 25 | 54 | 5 |
| 33 | 20 | 57 | 5 |

DECOMPRESSION TABLE

| 12 m |
| 15 m |
| |
| 57 m |

FIG. 30b

DECOMPRESSION TABLE

| WATER DEPTH (m) | DIVING TIME (min.) | DECOMPRESSION STOP WATER-DEPTH (m) | | | TOTAL SURFACING TIME (min.:sec.) | REPETITION SYMBOL |
|---|---|---|---|---|---|---|
| | | ----- | 9 | 6 | 3 | | |
| 27 | 30 | | | | 0 | 1:30 | (X) |
| | 40 | | | | 7 | 8:30 | J |
| | 50 | | | | 18 | 19:30 | L |
| | 60 | | | | 25 | 26:30 | M |
| | 70 | | | 7 | 30 | 38:30 | N |
| | 80 | | | 13 | 40 | 54:30 | N |
| | 90 | | | 18 | 48 | 67:30 | O |
| | 100 | | | 21 | 54 | 76:30 | Z |
| | 110 | | | 26 | 61 | 86:30 | Z |
| | 120 | | | 32 | 68 | 101:30 | Z |
| | 130 | | 5 | 36 | 74 | 116:30 | Z |
| 30 | 25 | | | | 0 | 1:40 | (X) |
| | 30 | | | | 3 | 4:40 | I |
| | 40 | | | | 15 | 16:40 | K |
| | 50 | | | 2 | 24 | 27:40 | L |
| | 60 | | | 9 | 28 | 38:40 | N |
| | 70 | | | 17 | 39 | 57:40 | O |
| | 80 | | | 23 | 48 | 72:40 | O |
| | 90 | | 3 | 23 | 57 | 87:40 | Z |
| | 100 | | 7 | 23 | 66 | 97:40 | Z |
| | 110 | | 10 | 34 | 72 | 117:40 | Z |
| | 120 | | 12 | 41 | 78 | 132:40 | Z |

TABLE FOR CONVERTING GROUP SYMBOL

| A | B | C | D | E | F | G | H | I | J | K | L | M | N | O | Z |
|---|---|---|---|---|---|---|---|---|---|---|---|---|---|---|---|
| 12:00 | 9:44 | 9:43 | 6:33 | 6:32 | 5:04 | 5:03 | 4:05 | 4:04 | 3:23 | 3:22 | 2:48 | 2:47 | 2:19 | 2:18 | 1:54 |
| 1:53 | 1:31 | 1:30 | 1:12 | 1:11 | 0:55 | 0:54 | 0:40 | 0:39 | 0:25 | 0:24 | 0:10 | | | | |

| REPETITION SYMBOL AFTER CORRECTION | REPETITIVE DIVING DEPTH (m) | |
|---|---|---|
| A | 87 | 12 |
| B | 66 | 15 |
| C | 52 | 18 |
| D | 43 | 21 |
| E | 38 | 24 |
| F | 22 | 27 |
| G | 30 | 30 |
| H | 27 | 33 |
| I | 25 | 36 |
| J | 22 | 39 |
| K | 20 | 42 |
| L | 19 | 45 |
| M | 18 | 48 |
| N | 17 | 51 |
| O | 16 | 54 |
| Z | 15 | 57 |

| P_O | P | | |
|---|---|---|---|
| H | W | | |
| TM | AH | | |
| AT | ALT | | |
| PS | TM' | | |
| F_TM' | I | M | N |
| A | B | F_P | |

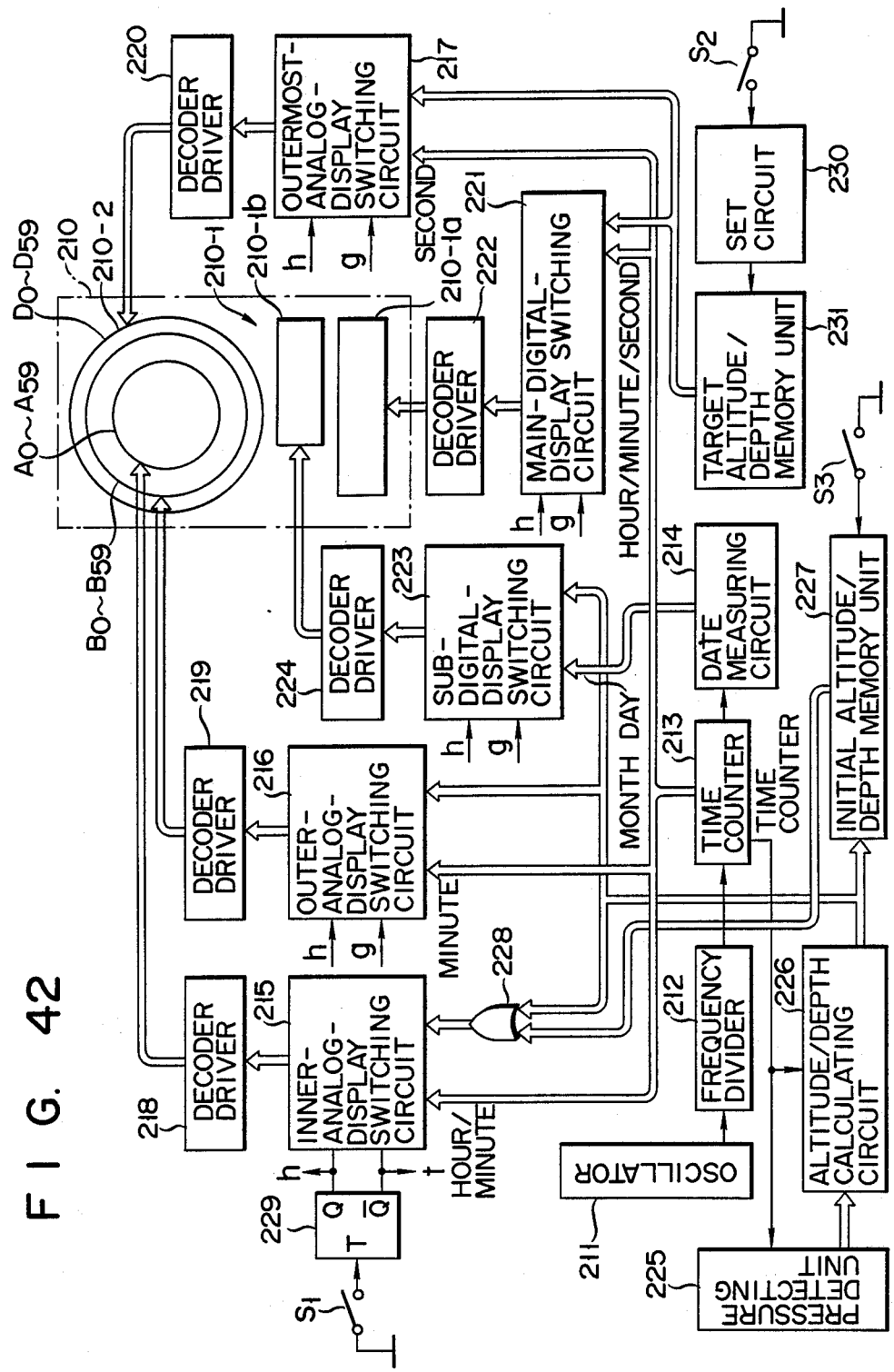
F I G. 42

F I G. 43
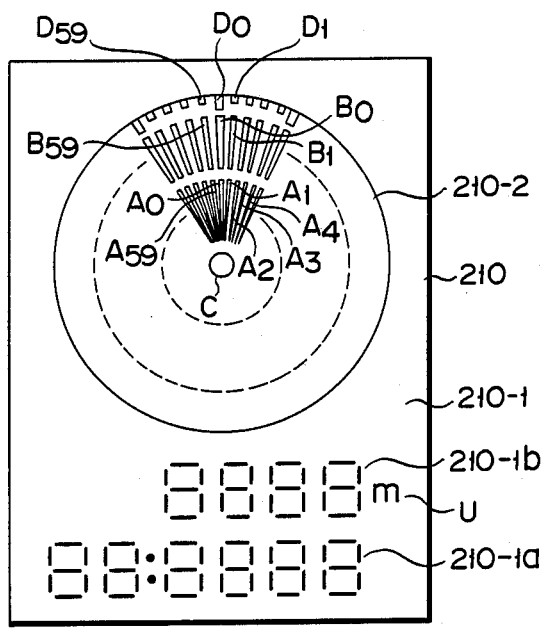
F I G. 44
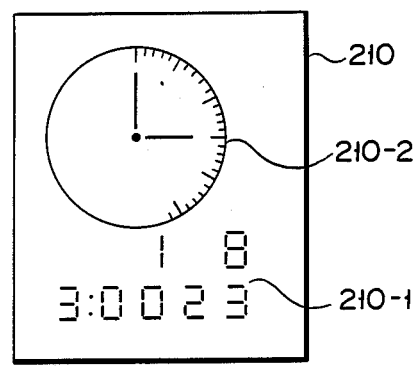
F I G. 45
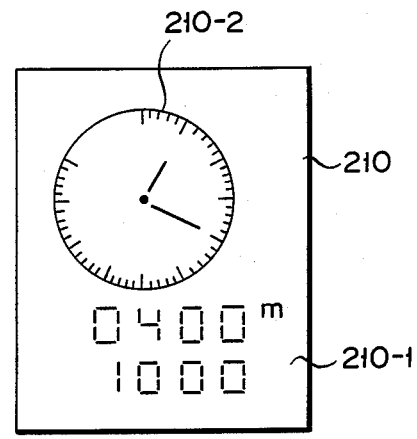

FIG. 47
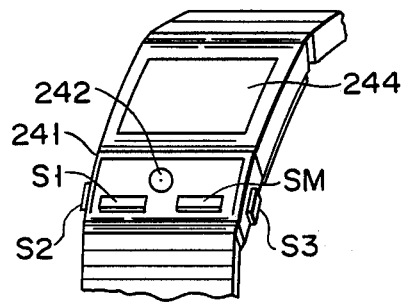
FIG. 48
| TM | |
|----|----|
| M | N |
| P6 | P |
| P11 | Pw |
| Fp | |
| m1 | |
| m2 | |
| m | |
FIG. 49
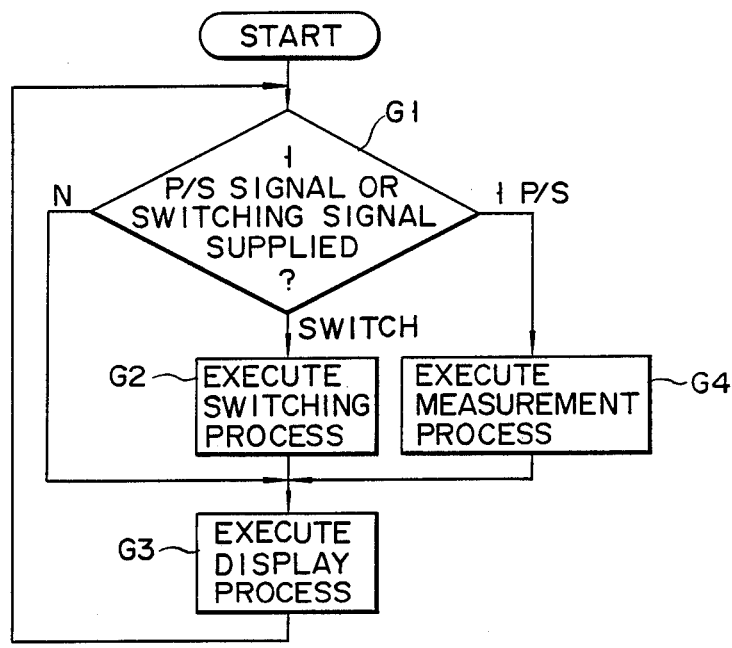

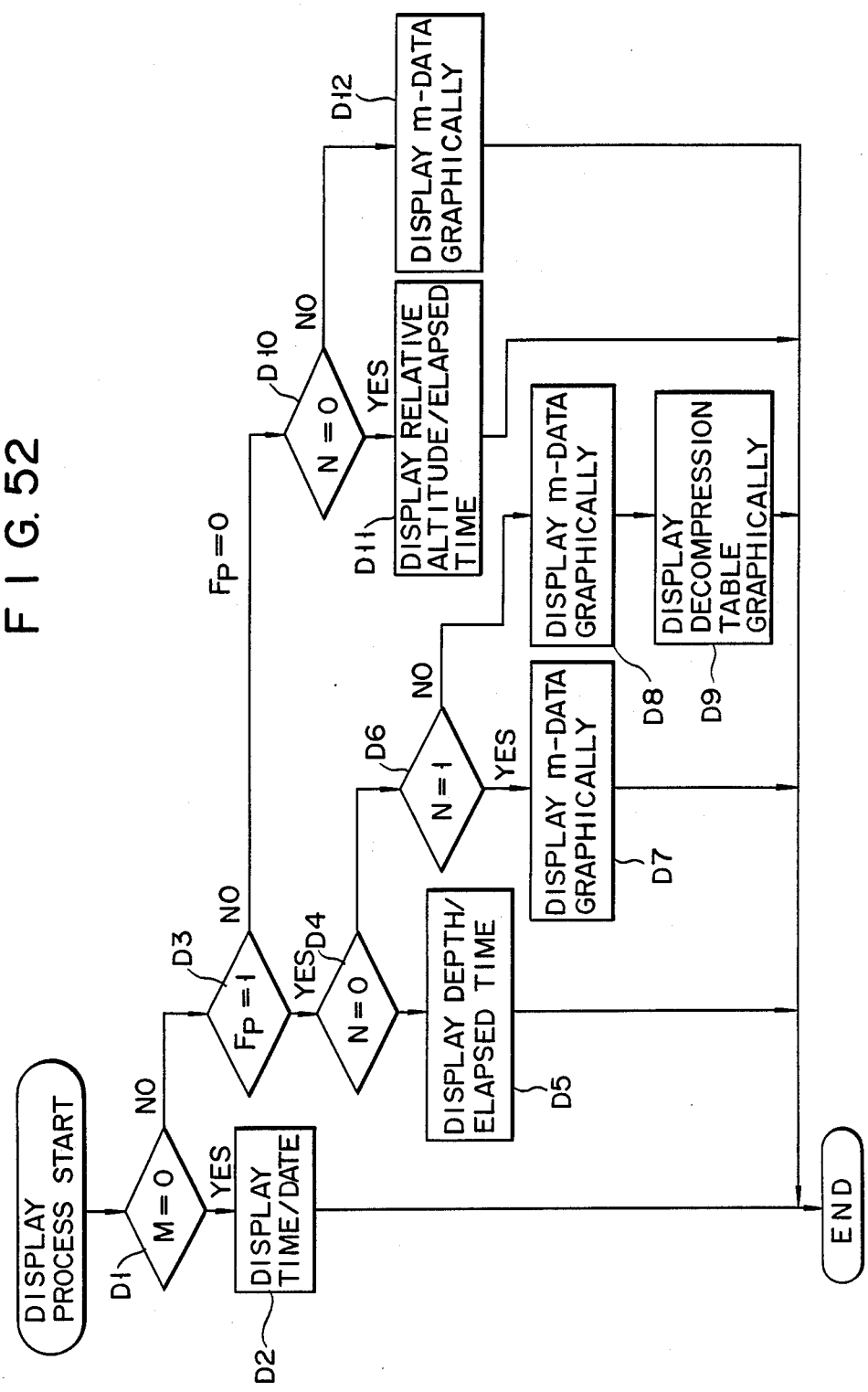
F I G. 52

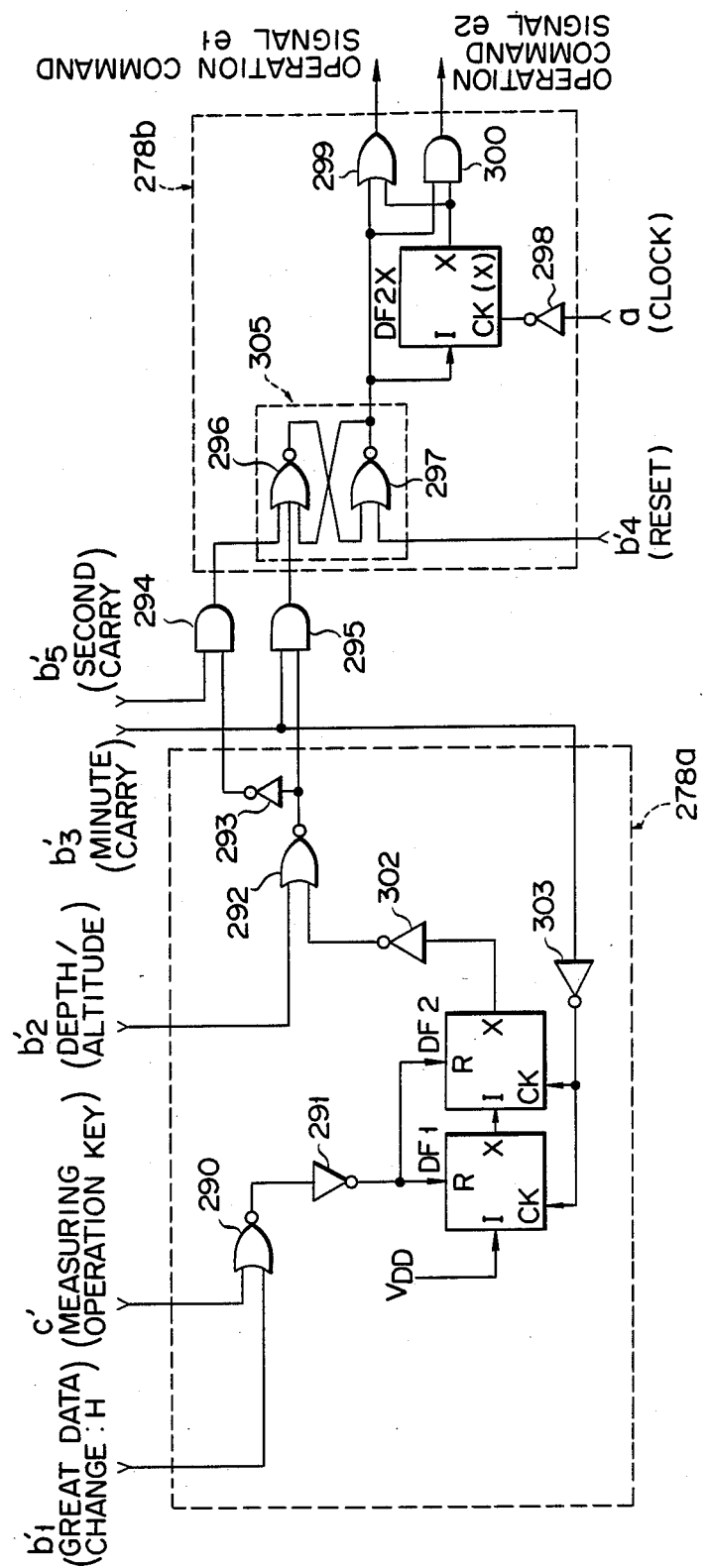
F I G. 55

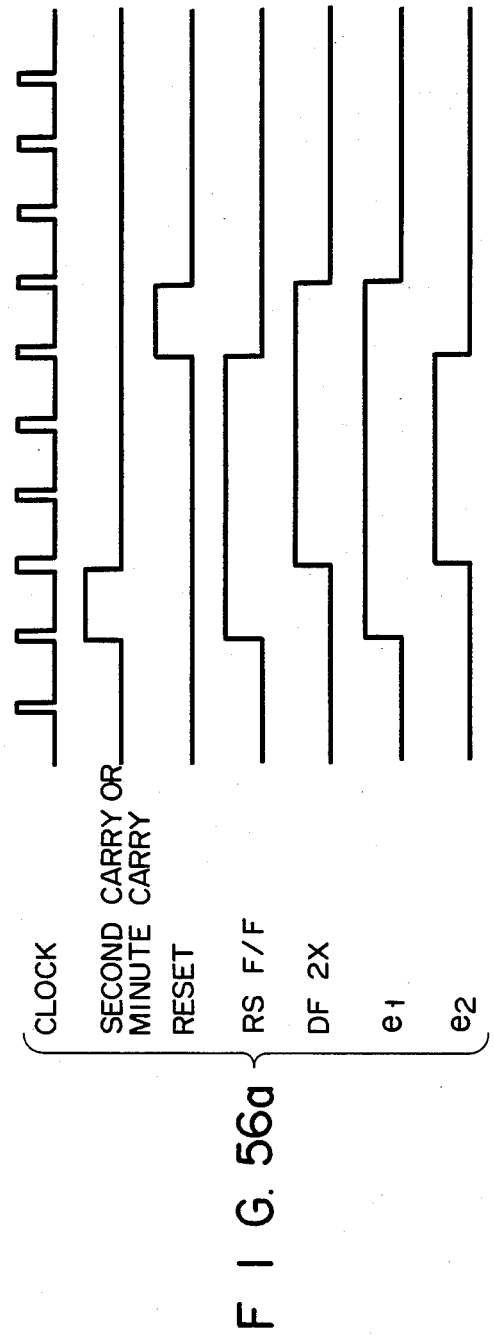
F I G. 56a
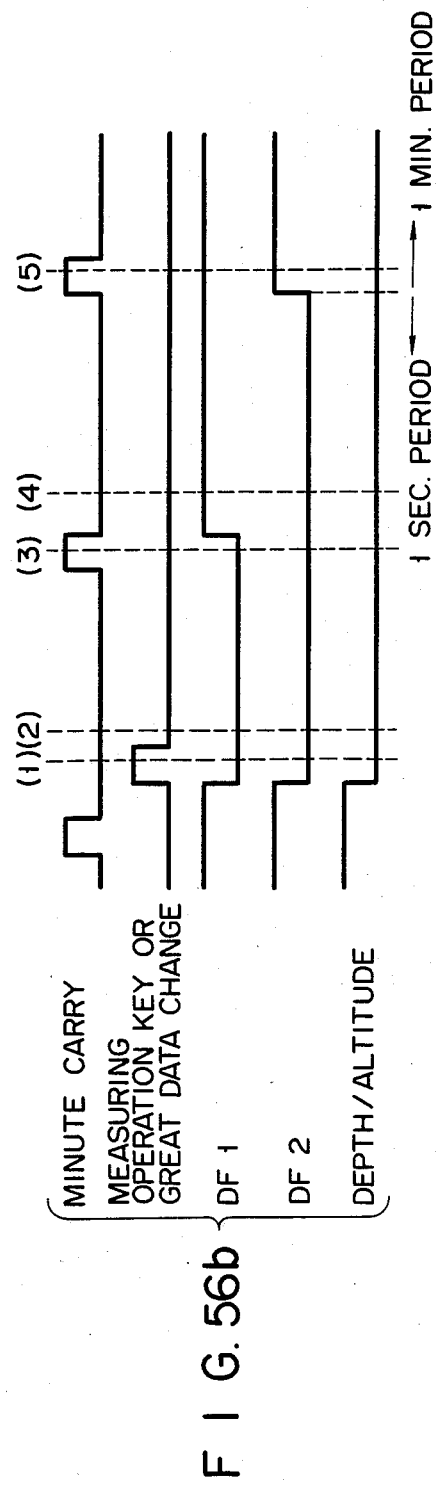
F I G. 56b

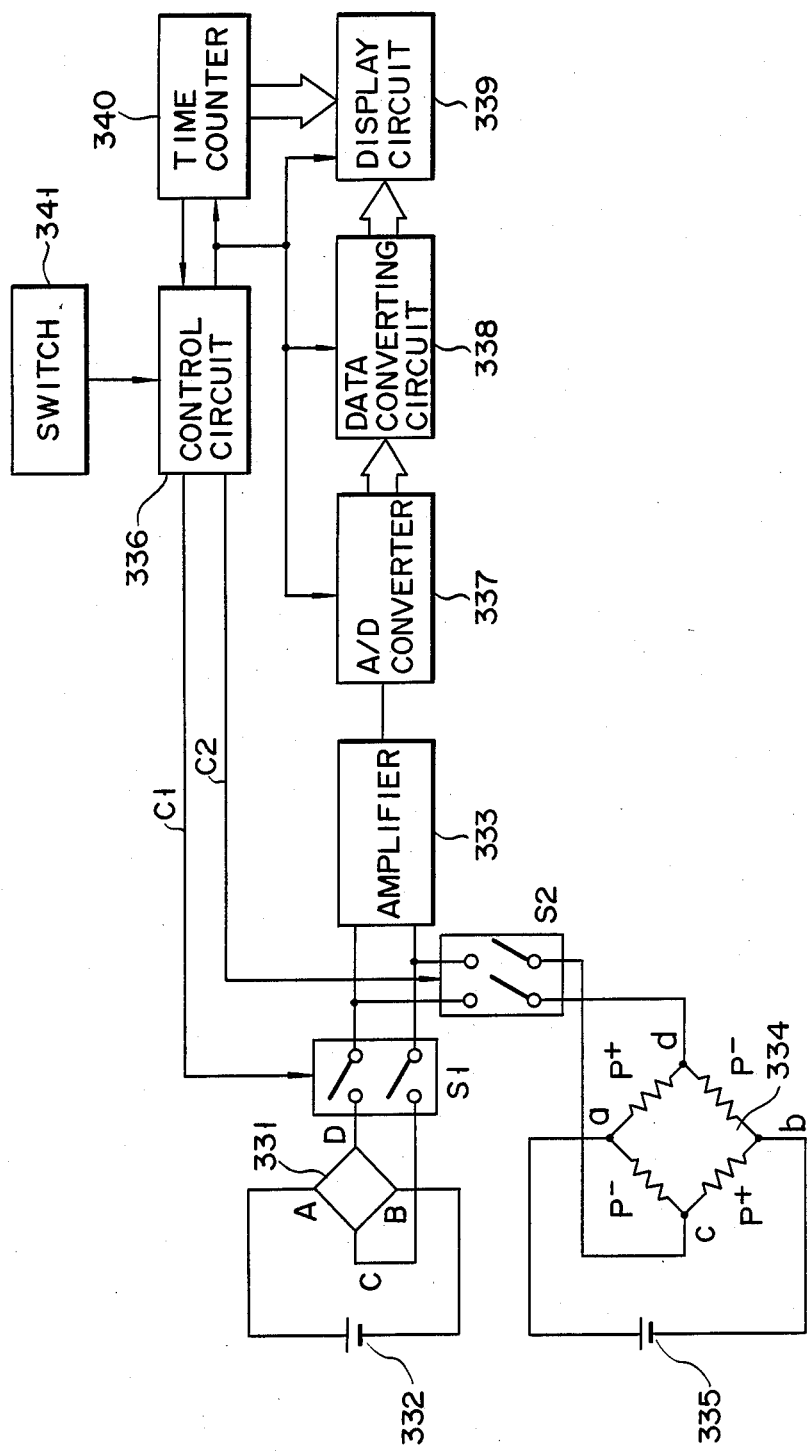
F I G. 59

COMPACT MEASURING APPARATUS CAPABLE OF MEASURING TWO DIFFERENT DATA WITH A SINGLE PRESSURE SENSOR

BACKGROUND OF THE INVENTION

1. Field of the Invention

The present invention relates to a compact measuring apparatus capable of measuring depths of water and altitudes with a single pressure sensor.

2. Description of the Prior Art

To measure depths of water for divers, various types of decompression meters, i.e., bathometers have been proposed in which a pressure sensor is incorporated. For instance, a wrist-carried decometer capable of measuring depths of water and also time of dives is described in U.S. Pat. No. 4,005,282 issued to Jennings. It is very useful for divers to carry wristwatches into which the above-described pressure measuring apparatus is incorporated.

Although these wristwatches employing the bathometers are fairly convenient for persons who dive many times on their business or hobby, persons other than these diving persons scarcely utilize such bathometers, or rather require meters capable of obtaining altitude information for hiking and hang gliding.

Moreover, the above-described divers also require the altitude information in their usual life.

To acquire such an altitude information, complex measuring devices are required, as described in, for instance, U.S. Pat. No. 3,958,459 to Shimomura.

No prior art meter has been ever proposed to measure not only depths of water, but also altitudes by employing a single pressure sensor. Even if a measuring device could be equipped with measuring functions for both depths of water and altitudes, it would become bulky and expensive. In addition, inconvenient switch operation is necessarily required to select the altitude measurement and the measurement for depths of water.

SUMMARY OF THE INVENTION

An object of the present invention is to provide a compact measuring apparatus capable of measuring information about both depths of water and altitudes by use of a single pressure sensor.

Another object of the present invention is to provide a very small-sized measuring apparatus employing a selector switch for easily and simply selecting the measurement modes of altitudes and depths.

These objects of the invention are achieved by providing a compact measuring apparatus capable of selectively measuring both depths of water and altitudes, comprising single pressure sensor means, means for generating pressure data corresponding to a pressure applied to said pressure sensor means, water-depth converting means for converting the pressure data derived from said pressure data generating means into water-depth data, altitude-data converting means for converting the pressure data derived from said pressure-data generating means into altitude data, and display means for selectively displaying the water-depth data derived from said water-depth data converting means and the altitude data derived from said altitude-data converting means.

With this arrangement, both the measurements of depths of water and altitudes can be achieved by employing a single pressure sensor. The particular advantage is obtained in that a size of such a multifunction measuring apparatus is very small, and thus, a portable compact apparatus is available. Moreover, the measuring modes of depth of water and of altitudes are automatically switchable and the depth and altitude data are displayed, so that an easy-to-handle measuring apparatus can be realized.

BRIEF DESCRIPTION OF THE DRAWINGS

FIG. 19 is a flowchart for describing in detail the switching process of FIG. 18;

FIGS. 21(a)-(b) are a flowchart for explaining in detail the display process of FIG. 18;

FIG. 25 is a detailed block diagram of the ascent-rate-detecting circuit in FIG. 24;

FIG. 26 is a detailed block diagram of the maximum value storing control circuit in FIG. 24;

FIG. 27 is a detailed block diagram of the display control circuit for the decompression table;

FIG. 30(b) partially represents a detailed decompression table of FIG. 30(a);

FIG. 31 is a table for group symbol conversion;

FIG. 32 represents a list of repetitive diving hours;

FIG. 42 is a schematic block diagram of an electronic wristwatch equipped with a pressure sensor according to a sixth preferred embodiment;

FIG. 43 shows the liquid crystal display device of the electronic wristwatch of FIG. 42;

FIG. 44 illustrates a display of the watch mode;

FIG. 45 illustrates a display of the pressure measuring mode;

FIG. 47 shows the electronic wristwatch of FIG. 46;

FIG. 48 schematically illustrates a portion of RAM arrangement;

FIG. 49 is a flowchart for explaining in detail overall operation of the wristwatch shown in FIG. 47;

FIG. 52 is a flowchart for explaining the display process of FIG. 49;

FIG. 55 is a circuit diagram of the sensor control circuit in FIG. 54;

FIGS. 56(a)–(b) are timecharts for explaining the operation of the wristwatch shown in FIG. 54;

FIG. 59 is a schematic block diagram of an electronic wristwatch according to a tenth preferred embodiment of the invention.

DETAILED DESCRIPTION OF THE PREFERRED EMBODIMENTS

Arrangement Of Electronic Wristwatch Equipped With Pressure Sensor Operated In First Mode Referring now to FIGS. 1 through 8, an electronic wristwatch equipped with a single pressure sensor according to a first preferred embodiment of the invention will be described.

Figure 2:
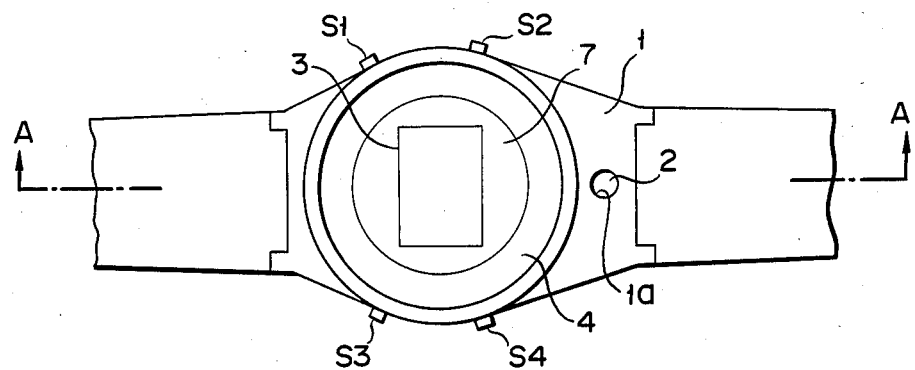
FIG. 2 shows the electronic wristwatch of FIG. 1.

An appearance of this wristwatch is illustrated in FIG. 2. In the figure, reference numeral 1 designates a watch case with a single pressure sensor 2. Circular opening 1a is formed in the right side part of the upper side of watch case 1. Pressure sensor 2 is mounted inside case 1 so that the upper side of pressure sensor 2 is exposed to exterior through opening 1a.

Figure 3:
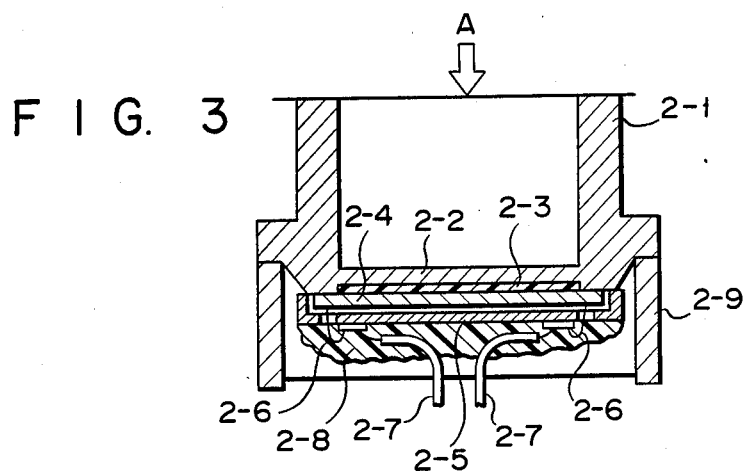
FIG. 3 is a cross-sectional view of the pressure sensor shown in FIG. 2.

The construction of pressure sensor 2 follows, with reference to FIG. 3. Outer case 2-1 forming pressure sensor 2 is tubular, and has a bottom. The inner surface of bottom plate 2-2 is exposed to outside above watch case 1. When pressure is applied to bottom plate 2-2 from above (in the direction of arrow A), bottom plate 2-2 (pressure receiving section) is distorted. The distortion of bottom plate 2-2 is transferred to semiconductor pressure sensor 2-4. This sensor 2-4 is provided under bottom plate 2-2 through liquid section 2-3. In sensor 4, four distortion gauges are formed on a diaphragm made of metal or silicone rubber by an appropriate semiconductor manufacturing technique such as diffusion or plasma CVD. These distortion gauges are arranged into a Wheatstone bridge circuit, which will be described later. The terminals of semiconductor pressure sensor 2-4 are bonded to the terminals of protective plate 2-5 located under that sensor 2-4, by wires 2-6 made of Au (gold). Lead wires 2-7 and 2-7 are soldered to protective plate 2-5. The lower surface of protective plate 2-5 with the connecting portion for these lead wires is molded by resin 2-8. Tubular member 2-9 is provided at the bottom part of outer case 2-1 and these are assembled into a unit. Semiconductor sensor 2-4 and protective plate 2-5 are housed in tubular member 2-9. The pressure sensor 2 thus constructed has a water-proof function.

Watch case 1 is provided at the front side with liquid crystal display unit 3 for visually presenting time, altitude, water depth, and the like, and rotatable bezel 4. Watch case 1 is also provided at the side surface with push button switches S1 to S4. Switch S1 is a basic mode select switch for selecting a time mode or a pressure measurement mode. Switch S2 is a measurement mode select switch for selecting any one of three types of measurement modes, e.g. an altitude/water depth automatic select mode, a water depth mode and an altitude mode. Switch S3 is a preset switch. When starting the pressure measurement, the measured value at that time is preset by means of this switch S3. Switch S4 is a correction switch. In the water depth mode, the measured value is corrected according to fresh water or sea-water, by this switch S4.

Figure 4:
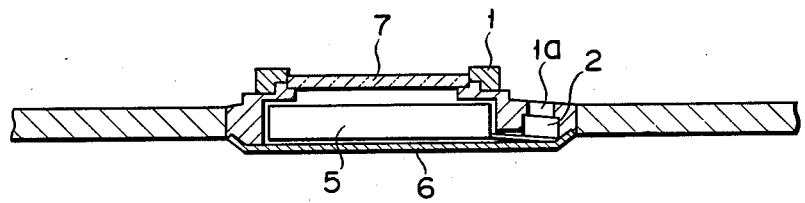
FIG. 4 is a cross-sectional view taken along lines A—A in FIG. 2.

FIG. 4 shows a cross sectional view taken on line A—A in FIG. 2. In pressure sensor 2, lead wires 2-7 and 2-7 are electrically connected to the circuit board contained in watch module 5. Rear case 6 is mounted on watch case 1, to keep a good hermetic condition inside case 1. Protection glass 7 covers liquid crystal display unit 3 for protection purposes.

Figure 1:
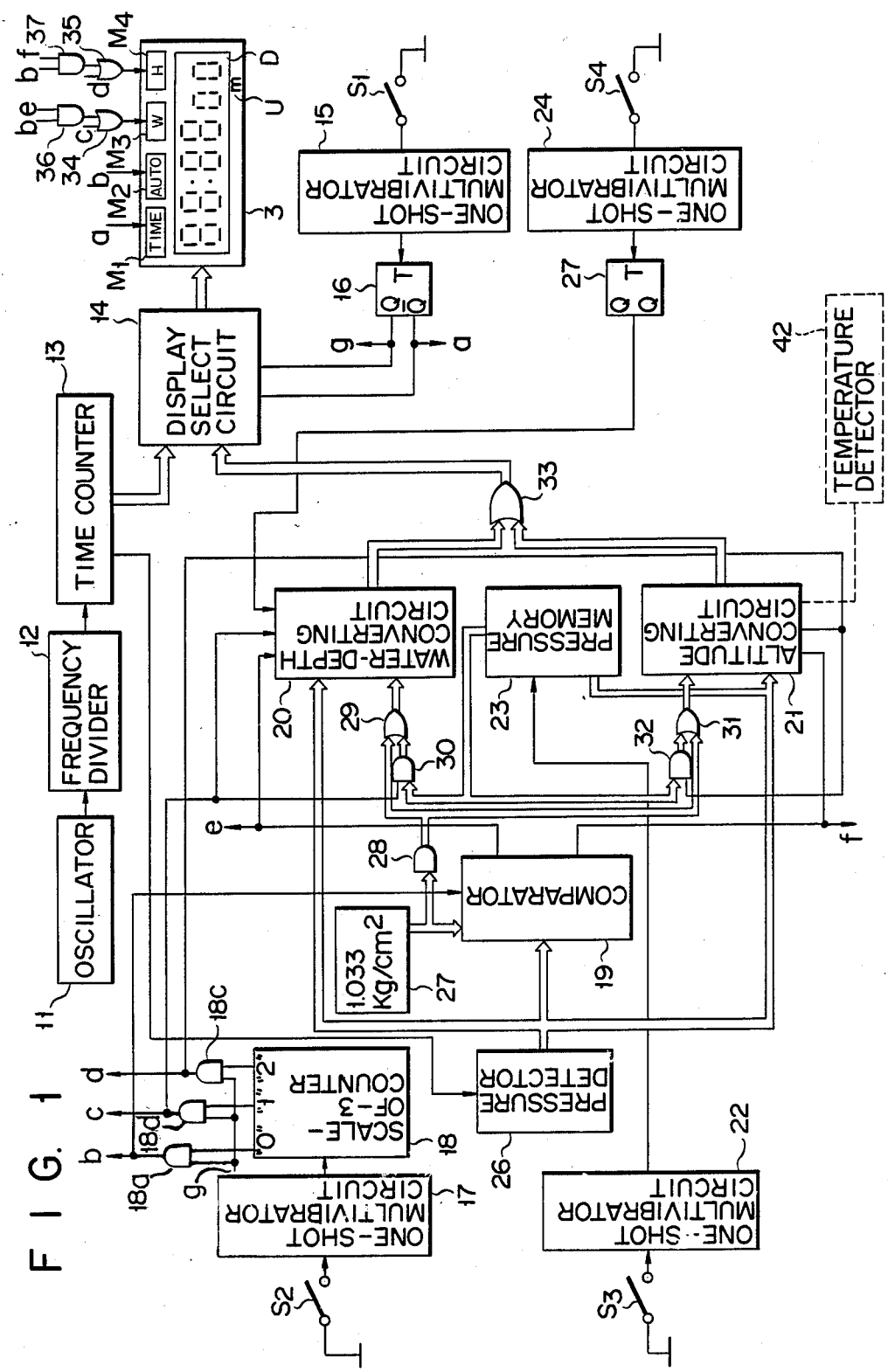
FIG. 1 is a schematic block diagram of an electronic wristwatch equipped with a pressure sensor according to a first preferred embodiment.

The circuit arrangement of this electronic wristwatch will be described referring to FIG. 1. In the figure, oscillator 11 generates a signal at a predetermined frequency. This output signal is frequency divided into a clock signal at 1 Hz, by frequency divider 12. The clock signal is applied to time counter 13. This counter 13 counts the clock signal to have time data. The time data is applied through display select circuit 14 to liquid crystal display unit 3.

Display unit 3 follows. As shown in FIG. 1, this unit 3 includes digital display section D, time mode (watch mode) display section M1, auto mode (altitude/water depth automatic select mode) display section M2, water depth mode display section M3, altitude mode display section M4, and unit (meter) display section U. Digital display section includes six digits each containing segments arrayed in 8-figure. Time mode display section M1 is located above digital display section D. Unit display section U is located below digital display section D and for displaying the unit, meter, of the measured value.

The output signal of basic mode select switch S1 causes one-shot multivibrator circuit 15 to produce a pulse signal. The pulse signal is applied to the T input terminal of T-type flip-flop (T-FF) 16. Upon receipt of this signal, T-FF 16 inverts the logical state of the output signal. T-FF 16 constitutes a basic mode select circuit. When the Q output of T-FF 16 is logically high ("1"), the measurement mode is designated. When the $\overline{Q}$ output is "1", the time mode is designated. The Q and $\overline{Q}$ output signals are applied as select designating signals to display select circuit 14. The output signal from measurement mode select switch S2 causes one-shot multivibrator circuit 17 to produce a pulse signal. In response to the pulse signal, scale-of-3 counter 18 performs the counting. Scale-of-3 counter 18 constitutes a measurement mode select circuit for designating or selecting any one of three measurement modes. When the count of scale-of-3 counter 18 is decimal "0", this counter produces a signal (logically high level) for selecting the altitude automatic select mode. When it is decimal "1", the counter produces a signal for selecting the water depth mode. When it is "2", the counter produces a signal for selecting the altitude mode. The mode designating signals "0", "1" and "2", which are produced from scale-of-3 counter 18 according to the counts "0", "1", and "2" of the counter, are applied to corresponding AND gates 18a, 18b, and 18c, respectively. These gates are enabled in response to the Q output of T-FF 16. The mode designating signal "0" output from AND gate 18a is applied as an operation command signal to comparator 19. The mode designating signal "1" output from AND gate 18b is applied as an operation command signal to water depth converting circuit 20. The mode designating signal "2" output from AND gate 18c is applied as an operation command signal to altitude converting circuit 21. The output of preset switch S3 causes one-shot multivibrator circuit 22 to produce a pulse signal. The pulse signal is applied to preset pressure memory unit 23, as a write-in command. The output of correction switch S4 causes one-shot multivibrator circuit 24 to produce a pulse signal. The pulse signal is applied to the T input terminal of T-FF 25. Upon receipt of this signal, T-FF 25 inverts the logical state of the output signal. T-FF 25 is for designating the type of water to be subjected to water depth measurement, that is, either sea water or fresh water. Since the specific gravity of sea water is different from that of fresh water, T-FF 25 outputs from its Q output terminal a measured value correction signal of high level. This signal is applied to water depth converting circuit 20.

Time counter 13 outputs a 10-second signal. The signal is applied to pressure detecting unit 26 as an operation designating signal. Pressure detecting unit 26 includes pressure sensor 2. Pressure detecting unit 26 converts the voltage as output from pressure sensor 2 into a measured pressure value of digital quantity ($kg/cm^2$). The measured pressure value is applied to comparator 19, water depth converting circuit 20 and altitude converting circuit 21. Comparator 19 compares the measured pressure value from pressure detecting unit 26 with one(1) atmosphere (1.033 $kg/cm^2$) as set in reference pressure memory 27. If the measured pressure is lower than 1.033 $kg/cm^2$, comparator 19 issues an operation command to altitude converting circuit 21. If the pressure is higher than 1.033 $kg/cm^2$ or inclusive, comparator 19 issues an operation command to water depth converting circuit 20. It should be noted that when the measured pressure is equal to 1.033 $Kg/cm^2$, either the altitude measurement, or water-depth measurement may be performed according to the invention.

Figure 5:
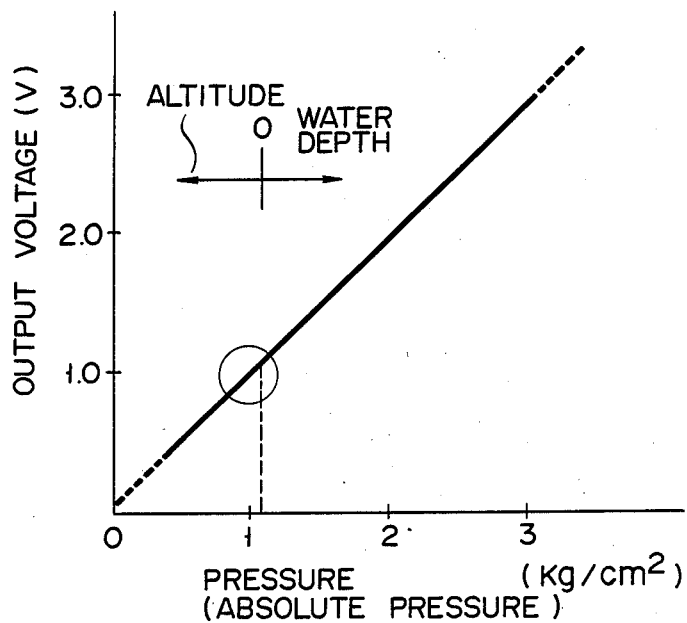
FIG. 5 is a graphic representation for explaining how to use the pressure sensor as an altitude meter, or bathometer.

FIG. 5 shows a graph representing a relation between output voltage (V) of pressure sensor 2 and the absolute pressure $kg/cm^2$. From the graph, it is understood that pressure sensor 2 is used for an altimeter if the absolute pressure is less than 1.033 $kg/cm^2$ and for a water depth meter if the pressure is 1.033 or above.

Water depth converting circuit 20 converts the measured pressure from pressure detecting unit 26 into water depth data (unit: meter), on the basis of the reference pressure of 1.033$kg/cm2$ or the set pressure. The reference pressure is applied from reference pressure memory 27 via AND gate 28 and OR gate 29. The set pressure is applied from preset pressure memory 23 via AND gate 30 and OR gate 29. Altitude converting circuit 21 converts the measured pressure from pressure detecting unit 26 into altitude data (unit: meter), on the basis of the reference pressure 1.033$kg/cm2$ or the set pressure. The reference pressure is applied from pressure memory 23 via AND gate 28 and OR gate 31. The set pressure is applied from preset pressure detecting circuit 26, via AND gate 32 and OR gate 31. The water depth data obtained by water depth converting circuit 20, and the altitude data obtained by altitude converting circuit 21 are transferred to display select circuit 14 via OR gate 33. The data is displayed in the digital display section D of liquid crystal display unit 3. Preset pressure memory 23 stores the data as obtained by pressure detecting unit 26, in response to the output signal from one-shot multivibrator circuit 22.

Display drive signals to be input to these mode display sections M1 to M4 of liquid crystal display unit 3 will now be described. The $\overline{Q}$ output of T-FF 16 constituting the basic mode select circuit is applied to TIME mode display section M1. The mode designating signal "0" output from scale-of-3 counter 18 via AND gate 18a is applied to auto mode display section M2. Mode designating signal "1" output form AND gate 18b is applied to water depth mode display section M3 via OR gate 34. Mode designating signal "2" output from AND gate 18c is applied to altitude mode display section M4 via OR gate 35. The signal, which is input as an operation command from comparator 19 to water depth converting circuit 20, is also applied to AND gate 36, together with mode designating signal "0" from AND gate 18a. The output of AND gate 36 is applied to water depth mode display section M3 via OR gate 34. The signal, which is input as an operation command from comparator 19 to altitude converting circuit 21, is also applied to AND gate 37, together with mode designating signal "0" from AND gate 18a. The output signal from AND gate 37 is applied to altitude mode display section M4 via OR gate 35.

Figure 6:
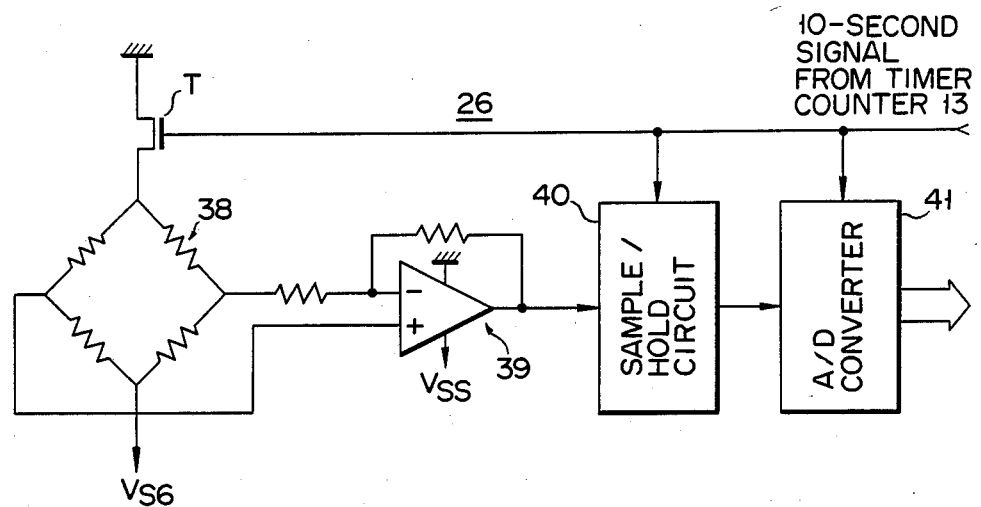
FIG. 6 is a detailed block diagram of a pressure detecting unit shown in FIG. 1.
Figure 7:
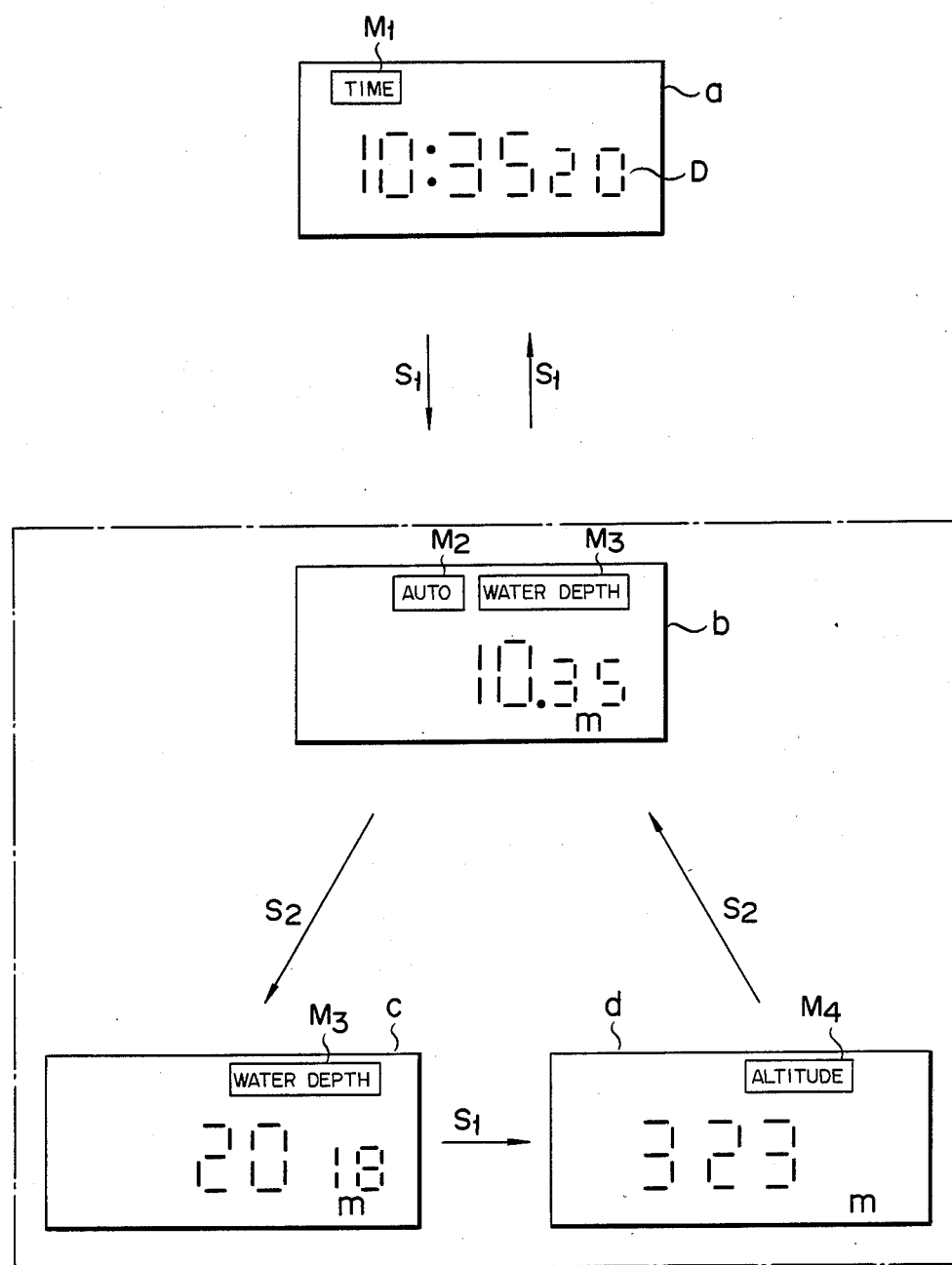
FIG. 7 shows a pictorial view of a display unit.

FIG. 6 is a circuit diagram showing the configuration of pressure detector 26. Wheatstone bridge circuit 38 comprises a distortion detector circuit (single semiconductor pressure sensor 2-4), and operates whenever transfer gate T is turned on. The voltage signal as output from Wheatstone bridge circuit 38 in accordance with the pressure, is input to A/D converter 41 via amplifier 39 and sample/hold circuit 40. There it is converted into 10-bit digital data and output from pressure detector 26 as a measured pressure value. The 10-second signal output from time counter 13 turns on transfer gate T. It therefore causes Wheatstone bridge circuit 38, sample/hold circuit 40 and A/D converter 41 to operate every ten seconds.

First Operation Mode Watch Mode

In the watch mode, the $\overline{Q}$ output of T-FF 16 is set to high level. The time data counted by time counter 13 is supplied from display select circuit 14 to digital display unit D and is digitally displayed. Also, TIME mode display section M1 is lit by the $\overline{Q}$ output of T-FF. FIG. 7a shows an example of the display in the watch mode. The display shows time data of "10: 35: 20" (10 hours: 35 minutes: 20 seconds).

Altitude/Water Depth Automatic Selection Mode

In this watch mode, when basic mode select switch S1 is operated once, the output state of T-FF 16 in inverted. The Q output becomes high in level, and the mode is switched to the pressure measurement mode. When scale-of-3 counter 18 is set to "0", a mode designating signal "0" is output from AND gate 18a. In response to this signal, the selection is made for the altitude/water depth automatic select mode. In the case, auto mode display section M2 is lit by the output of AND gate 18. At the same time, comparator 19 is placed in the operable state. In the altitude/water depth automatic select mode, AND gate 28 is enabled by the mode designating signal "0" from AND gate 18, and the contents of reference pressure memory unit 27 are output from AND gate 28. This data is supplied to water depth converting circuit 20 via AND gate 29, and to altitude converting circuit 21 via OR gate 31. Pressure detector 26 operates once every ten seconds in accordance with the 10-second signal from time counter 13. The pressure transferred to pressure sensor 2 through opening 1a of watch case 1 causes the pressure receiving section to distort. Then it is transferred to semiconductor sensor 2-4 (Wheatstone bridge circuit 38), and a voltage signal dependent upon the pressure is output. This output voltage is applied to A/D converter 41 via amplifier circuit 39 and sample/hold circuit 40. Then, the measured pressure value (Kg/cm²) of digital quantity is input to comparator 19. Comparator 19 compares the data from pressure detector 26 with that from reference pressure memory unit 27. If the result is lower than 1.033 Kg/cm², altitude converting circuit 21 is placed in operation. If the result is 1.033 Kg/cm² or more, water depth converting circuit 20 is placed in operation. The altitude converting circuit 21 and water depth converting circuit 20 are operated according to the following relations.

A=measured pressure (Kg/cm²)

(1) When $A < 1.033$ Kg/cm², altitude converting circuit 21 operates.

$$\text{Altitude(ho)} = 18410.0 \times (\log 1013.25(m\ bar) - \log P(m\ ber))\ (m)$$

$$P = 9.80665 \times 10^2 \times A$$

(2) When $A \geq 1.033$ Kg/cm², water-depth converting circuit 20 operates.

(i) In fresh water, with Q output of T-FF25 at low level,

Pressure at 10m = 0.998 Kg/cm²,

Water depth = $(A - 1.033)/0.998 \times 10$(m)

(ii) In sea water, with Q output of T-FF25 at high level,

Pressure at 10m = 1.025 Kg/cm²,

Water depth = $(A - 1.033)/1.025 \times 10$(m)

The water depth data, as obtained from water depth converting circuit 20 and the altitude data as obtained from altitude converting circuit 21 in this manner, are sent to digital display unit D via display select circuit 14. Therefore, the display mode of digital display unit D is switched to the time display mode, and the measured pressure is digitally displayed. In this case, either water depth mode display section M3 or altitude mode display section M4, will be lit, depending upon the result from comparator 19. Thus, the display can be recognized as either the altitude or water depth display. In other words, FIG. 7b shows an example of the display in the altitude/water depth automatic select mode, when the water depth mode has been automatically selected in response to the measured pressure. Auto mode display section M2 and water depth mode section M3 are both lit, and it can be clearly recognized that measured pressure 10.35 m represents water depth. In the same way, in the altitude/water depth automatic select mode, if the altitude mode is automatically selected, both auto mode section M2 and altitude mode section M4 are lit, and it is clear that the pressure of the measured pressure represents altitude. In this manner, in the altitude/water depth converting mode, using one atmosphere (1.033 kg/cm²) as a decision level, both the altitude and water depth measured values can be found.

Water Depth Mode

When a water depth is measured in a lake located at a high altitude, it is impossible to use one atmosphere as a reference value. In such a case, before diving, preset switch S3 is operated. By this operation, a pulse signal is output from one-shot multivibrator circuit 22. The signal is applied as a write signal to preset pressure memory unit 23. Pressure detecting unit 26 applies to preset pressure memory unit 23, the pressure as measured when preset switch S3 is operated. Preset pressure memory unit 23 stores the pressure. The value as stored in preset pressure memory unit 23 indicates the pressure (kg/cm²) at the present altitude. After this, when measurement mode select switch S2 is operated in the pressure measurement mode, every time measurement mode select switch S2 is operated, the pulse signal as output from one-shot multivibrator circuit 17 causes scale-of-3 counter 18 to progressively execute the counting operation. At the same time, auto mode display section M2, water depth mode display section M3 and altitude mode display section M4 are selectively lit according to the content of scale-of-3 counter 18. While observing the display unit, one drives water depth mode display section M3 to light. Then, the content of scale-of-3 counter 18 is "1", and the water depth mode is set up. Water depth converting circuit 20 is set to be operable. At the same time, AND gate 30 is enabled. Water depth converting circuit 20 is supplied with the measured pressure from pressure detecting unit 26 and the preset pressure from preset pressure memory unit 23. Water depth converting circuit 20 executes the operation according to the following expressions.

A = measured pressure (kg/cm$^2$)

B = Preset pressure (kg/cm$^2$)

(1) Fresh water ... Q output of T-FF 25: low level
Water depth = $(A-B)/0.998 \times 10$ m
(2) Sea water ... Q output of T-FF 25: high level Water depth = $(A-B)/1.025 \times 10$ m The water depth thus obtained is displayed in digital display section D. FIG. 7C shows this display state. In this case, since the value of preset pressure memory unit 23 is used as a reference value, the measured water depth is the actual depth, which does not involve altitude. The water depth mode can be used as other modes than the above one to measure the depth of water. For example, if preset switch S3 is operated at a specific water depth after diving, the water depth at that time is used as a new reference value, and the distance between the current depth and the surface of the water can be measured.

Altitude Mode

For measuring the altitude below sea level (0 m), or the altitude of a point where a low atmospheric pressure exists, one atmosphere cannot be used as a reference. In such a case, at the start of measuring the altitude, preset switch S3 is operated, and current measured pressure is set in preset pressure memory unit 23. Then, in the pressure measurement mode, measurement mode select switch S2 is operated to light altitude mode display section M4. The content of scale-of-3 counter 18 becomes "2", and the altitude mode is set up. By this operation, altitude converting circuit 21 is set to be ready for operation. At the same time, AND gate 32 is enabled. Then, altitude converting circuit 21 is supplied with the measured pressure from pressure detecting unit 26 and the preset pressure from preset pressure memory unit 23. Based on these values, altitude converting circuit 21 executes the operation as given below.

Altitude = $18410.0 \times (\log 1013.25 - \log P)$ (m)

$P = 9.80665 \times 10^2 \times A''$ $A' = A + 1.033 - B$

A = Measured pressure (kg/cm$^2$)

B = Preset pressure (kg/cm$^2$)

The altitude data thus obtained is displayed in digital display section D. FIG. 7D shows this display state. In this case, since the value stored in preset pressure memory unit 23 is used as a reference, an accurate altitude can be obtained even below sea level (0 m). In this altitude mode, the wristwatch may be used in the same manner as in the water depth mode. Specifically, if preset switch S3 is operated at a point of a specific height after climbing, the altitude at this time is used as a reference, and the height between the point and the current point can be measured. In the altitude mode, if measurement mode select switch S2 is operated once, the content of scale-of-3 becomes "1". Then, the altitude/water depth automatic select mode as shown in FIG. 7b is set up again. In the pressure measurement mode, if basic mode select switch S1 is operated, the wristwatch returns to the time mode as shown in FIG. 7a.

Figure 8:
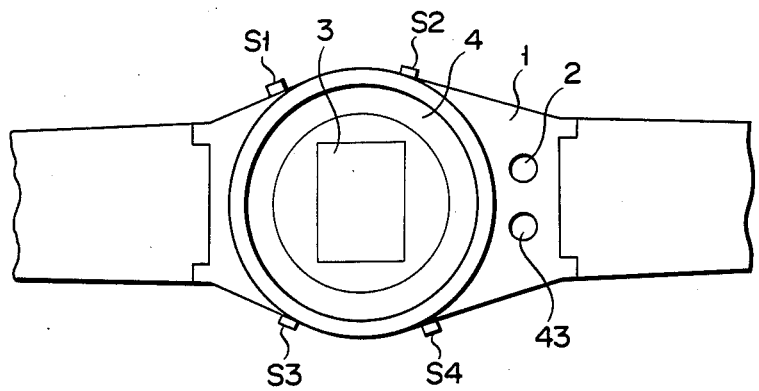
FIG. 8 illustrates an electronic wristwatch according to modified first preferred embodiment of the invention.

If the first embodiment additionally has the temperature compensating function for compensating for the measured altitude, the altitude can be measured more accurately. To realize this, temperature detecting unit 42, as shown by dotted line in FIG. 1, is additionally used. The temperature as detected by temperature detecting unit 42 is applied to altitude converting circuit 21. FIG. 8 shows an external view of the electronic wristwatch with this function. Temperature sensor 43 is arranged in watch case 1, adjacent to pressure sensor 2. Temperature sensor 43 is provided in temperature detection unit 42. The output of temperature sensor 43 is output from temperature detecting unit 42, as the temperature data. This embodiment is configured in the same manner as the first embodiment, except the above function. Thus, the explanation of this will be omitted.

Altitude converting circuit 21 of the above embodiment executes the operation according to the relation, Altitude $(h) = h_0 + 0.0036610 + tu \times h_0$. In this relation, "$h_0$" designates the altitude as measured in the altitude/water depth automatic select mode or the altitude mode in the same manner as described in the first embodiment. "tu" designates the temperature for the measured altitude, which is detected by temperature detecting unit 51.

Advantages of First Mode

As described above, in the first mode, both the altitude data and water depth data can be calculated and displayed on the basis of the output from a single pressure sensor. With this arrangement, this embodiment has an advantage that a single pressure sensor can be used as both an altimeter and a bathometer.

Wristwatch Operated In Second Mode

FIGS. 9 through 16 show an electronic wristwatch according to a second embodiment of the present invention. In this embodiment an altitude and a depth of water at the target point are preset, and an estimated time of arrival and a rate of arrival can be displayed at any point and any time during the course of dive or climbing. In this specification, the rate of arrival implies a percentage-expressed ratio of the distance from the below-mentioned base point to the present point at which the user carrying this wristwatch arrives, to the distance from the base point to the target point. The base point implies a point providing a reference for measuring an altitude and a depth of water.

This embodiment will be described more in detail referring to FIGS. 9 through 16. In the embodiment, the present invention is applied for an electronic wristwatch employing the electronic digital display and the hand indication for time display.

Arrangement of Wristwatch

Figure 10:
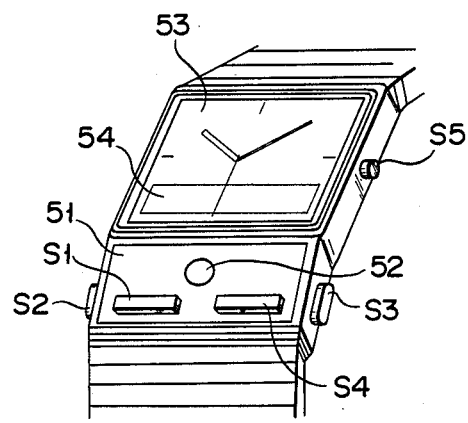
FIG. 10 illustrates a pictorial view of the wristwatch according to the second preferred embodiment.

FIG. 10 shows an appearance of this wristwatch. In the figure, reference numeral 51 designates a watch case with pressure sensor 52. A circular opening is formed in the lower part on the upper surface of watch case 51. The upper surface of pressure sensor 52 is exposed to outside through this opening. Display section 53 with hands and liquid crystal (LCD) display unit 54 is located on the front surface of watch case 51. This LCD display unit 54 can display time, altitude, depth of water, and the estimated time of arrival. The wristwatch is further provided with push button switches S1 to S4, in addition to crown switch S5.

Figure 9:
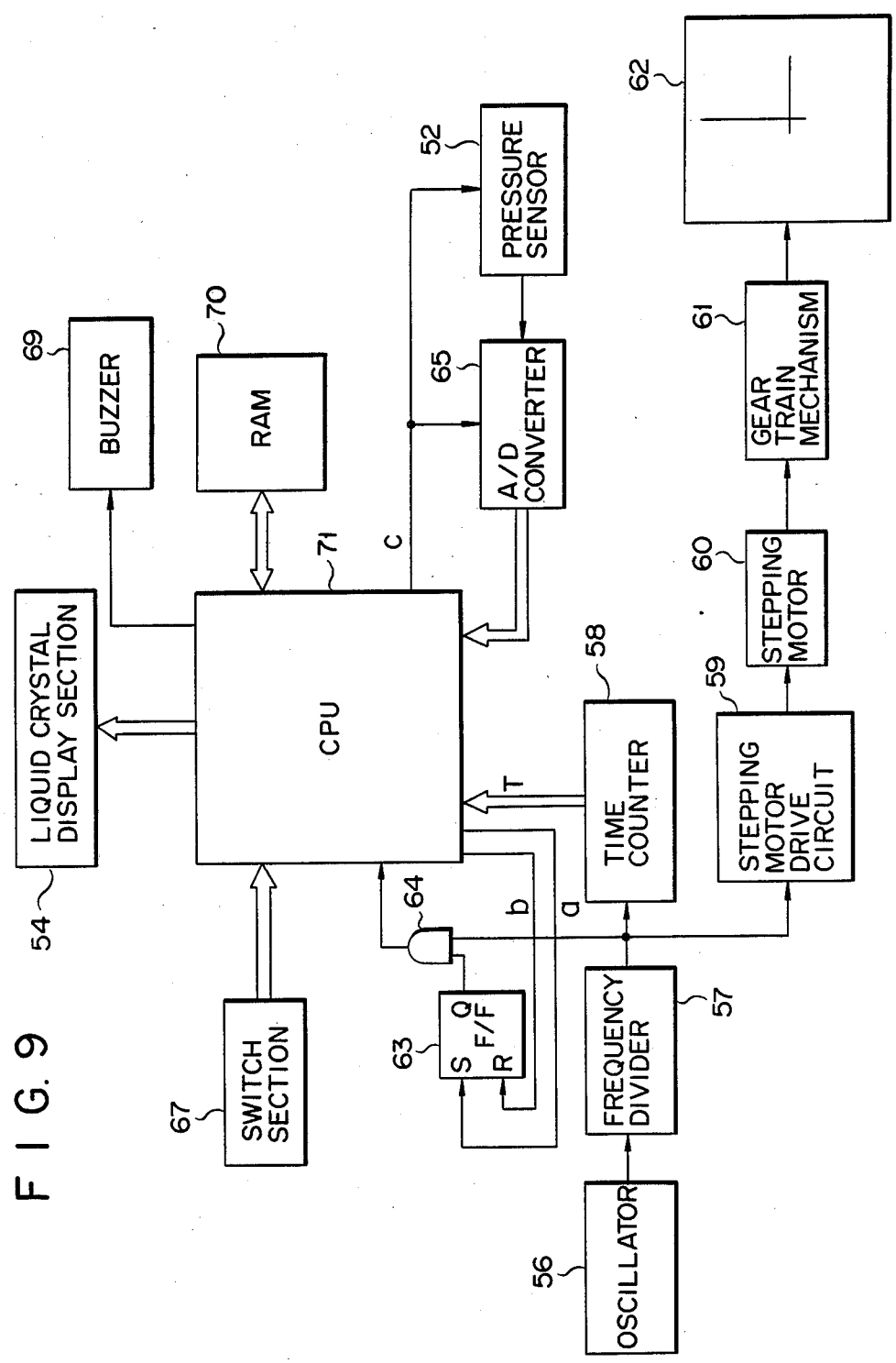
FIG. 9 is a schematic block diagram of an electronic wristwatch equipped with a pressure sensor according to a second preferred embodiment.

FIG. 9 shows a block diagram of this embodiment. In the figure, reference numeral 56 designates an oscillator. The output signal from the oscillator is frequency divided into a 1 p/s (pulse/second) signal by frequency divider 57. Then, it is applied to AND gate 64, time counter 58 and stepping motor drive circuit 59. Upon receipt of the 1 p/s signal, stepping motor drive circuit 59 drives stepping motor 60. The rotating force of stepping motor 60 moves hands 62 by way of gear train mechanism 61. Time counter 58, including second, minute, and hour counters, counts the 1 p/s signal and supplies the time data to CPU 71.

CPU 71 executes various signal processing according to a previously stored microprogram, in response to the switch input signal from switch section 67. The wristwatch of the embodiment is operated in two modes, i.e., a time display mode and a pressure gauge mode. In the former mode, the time data is displayed. In the latter mode, the wristwatch functions as a pressure gauge. In changing the mode of the wristwatch from the time display mode into the pressure gauge mode, CPU 71 transfers a signal "a" to RS flip-flop (FF) 63. By this signal, RS FF is set to enable AND gate 64. The enabled AND gate allows the 1 p/s signal to go to CPU 71. This signal serves as a timing signal for pressure measurement. In changing the mode from the pressure gauge mode to the time display mode, a signal "b" is transferred from CPU 71 to RS FF 63 to reset this flip-flop. Then, AND gate 64 enables to prohibit the 1 p/s signal from being input to CPU 71. In synchronism with the 1 p/s signal, CPU 71 sends an operation command signal "c" to pressure sensor 2 and analog-to-digital (A/D) converting circuit 65. At this time, pressure sensor 52 senses a pressure (atmospheric pressure or water pressure) at the point where the wristwatch is located. A/D converter 65 converts the sensed pressure into a digital quantity expressed by kg/cm$^2$ in unit, and transfers it to CPU 71. In this embodiment, when the digital quantity is below 1.033 kg/cm$^2$ (one atmosphere), it functions as an altimeter. When it is above 1.033 kg/cm$^2$, it serves as a water pressure meter.

The read/write operation of RAM 70 is performed under control of CPU 71. To this end, various types of registers are provided. Buzzer circuit 69 generates a sound when a preset altitude or a preset depth of water is detected. Under control of CPU 71, the sound generation is made. Display unit 54 displays the data coming from CPU 71. This display unit displays the present time in the time display mode, and an altitude, a depth of water or an estimated time of arrival in the pressure gauge mode.

Figures 11, 12:
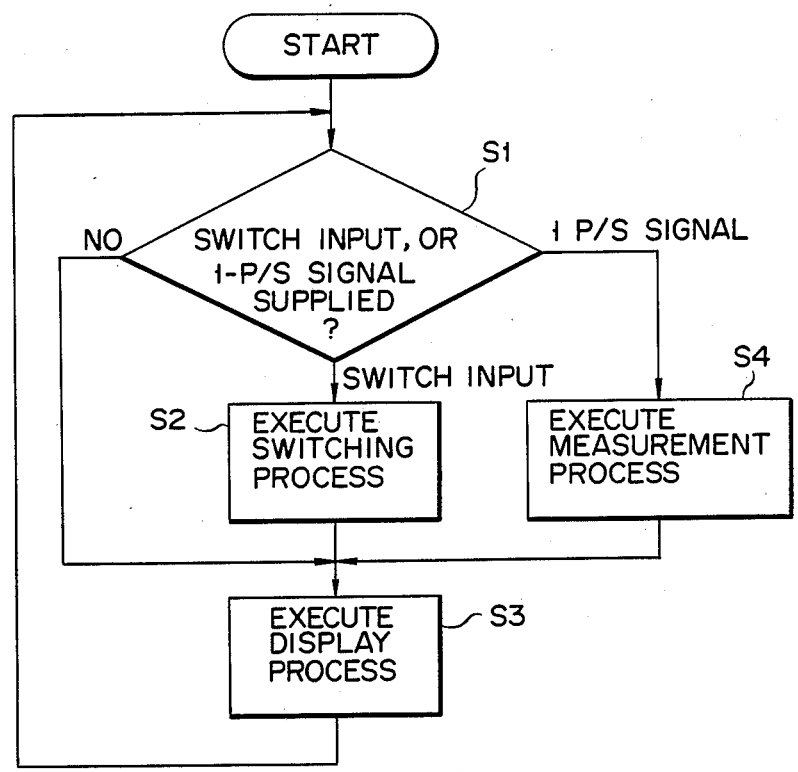
FIG. 11 schematically illustrates a portion of RAM arrangement shown in FIG. 9.
FIG. 12 is a flowchart for explaining overall operation of the wristwatch shown in FIG. 10.

FIG. 11 shows a major memory map of RAM 70. Register P stores a pressure (atmospheric pressure or water pressure) measured at the measuring timing. Register p0 stores a pressure at the base point. As described above, the base point is a reference point for water depth or altitude measurement. Register P1 stores altitude or depth of water at the present point relative to the base point (referred to as a relative altitude or a relative water depth). Memory AL stores a predetermined altitude or a predetermined depth of water (referred to as ascent/descent alarm distance). When the altitude or the water depth changes by a predetermined value or more, this change is notified by a buzzer. It is for this reason that memory AL is used. When the altitude or water depth changes by the ascent/descent alarm distance, register P2 stores the relative altitude, for example, (in this instance, either the relative altitude or the relative water-depth) at the point where that change occurs. This storage is made every time the change occurs. Memory TM stores the elapse of time from the start of measuring the altitude, for example. Register X is used for storing a target relative altitude or a target relative water depth. The target relative altitude means the height from the base point to the mountain top for climbing, for example. The target relative water depth means a depth from the sea level to the sea bottom. The unit for the value set in the memory or the register is kg/cm$^2$ for pressure, and "m" for distance.

Mode flag M is a flag set when the wristwatch is in the pressure gauge mode. It is reset when it is in the time display mode. Flag Fp is raised when the wristwatch of this embodiment serves as a bathometer in the pressure gauge mode. It is reset when the wristwatch functions as the altimeter. State counter N is a scale-of-3 counter. When the content of the counter is 0, a measurement mode is designated in which liquid crystal display unit 54 displays atmospheric pressure and water pressure. When the content of the counter is "1", a memo display mode is designated in which some artificially processed data, such as an estimated time of arrival, is displayed. When it is "2", a set mode is designated in which the target relative altitude (the target relative altitude or the target relative water depth) is set. Display counter A designates the type of measured data to be displayed in the measurement mode (i.e., when the content of mode counter N is 0). Display counter B designates the data to be displayed in the memo display mode (i.e., when mode counter N contains "1"). Display counter C designates the data, which can be set in the set mode (i.e. when mode counter N is 2).

Operation Of Wristwatch In Second Mode

The operation of this embodiment will be described. FIG. 12 shows a general flowchart illustrating an outline of the operation. It is checked whether the switch input signal from switch section 67 or the 1 p/s signal as the timing signal of the pressure measurement is present or not (step S1). If neither of them is present, a display process is executed in which liquid crystal display unit 54 displays time (step S3). Control returns to step S1. If the switch input signal is detected in step S1, the corresponding switching process is executed (step S2). If the 1 p/s signal is detected, the measurement process is executed in which atmospheric pressure or water pressure is measured (step S4). Then, the display process for displaying the measured data by liquid crystal display unit 54 (step S3) is executed, and control returns to step S1.

Figure 13:
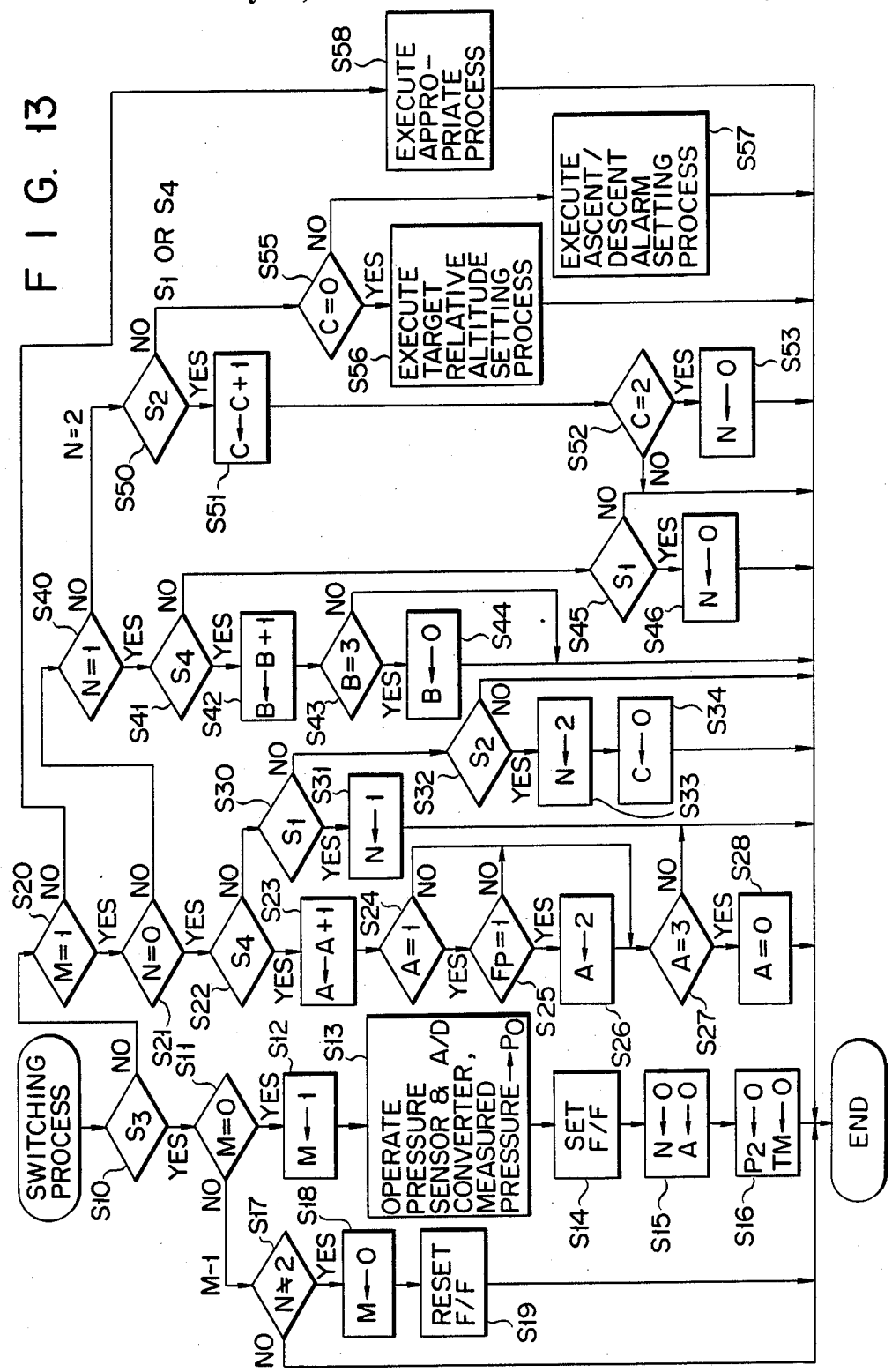
FIG. 13 is a flowchart for explaining in detail the switching process of FIG. 12.
Figure 14:
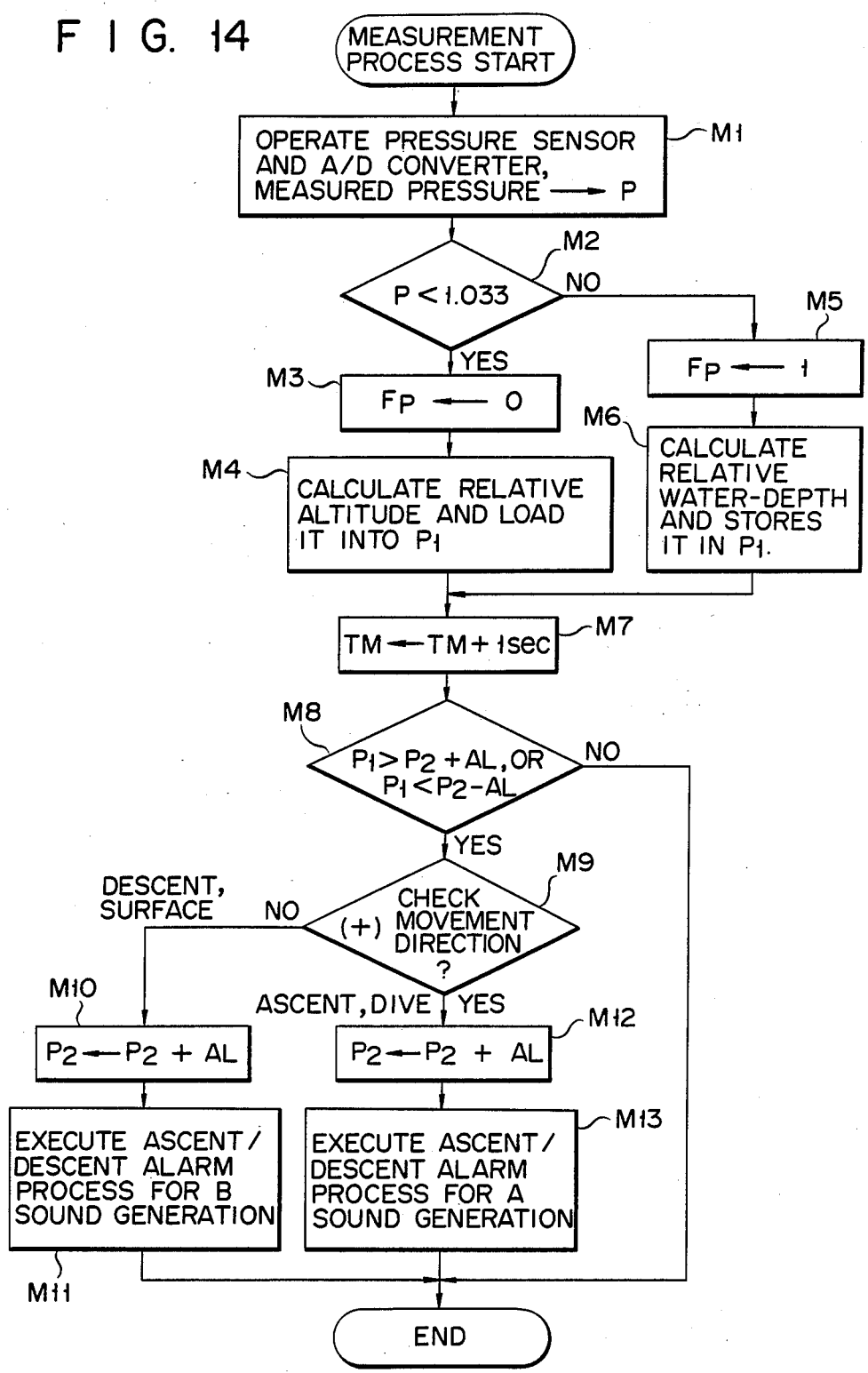
FIG. 14 is a flowchart for explaining in detail the measurement data process of FIG. 12.
Figure 15:
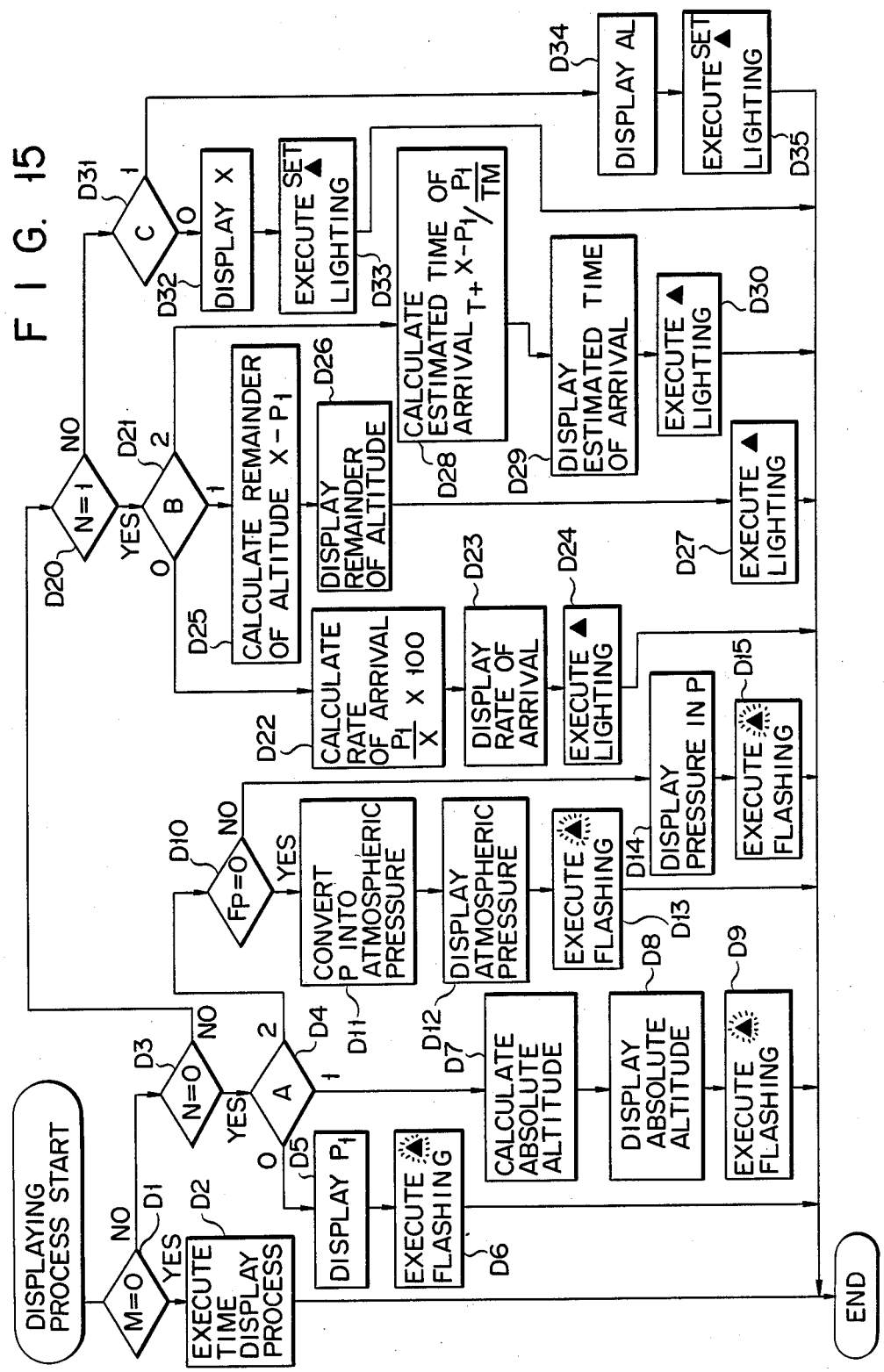
FIG. 15 is a flowchart for describing in detail the display process of FIG. 12.
Figure 16:
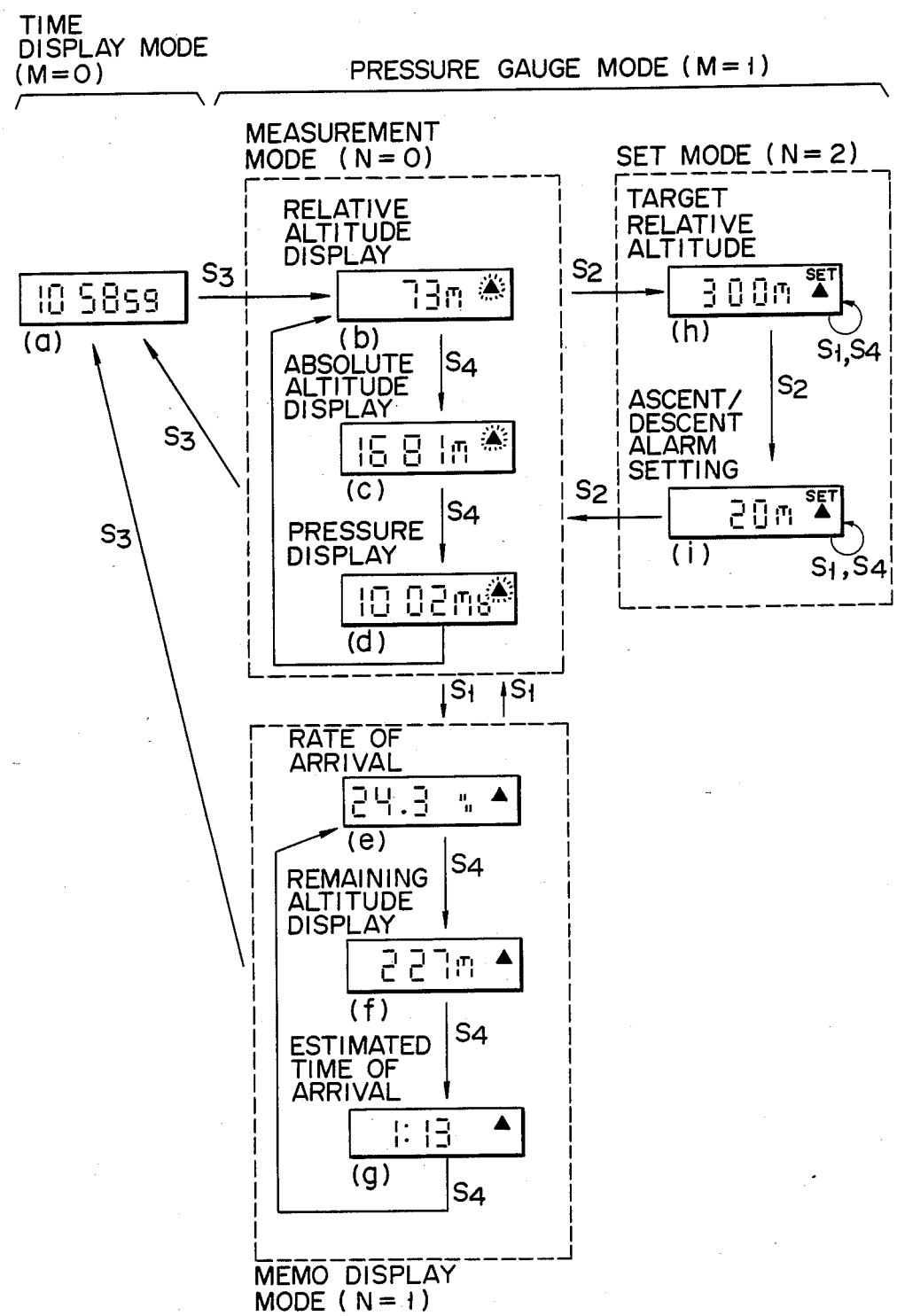
FIG. 16 is an illustration for describing display states in response to the switch operation of FIG. 10.

FIGS. 13, 14 and 15 show flowcharts illustrating the details of the switching process (step S2), the measurement process (step S4), and the display process (step S3). FIG. 16 shows a series of displays as visually presented by liquid crystal display unit 54 by the respective switch operations. The operation of each switch operation will be described.

(1) Initial Operation

It is now assumed that the wristwatch is in the time display mode, as shown in FIG. 16, and liquid crystal display unit 54 displays the present time (10: 58: 59). If push button switch S3 is operated, step S1 shown in FIG. 12 detects that the switch input signal has been present. Control enters the switching process in step S2, i.e., the control flow shown in the flowchart shown of FIG. 13. In step S10, the switch input signal is derived from push button switch S3. CPU confirms that the wristwatch is still in the time display mode (step S11), and sets mode flag M to change the operation mode from the time display mode to the pressure gauge mode (step S12). CPU transfers operation command signal "c" to pressure sensor 52 and A/D converter 65. The pressure at the present point is measured. The measured data is set in register P0, as the initial pressure, i.e. the pressure at the base point (step S13). CPU issues signal "a", sets RS flip-flop 63, and starts reception of the 1 p/s signal as the pressure measuring timing signal (step S14). "0" is set in mode counter N, and the measurement mode is designated. "0" is set in display counter A, and a relative altitude display mode for displaying the relative altitude or relative water depth is designated (step S15). In other words, when the mode is switched from the time display mode to the pressure gauge mode, the relative altitude display mode as the measurement mode is automatically designated. Then, in step S16, register P2 and memory TM are initialized.

Following the switching process (step S2 in FIG. 12), control enters the display process (step S3 in FIG. 12, i.e., the flowchart of FIG. 15). CPU confirms that the wristwatch has been set in the pressure gauge mode (step D1). Then, CPU 71 confirms that the measurement mode has been designated (step D3). Further, it confirms that the relative altitude display mode is designated (step D4). Finally, the content of register P1, such as the relative altitude, is displayed by display unit 54 (step D5). In this case, however, the operation is still under the initial operation at the base point, and the altitude difference or the water depth difference is not present, and therefore the relative altitude, for example, is "0". Afterwards, control goes to step D6. In this step, CPU 71 executes such a process that a triangle mark flashes in the right end portion of the display panel of liquid crystal display unit 54. The flashing of this mark indicates that the measurement mode is set up.

Following this processing, the set mode is set up in order to set the target relative altitude or the target relative water depth. In this case, as shown in FIG. 16, push button switch S2 is operated. The switch operation is detected in step S32 in FIG. 13, and "2" is set in mode counter N (step S33). With this set value, the set mode is designated, and "0" is set in display counter C (step S34). With this "20" set value, the target relative altitude set mode is designated. Thus, when the measurement mode is switched to the set mode, the target relative altitude set mode is set up. Then, the control of CPU 71 enters the display process in the flowchart of FIG. 15. The control flows through steps D31 and D32 to step D33. The triangle mark flashes in the right end portion of the display panel of liquid crystal display unit 54. And the processing is performed to display characters "SET" above that. The displayed "SET" indicates that the set mode is set up (see FIG. 16).

The target relative altitude or the target relative water-depth is set by the called set and select method. In this method, the digit is designated by push button switch S1, and the figure at the designated digit is designated by push button switch S4. In step S55, it is confirmed that the target relative altitude set mode has been set up. Then, control advances to step S56. This step sets the target relative altitude, for example, in register X. In the following step, the target relative altitude set in register X is displayed by liquid crystal display unit 54 (step D32). If "300 m" is set as the target relative altitude, liquid crystal display unit 54 makes a display as shown in (h) in FIG. 16.

Then, the ascent/descent alarm set mode is set mode is set up in order to set the ascent/descent alarm distance. To set up this mode, push button switch S2 is operated as shown in FIG. 16. The operation of this switch is detected in step S50. The increment processing to apply +1 to the content of display counter C is executed, so that the content of that counter is changed from "0" to "1". As a result, the ascent/descent alarm set mode is set up (step S51). Afterwards it is confirmed that the content of display counter is not "2" (step S52). The control enters the display process. In step D31, it is confirmed that the content of display counter C is "1". In step D35 following step D34, the triangle mark flashes and "SET" is displayed.

The ascent/descent distance is set by the set and select method using push button switches S1 and S4 in such a manner that a carry of displayed figures is selected by switch S1 and the carry is incremented by 1 by switch S4. Since the content of display counter C has been "1", control advances from step S55 to step S57. In this step, the ascent/descent set processing is executed in which the set value is written into memory AL. Following this, the control enters the display process. Through this process, the set ascent/descent alarm distance, for example, is displayed (steps D34 and D35).

After the initial setting operation is completed, the set mode is switched to the measurement mode again. For this switching, push button switch S2 is operated as shown in FIG. 16. This switch operation is detected in step S50. The increment processing to apply "+1" to display counter C is executed to increment its content to "2" (step S51). The control by CPU 71 advances through step S52 to step S53. "0" is set in mode counter N to set up the measurement mode. Then, the display process is executed. Step D3 confirms that the measurement mode has been set up. Through steps D4 and D5, the control goes to step D6. The triangle mark flashes, and the display mode before the set mode is set up.

Through the above initial operation, the setting operation of the basic data for calculating the estimated time of arrival is completed. Accordingly, the wristwatch can be used for the altimeter or the bathometer.

(2) Measuring Operation

When in the above mode the measuring point starts to move, that is to say, a user carrying the wristwatch starts the climbing or skin diving, the following operations are performed in the measurement process (step S4) every one second, and in the displaying process (step S3). CPU sends the operation command signal "c"

to pressure sensor 52 and A/D converter 65, which in turn start their operation. Pressure (atmospheric pressure or water pressure), which is changing momentarily, is measured, and the measuring results, i.e. the pressure at the present point, is momentarily loaded into register P (step M1). CPU checks if the pressure set in register P is higher or lower than 1.033 kg/cm$^2$ (one atmosphere). On the basis of the check result, CPU decides whether the wristwatch is used as an altimeter or a bathometer (step M2). If the decision result is that the content of register P is below 1.033 kg/cm$^2$, and the wristwatch is used as an altimeter, flag Fp is reset (step M3), and the control advances to step M4. In this step, CPU reads out the value in register P, and the pressure at the base point as previously set in register P0. Using the read out data, an appropriate operation is conducted to obtain the height from the base point to the present point, i.e. the relative altitude. The height is loaded into register P1.

On the other hand, if CPU decides in step M2 that the wristwatch is used as the bathometer, it sets flag Fp in step M5, and goes to step M6. In this step, CPU reads out the values in registers P and P0, calculates the water depth from the base point to the present point, that is, the relative water-depth, and stores it into register P1.

After the processing of step M4 or M6 is completed, control advances to step M7. In this step, CPU writes an additional time of one second from the measuring timing point into memory TM. Then, it advances to step M8. In step M8, it is decided whether or not the movement is further made by the ascent/descent alarm distance from the generation of the previous ascent/descent alarm (buzzer sound). In other words, CPU decides whether or not ascent or descent of the alarm distance occurred in the altimeter mode, and whether or not diving or surfacing of that distance occurred in the bathometer mode. In case that such movement occurred, CPU checks whether or not the movement is ascent or diving, i.e., the movement departing from the base point, or whether it is descent or surfacing, i.e., the movement approaching to the base point. This is performed in step M9. In the case of ascent or diving, CPU updates the content of register P2 by the value as sum of the value which has been kept till then (this value will be called an old value), and the ascent/descent alarm distance (M12). Further, CPU executes the ascent/descent alarm process for causing buzzer circuit 19 to generate the A sound. By the A sound, the user can know that such movement has been made (step M13). In step M19, if it is decided that the movement is descent or surfacing, CPU updates the content of register P2 by the value resulting from subtraction of the ascent alarm distance from the value (step M10). To notify the user that such movement has been made, CPU executes the ascent/descent alarm processing to cause buzzer circuit 19 to generate the B sound (step M11).

Following the above process, CPU enters the display process in its control operation. In this process, the control flows through steps D3 and D4 to step D5. It displays the relative altitude or the relative water depth at the present point by display unit 54. Further, the process for the flashing of triangle mark is executed in step D6. FIG. 16 shows an example of this display.

(3) Display Change In Measurement Mode

If push button switch S4 is operated when the relative altitude is displayed, an absolute altitude is displayed as shown in FIG. 16.

The switch operation is detected in step S22. The increment process to increment the content of display counter A by "1" is executed and set to "1", in step S23. In step S24, it is confirmed that the content of display counter A has been set to "1". In step S25, it is checked whether or not the wristwatch is used as an altimeter or a bathometer. When it is used as the altimeter, not the bathometer, step S27 confirms that the content of display counter A does not yet reach 3. Then, control goes to the display process. In step S25, when the wristwatch operates as the bathometer, the content of display counter A is forcibly set from "0" which has been kept up to that time, to "2". This is made for avoiding being set to "1" in the counter. In case that the wristwatch operates as the bathometer, the absolute water depth is not displayed.

It is assumed that CPU 71 confirms the wristwatch operates as the altimeter and keeps the value in counter A at "1", and enters the display process. This state is detected in step D4. The control proceeds to step D7. In step D7, absolute altitude (sea level) at the present point is calculated using the pressure at that point as stored in register P. The result of calculation is displayed by display unit 54 (step D8). Further, the process for flashing of the triangle mark is executed (step D9). When the sea level altitude at the present point is 1,681 m, illustrations and the triangle mark are shown in FIG. 16.

The operation of the wristwatch when the atmospheric pressure at the present point is displayed by liquid crystal display unit 54, will be described. When the absolute altitude is being displayed as shown in FIG. 16, push button switch S4 is further operated. This operation is detected in step S22. The increment process for applying +1 to the content of counter A is performed in step S23. By this process, the counter is set to "2", the control goes through step S24 to step S27. As described above, when the wristwatch operates as the altimeter, the content of display counter A never becomes "1" and remains "0". By merely operating switch S4 one time, "2" is set in display counter A. And the control goes to step S27. When "2" is set in display counter A, and the control reaches step S27 as described above, the control enters the display process in either case. Control goes from step D4 to step D10. In step D10, it is determined whether the wristwatch is used as the altimeter or the bathometer. When it is used as the altimeter, the pressure at the present point as set in register P is converted into atmospheric pressure in "mb". The result is displayed by display unit 54 (steps D11 and D12). Further, the process for flashing of the triangle mark at the right end is executed (step D15). At this time, the display is made as shown in FIG. 16. When the wristwatch is used as the bathometer, the water pressure (kg/cm$^2$) as set in register P is displayed on display unit 54 (step D14). The triangle mark also flashes (step D15).

As described above, when the pressure is displayed, if push button switch S4 is pushed, the display mode for displaying the relative altitude, for example, is set up again, as shown in FIG. 16. In this case, the operation of button switch S4 is detected in step S22, and +1 is applied to counter A to increment its content. By this process, the value of counter A is 3 (step S23). The control goes through steps S24 and S27 to step S28. In this step, the value of counter A is set to "0". Then, steps D4 to D6 are executed for displaying the relative altitude, for example, and for flashing the triangle mark.

As described above, in the measurement mode, the measured data at the present point is cyclically displayed by display unit 54, every time button switch S4 is operated.

(4) Change To Memo Display State

Change of the operation mode to the memo display mode, which provides the useful data for climbing or diving (except during descent and surfacing), is possible only from the measurement mode. To this end, switch S1 is pushed, as shown in FIG. 16. The switch operation is detected in step S30, and "1" is set to mode counter N in step S31. Then, the control goes to the display process. In step D20, it is confirmed that "1" has been set in mode counter N (see FIG. 15). Step D21 is executed in which one of these processes is selected according to the value in display counter B. If "0" has been set in display counter B as the result of the previous processing, the control goes to step D22. In this step, the value in register P1 is divided by that in register X. The result of the division is multiplied by 100. This multiplication result indicates a percentage-expressed ratio of the distance from the base point to the present point at which the user of the wristwatch arrives, to the distance from the base point to the target point. That is to say, it is the rate of arrival. The rate of arrival is displayed by display unit 54 in step D23. Further, the triangle mark is lit in step D24. These are displayed as shown in FIG. 16.

(5) Display Change In Memo Display Mode

In the above mode, i.e., when the rate of arrival is displayed by display unit 54, if switch S4 is pushed, the remaining altitude or the remaining water depth is displayed by display unit 54, as shown in FIG. 16. In this case, the switch operation is detected in step S41, and display counter B is set to "1" (step S42). This state of the counter is checked in step D21. The control advances to step D25. In this step, the relative altitude, for example, at the present point as set in register P1 is subtracted from the target relative altitude as set in register X. By the subtraction operation, the remaining altitude is obtained. Then, the calculation result and the triangle mark are displayed (steps D26 and D27), as shown in FIG. 16. In the figure, the displaying shows the remaining altitude of 227 m.

In the above display mode, if switch S4 is operated, an estimated time of arrival is displayed in the screen of display unit 54, as shown in FIG. 16. In this case, the switch operation is detected in step S41. Display counter B is set to "2" in step S42. The CPU control enters the display process through step S43. Step S21 detects that display counter B has been set to "2". Then, step D28 is executed. In this step, the value of register P1 is divided by the value in memory TM to obtain the average speed of the movement that has been made till then. At the same time, the value in register P1 is subtracted from that in register X. The former is divided by the latter, to obtain the time taken for the user to walk (or dive) the remaining distance. This time is added to the present time derived from time counter 58, so that an estimated time of arrival is obtained. Following this, the estimated time and the triangle mark are displayed (steps D26 and D27). FIG. 16(g) shows the display of those items. As seen from this, the estimated time is "13:18".

In the above display mode, if push button switch S4 is operated, the display is returned to the arrival rate display, as shown in FIG. 16. In this case, step S41 detects the switch operation, and step S42 sets "3" in display counter B. Step S43 detects 3 in counter B, and step S44 sets "0" in display counter B. Through steps D21 through D24, the display process is executed to work out the rate of arrival and to make the necessary display.

As described above, in the memo display mode, every time switch S4 is pushed, the rate of arrival, the remaining altitude, and the estimated time of arrival at that time are cyclically displayed on display unit 54. The mark for expressing the unit enables the user to recognize the separation of these pieces of displayed data.

(6) Change From Memo Display Mode To Measurement Mode

The change from the memory display mode to the measurement mode is performed by operating switch S1, as shown in FIG. 16. The switch operation is detected in step S45. "0" is set in mode counter N in step S46. Subsequently, the control by CPU enters the display process, and through steps D3 and D4. According to the value in counter A, an appropriate process is executed. The result of the processing is displayed by display unit 54.

(7) Change To Time Display Mode

For changing the operation mode to time display mode, the wristwatch is set in the measurement mode or the memo display mode, and switch S3 is operated, as shown in FIG. 16. Step S10 detects this, and step S11 confirms that the wristwatch is not yet in the time display mode. Further, step S17 confirms that the wristwatch is not in the set mode, that is, it is still in the measurement mode or the memo display mode. Mode flag M is set to "0", and the time display mode is set up (step S18). The signal "b" is transferred to RS FF 13 and this FF is reset (step S19). Subsequently, the display process is executed, in which the present time from time counter 58 is displayed by display unit 54 (step D2).

After the operation mode is changed to the time display mode, if the switch is operated, an appropriate process is executed in step S58. The time obtained after that process is displayed in step D2.

Advantages Of The Second Embodiment

As seen from the foregoing, the user can know, by a simple operation, the estimated time of arrival at the target point and a rate of arrival at the target altitude or the target water depth.

Wristwatch Operated In Third Mode

FIGS. 17 to 22 show a wristwatch operable in the third mode according to a third embodiment of this invention. In the third embodiment, when the user moves from the first point to the second point, the average speed of the movement such as ascent, descent, diving or surfacing is calculated and displayed.

Arrangement Of Wristwatch

The circuit arrangement and the appearance of the third embodiment are substantially the same as those of the second embodiment. Therefore, the description of those will be omitted.

Figures 17, 18:
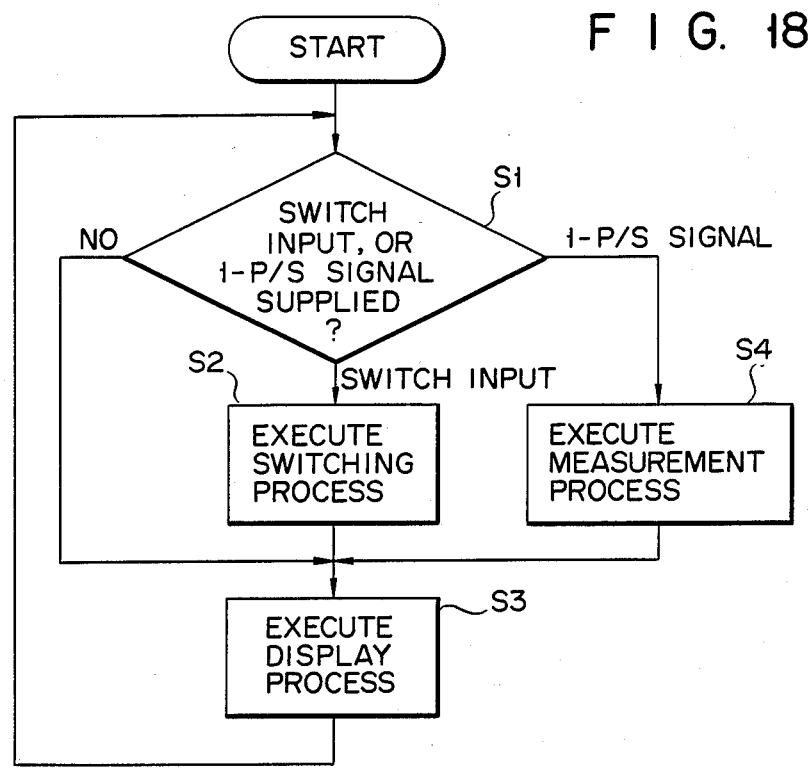
FIG. 17 schematically illustrates a portion of RAM arrangement according to a third preferred embodiment.
FIG. 18 is a flowchart for explaining overall operation of the third embodiment.
Figure 20A:
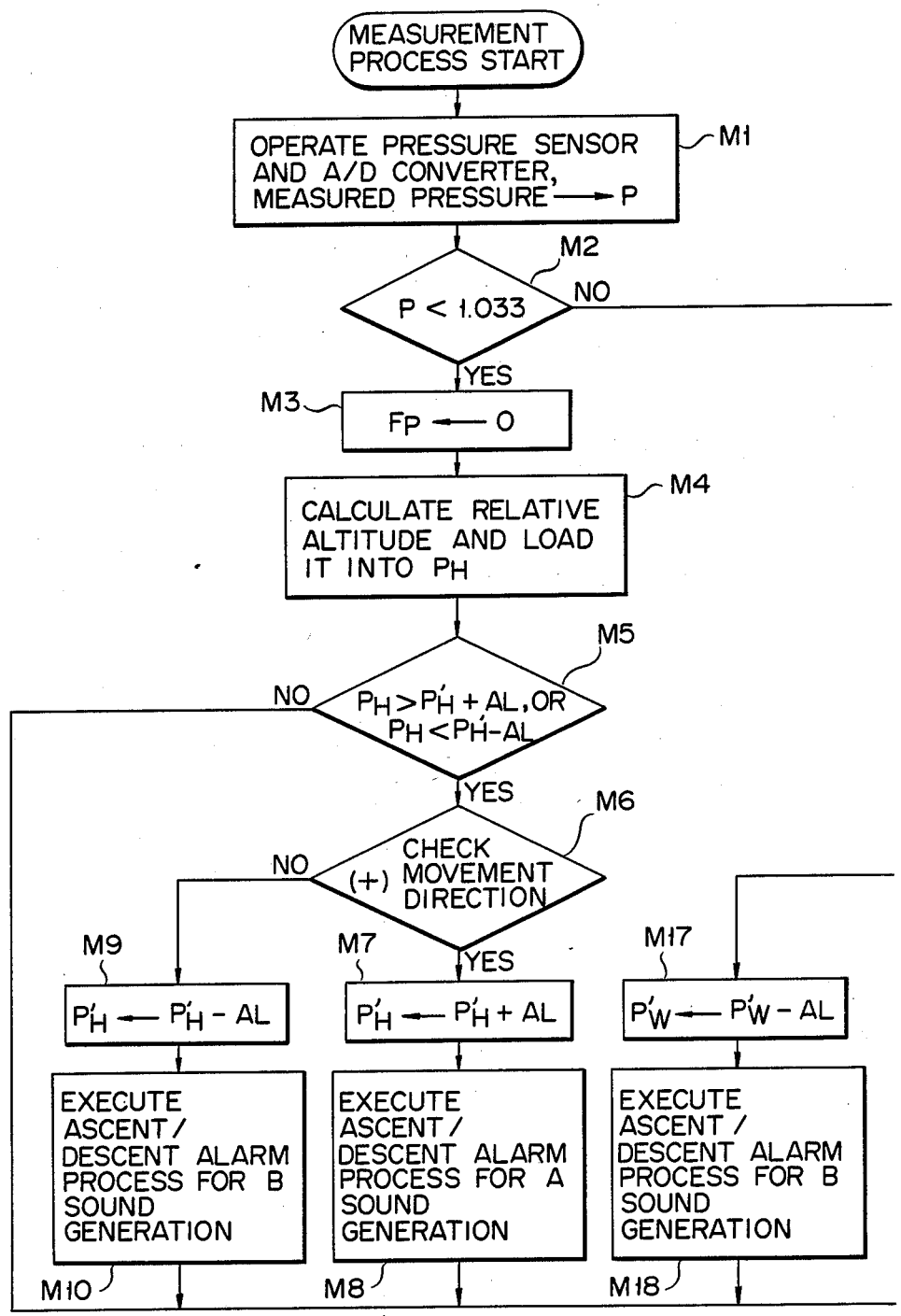
FIGS. 20(a)-(b) are a flowchart for describing in detail the measurement process of FIG. 18.
Figure 20B:
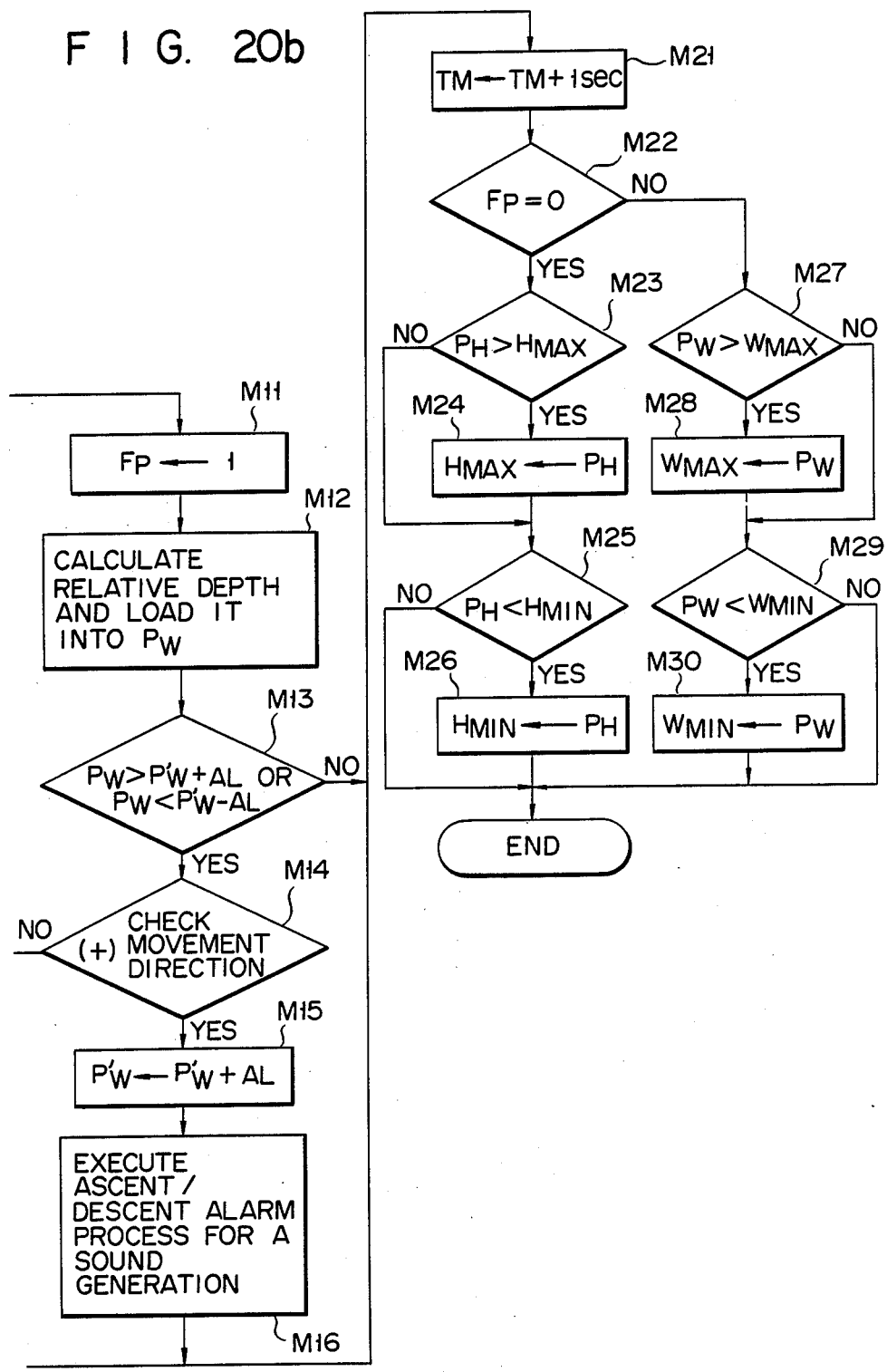

FIG. 17 shows a major memory map of RAM 70. Register P momentarily stores the present pressure (atmospheric pressure or water pressure), which is measured at the present point at the measuring timing in the pressure gauge mode. Register P0 stores the pressure at the base point which is used as a reference for measuring the altitude or the water depth. Register PH momentarily stores the altitude at the present point relative to the base point. This altitude will be referred to as a relative altitude. Registert PW momentarily stores the a relative altitude. Register PW momentarily stores the depth of water at the present point relative to the base point. This depth will be referred to as a relative depth. Memory AL is a register for storing a predetermined altitude or a predetermined depth of water (referred to as an ascent/descent alarm distance). This distance is used to drive the buzzer every time the altitude or the water depth changes by a predetermined value. Register P'H stores the relative altitude at a point where the altitude changes by that distance, every time such altitude change occurs. Register P'W stores the relative depth of water at a point where the water depth changes by the alarm distance, every time such water depth change occurs. Memory $H_{MAX}$ and memory $H_{MIN}$ store the maximum and minimum relative altitudes, respectively. Memory $W_{MAX}$ and $W_{MIN}$ store the maximum and minimum relative water depth, respectively. Memory TM momentarily stores the elapse of time from the start point of measuring the altitude, for example. As for the values, the unit is $kg/cm^2$ for the pressure, and m for distance. Mode flag M is set when the wristwatch is in the pressure gauge mode, while reset when it is in the time display mode. Flag Fp is set when, in the pressure gauge mode, the wristwatch operates in the bathometer. The flag is reset when it operates in the altimeter. Mode counter N is a scale-of-3 counter. When its content is "0", the measurement mode is set up in which the data such as atmospheric pressure or water pressure is displayed by display unit 54. "1" in mode counter N designates the memo display mode to display the maximum or minimum relative altitude. "2" designates the set mode to set the ascent/descent alarm distance. Display counter A, when its content is "0", designates the measured data displayed in the measurement mode. Display counter B, when its content is "1", designates the data displayed in the memory display mode.

Operation Of Wristwatch In Third Mode

The operation of this embodiment will be described. FIG. 18 shows a general flowchart illustrating an outline of the operation. CPU (not shown in detail) checks whether the switch input signal from switch section 67 or the 1 p/s signal as the timing signal of the pressure measurement is present or not (step S1). If neither of them is present, a display process is executed in which liquid crystal display unit 54 displays time (step S3). Control returns to step S1. If the switch input signal is detected in step S1, the corresponding switching process is executed (step S2). If the 1 p/s signal is detected, the measurement process is executed in which atmospheric pressure or water pressure is measured (step S4). Then, the display process for displaying the measured data by liquid crystal display unit 54 (step S3) is executed, and control returns to step S1.

FIGS. 19, 20(a)-(b), and 21(a)-(b) show flowcharts illustrating the details of the switching process (step S2), the measurement process (step S4), and the display process (step S3). FIG. 22 shows a series of displays as visually presented by liquid crystal display unit 54 by the respective switch operations. The operation of each switch operation will be described.

(1) Initial Operation

It is now assumed that the wristwatch is in the time display mode, as shown in FIG. 22, and liquid crystal display unit 54 displays the present time (10: 58: 59). If push button switch S3 is operated, switch S1 shown in FIG. 18 detects that the switch input signal has been present. Control enters the switching process in step S2, i.e., the control flow shown in the flowchart shown of FIG. 19. In step S10, the switch input signal is derived from push button switch S3. CPU confirms that the wristwatch is still in the time display mode (step S11), sets mode flag M to change the operation mode from the time display mode to the pressure gauge mode (step S12). CPU transfers operation command signal "c" to pressure sensor 52 and A/D converter 65. The pressure at the present point is measured. The measured data is set in register P0, as the initial pressure, i.e., the pressure at the base point (S13). CPU issues signal "a", sets RS flip-flop 63, and starts reception of the 1 p/s signal as the pressure measuring timing signal (step S14). "0" is set in mode counter N, and the measurement mode is designated. "0" is set in display counter A, and a relative altitude display mode for displaying the relative altitude or relative water depth is designated (step S15). In other words, when the mode is switched from the time display mode to the pressure gauge mode, the relative altitude display mode as the measurement mode is automatically designated. Then, in step S16 and S17, registers P'H and P'W, memories $H_{MAX}$, $H_{MIN}$, $W_{MAX}$, and $W_{MIN}$ and memory TM are initialized.

Figure 21A:
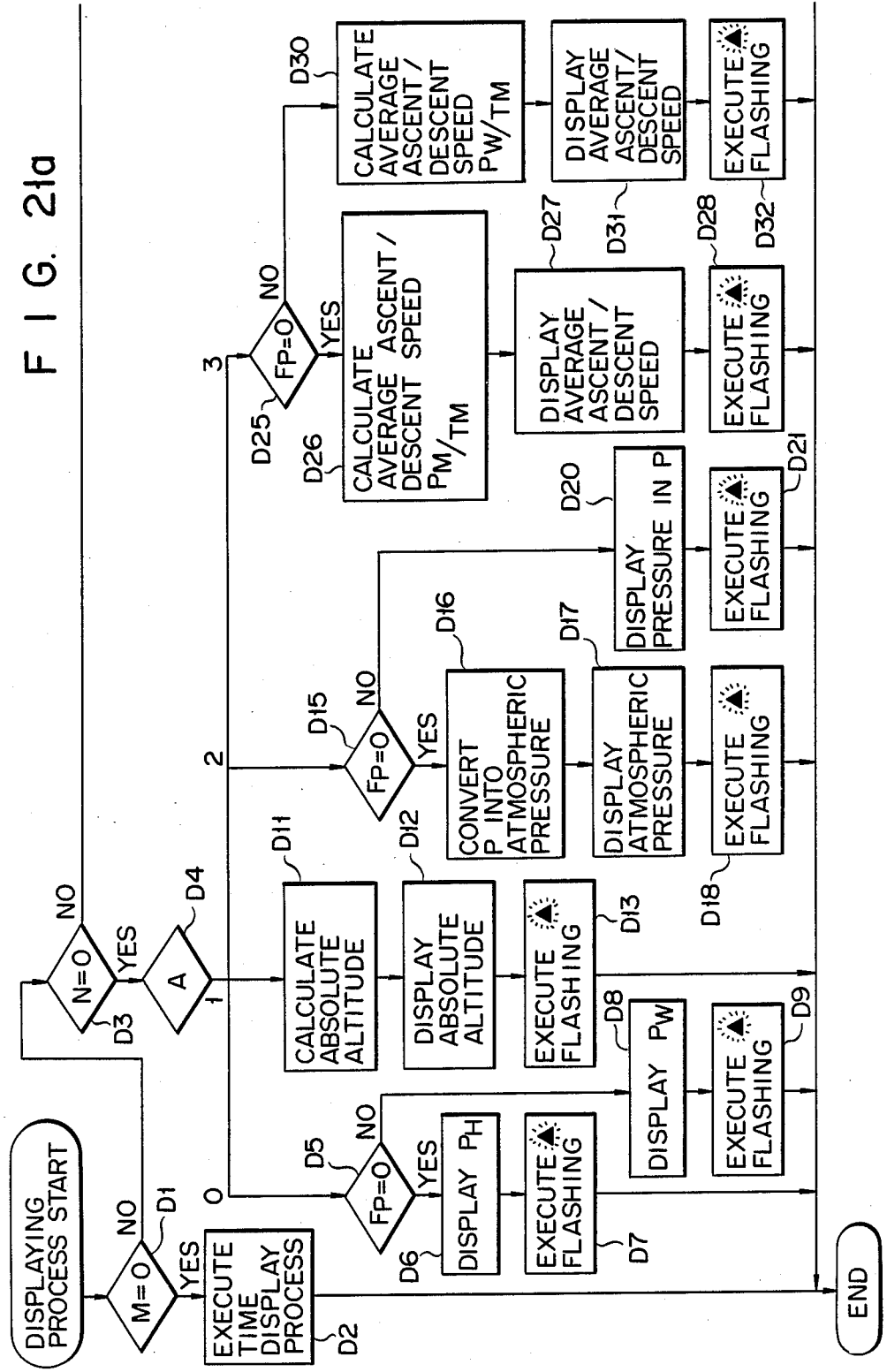
Figure 22:
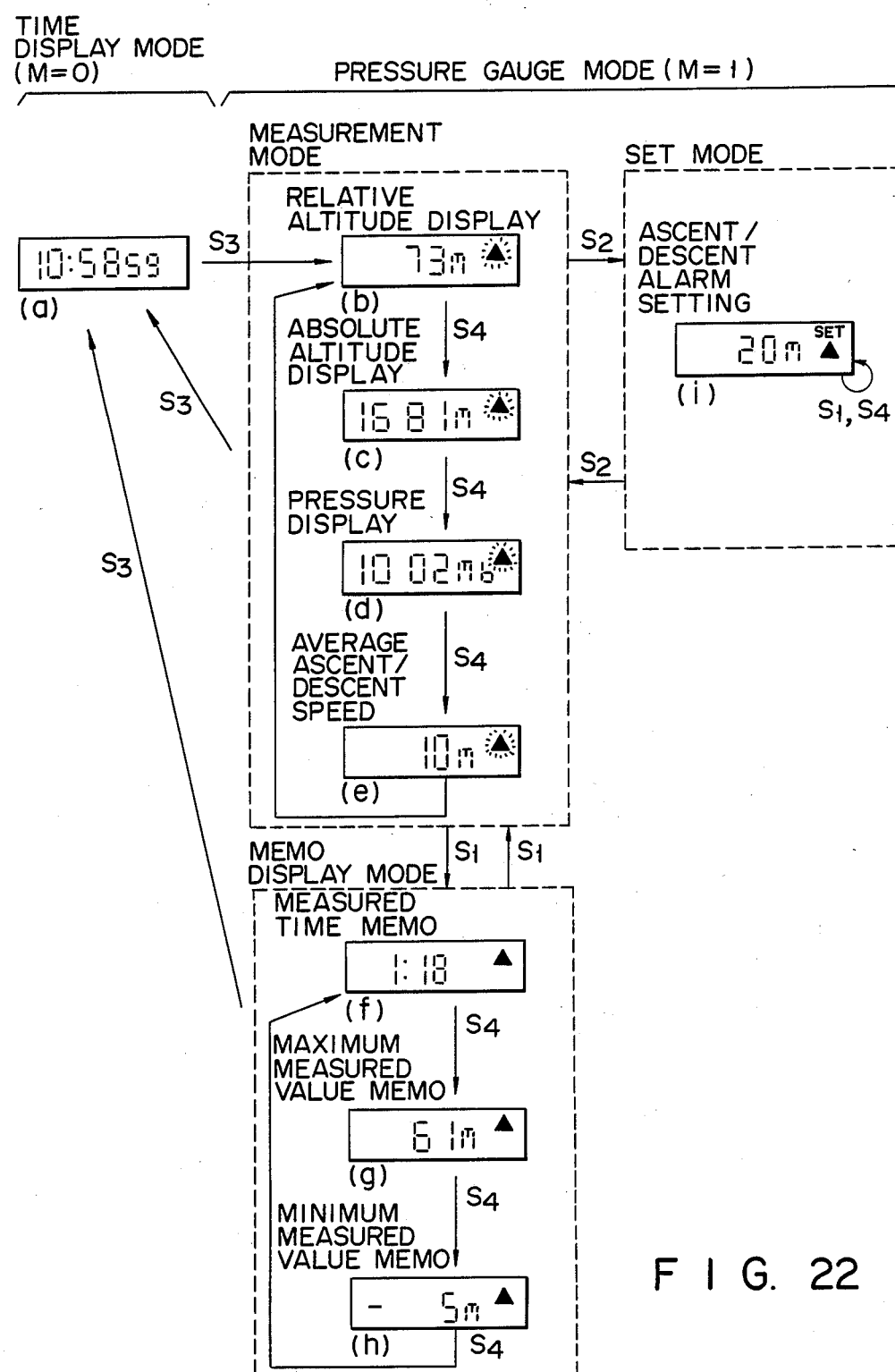
FIG. 22 is an illustration for describing display states in response to the switch operation according to the third embodiment.

Following the switching process (step S2 in FIG. 18), control enters the display process (step S3 in FIG. 18, i.e. the flowchart of FIGS. 21(a)-(b). CPU confirms that the wristwatch has been set in the pressure gauge mode (step D1). Then, CPU designates the measurement mode (step D3). Further, it confirms that the relative altitude display mode is designated (step D4). Then, step D5 is executed. In this step, it is decided whether the wristwatch of this invention is used as the altimeter or the bathometer. On the basis of the result of decision, the content of the corresponding register PH or PW, viz. the relative altitude or the relative water depth, is displayed by display unit 54 (steps D6 and D8). In this case, however, the wristwatch is still in the initial operation at the base point. Therefore, no altitude difference or water depth difference is not generated, having the value of "0". Then, in steps D7 or D9, the triangle mark flashes in the right end on the display panel of display unit 54. The display indicates that the wristwatch is in the measurement mode.

Following the above process, to set the ascent/descent alarm distance, the ascent/descent alarm set mode is set up. In this case, as shown in FIG. 22, push button S2 is operated. In step S32 of FIG. 19, the switch operation is detected. "2" is set in mode counter N in step S33. Then, the control enters the display process. In this process, the control goes through step D61 to reach step D62. In this step, the triangle mark is lit and characters "SET" is displayed.

The ascent/descent alarm distance is set by the set and select method using button switches S1 and S4. In this case, the control goes to step D52. In the step, the ascent/descent alarm set process is executed in which the set value is written into memory AL. Subsequently, the control enters the display process in which the set ascent/descent distance, for example, is displayed (steps D61 and D62).

Upon completion of the initial setting, the operation mode of the wristwatch is returned from the set mode to the measurement mode. In this case, button switch S2 is pushed, as shown in FIG. 22. The switch operation is detected in step S50. The control advances to step S51 where "0" is set in mode counter N. The measurement mode is set up by the value "0". Then, the display process is executed. Step D3 confirms that the measurement mode has been set up. Through steps D4 and D5, the control goes to step D6 or D8. The triangle mark flashes, and the display mode before the set mode is set up.

Through the above initial operation, the setting operation of the basic data necessary for the subsequent process is completed. Accordingly, the wristwatch is ready for the altimeter or the bathometer operation.

(2) Measuring Operation

When in the above mode the measuring point starts to move, that is to say, a user carrying the wristwatch starts the climbing or skin diving, the following operations are performed in the measurement process (step S4) every one second and in the displaying process (step S3). CPU (not shown in detail) sends the operation command signal "c" to pressure sensor 52 and A/D converter 65, which in turn start their operation. Pressure (atmospheric pressure or water pressure), which is changing momentarily, is measured, and the measuring results, i.e. the pressure at the present point, is momentarily loaded into register P (step M1). CPU checks if the pressure set in register P is higher or lower than 1.033 kg/cm$^2$ (one atmosphere). On the basis of the check result, CPU decides whether the wristwatch is used as an altimeter or a bathometer (step M2). If the decision result is that the content of register P is below 1.033 kg/cm$^2$, and the wristwatch is used as an altimeter, flag Fp is reset (step M3), and the control advances to step M4. In this step, CPU reads out the value in register P, and the pressure at the base point as previously set in register P0. Using the read out data, an appropriate operation is conducted to obtain the height from the base point to the present point, i.e. the relative altitude. The height is loaded into register PH.

On the other hand, if step M2 decides that the wristwatch is used as the bathometer, CPU sets flag Fp and goes to step M12. In this step, CPU reads out the values in register P and P0, calculates the depth from the base point to the present point, that is, the relative water depth, and stores the depth into register PW.

Also when the wristwatch is used as either the altitude or the bathometer, following the relative altitude or the relative water depth storing process (step M4 or M12), the ascent/descent alarm process to be described later is executed. When the watch is used as the altitude, the control goes to steps M5 to M10. When it is used as the bathometer, the control goes to steps M13 to M18. In the case of the altimeter, it is checked whether or not ascent or descent of the ascent/descent alarm distance is generated since the previous ascent/ descent alarm (buzzer sound) is generated (step M5). If such movement occurred, CPU further checks if the movement is ascent or descent (step M6). In the case of ascent, the content of register P'H, which has been set till then, is added to that alarm distance to have the relative altitude at that time. CPU updates register P'H by the relative altitude in step M7. Then, buzzer circuit 69 is driven to generate the A sound (step M8). In the case of descent, the alarm distance is subtracted from the content of register P'H which has been stored till then, to have the relative altitude at that time. CPU updates the content of register P'H by this relative altitude in step M9. Then, it drives buzzer circuit 69 to generate the B sound in step M10. For the bathometer, a similar process is used. Specifically, CPU checks if the movement of the alarm distance has been made or not. If yes, CPU further checks whether the movement is diving or surfacing, in step M14. CPU updates the content of register P'W according to the result of the check (step M15 and M17). Then, it drives buzzer circuit 69 to generate the A sound for diving or the B sound for surfacing (step M16 and M18).

After the ascent/descent alarm process, in step M21, an additional time elapse of one second from the measuring timing is recorded into memory TM irrespective of presence or absence of the movement of the ascent/descent alarm distance, that is, the presence or absence of the alarm sound. Then, CPU enters the maximum/minimum storing process in steps M22 to M30. In this process, CPU checks if the watch is operated as the altimeter or the bathometer in step M22. If it operates as the altimeter, the maximum relative altitude during the course of the movement such as descent or ascent from the start of the measurement is compared with the relative altitude at the present point. If the latter is larger than the former, CPU updates the contents of memory $H_{MAX}$ by that value in steps M23 and M24. Then, the minimum relative altitude during the course of the movement from the start of the measurement is compared with the relative altitude at the present point. If the latter is smaller than the former, CPU updates the content of memory $H_{MIN}$ by that value in steps M25 and M26. When it is used as the bathometer, the process is also executed in which the maximum and minimum relative depths are stored into memories $W_{MAX}$ and $W_{MIN}$. See steps M27 to M30.

After the above process, the control by CPU enters the display process. In this process, CPU goes through steps D3 and D4, and reaches step D5. In this step, CPU checks if the watch serves as the altimeter or the bathometer. On the basis of the result of check, the relative altitude or the relative water depth is displayed by display unit 54 (step D6 or D8). Further, the process for the flashing of triangle mark is executed in step D7 or D9. FIG. 22 shows an example of this display.

(3) Display Change In Measurement Mode

If push button switch S4 is operated when the relative altitude is displayed, an absolute altitude is displayed as shown in FIG. 22.

The switch operation is detected in step S22. The increment process to increment the content of display counter A by 1 is executed and set to "1", in step S23. In step S24, it is confirmed that the content of display counter A has been set to "1". In step S25, it is checked whether or not the wristwatch is used as an altimeter or a bathometer. When it is used as the altimeter, not the bathometer, step S27 confirms that the content of display counter A does not yet reach 4. Then, control goes to the display process. In step S25, when the wristwatch operates as the bathometer, the content of display counter A is forcibly set from "0" which has been kept up to that time, to "2". This is made for avoiding being set to "1" in the counter. In case that the wristwatch operates in the bathometer, the absolute water depth is not displayed.

It is assumed that CPU confirms the wristwatch operates as the altimeter and keeps the value in counter A at "1", and enters the display process. This state is detected in step D4. The control proceeds to step D11. In step D11, absolute altitude (sea level) at the present point is calculated using the pressure at that point as stored in register P. The result of calculation is displayed by display unit 54 (step D12). Further, the process for flashing of the triangle mark is executed (step D13). When the sea level altitude at the present point is 1,681 m, illustrations and the triangle mark are shown in FIG. 22.

The operation of the wristwatch when the pressure at the present point is displayed by liquid crystal display unit 54, will be described. When the absolute altitude is being displayed as shown in FIG. 22, push button button S4 is further operated. This operation is detected in step S22. The increment process for applying +1 to the content of counter A is performed in step S23. By this process, the counter is set to "2", the control goes through step S24 to step S27. As described above, when the wristwatch operates as the altimeter, the content of display counter A never becomes "1" and remains "0". By merely operating switch S4 one time, "2" is set in display counter A. And the control goes to step S27. When "2" is set in display counter A, and the control reaches step S27 as described above, the control enters the display process in either case. Control goes from step D4 to step D15. In step D15, it is determined whether the wristwatch is used as the altimeter or the bathometer. When it is used as the altimeter, the pressure at the present point as set in register P is converted into atmospheric pressure in mb. The result is displayed by display unit 54 (steps D16 and D17). Further, the process for flashing of the triangle mark at the right end is executed (step D18). At this time, the display is made as shown in FIG. 22. When the wristwatch is used as the bathometer, the pressure (kg/cm$^2$) as set in register P is displayed by display unit 54 (step D20). The triangle mark also flashes (step D21).

As described above, when the pressure is being displayed, if push button switch S4 is pushed, the average ascent/descent speed is displayed by display unit 54, as shown in FIG. 22. In this case, the switch operation is detected in step S22. CPU sets "3" in display counter A in step S23, and goes through steps S24 to S27 and enters the display process. In this process, CPU confirms whether or not "3" is contained in display counter A in step D4, and jumps to step D25. In this step, CPU decides whether the watch functions as the altimeter or the bathometer. If it functions as the bathometer, the relative altitude at the present point as stored in register PH is divided by the time elapse from the pressure measurement start as set in memory TM, viz. the time elapse from the base point (step D26). Then, the result of division is displayed and flashing display of the triangle mark is made in steps D27 and D28. When the watch is used as the bathometer, the relative altitude at the present point as set in register PW is divided by the time set in memory TM, to obtain the average ascent/descent speed (step D30). The result of division is displayed and the triangle mark flashing is made (steps D31 and D32). FIG. 22 shows an example of the display in this case.

When the average ascent/descent speed is being displayed, if switch S4 is pushed, display unit 54 displays the relative altitude again as shown in FIG. 22. The switch operation is detected in step S22. The content of display counter A is incremented by "1" to set "4" in this counter (step S23). The control goes through steps S24 and S27, and reaches step S28 where the content of display counter A is set to "0". Subsequently, the control enters the display process, and goes through steps D4 and D5. Finally, display of the relative altitude, for example, and the flashing display of the triangle mark are performed (steps D6 to D9).

As described above, in this measurement mode, the measured data at the present point is cyclically displayed on display unit 54, every time button switch S4 is operated.

(4) Change To Memo Display State

The change of the operation mode to the memo display mode, which is for display the recorded contents after the measurement is started, is possible only from the measurement mode. To this end, switch S1 is pushed, as shown in FIG. 22. The switch operation is detected in step S30, and "1" is set to mode counter N in step S31. Then, the control goes to the display process. In step D35, it is confirmed that "1" has been set in mode counter N. Step D36 is executed in which one of these processes is selected according to the value in display counter B. If "0" has been set in display counter B as the result of the previous processing, the measuring time memo display mode is set up. The control goes to step D37. In this step, the elapse of time after the measurement starts, that is, after climbing, for example, starts, is read out, and displayed on display unit 54. Further, the triangle mark is lit in step D38. These are displayed as shown in FIG. 22.

(5) Display Change In Memo Display Mode

In the above mode, if switch S4 is pushed, the maximum measured value memo display mode is set up, in which the maximum relative altitude or the maximum relative water depth are displayed by display unit 54, as shown in FIG. 22. In this mode, CPU detects this operation in step S41, and sets "1" in display counter B in step S42. CPU confirms this in step D36, and goes to step D40. In this step, CPU checks if the watch is operated as the altimeter or the bathometer. When it is used as the altimeter, CPU causes display unit 54 to display the maximum relative altitude in register $H_{MAX}$ and to light the triangle mark in steps D41 and D42. When it is used as the bathometer, the display unit displays the maximum water depth stored in register $W_{MAX}$ and lights the triangle mark in steps D45 and D46. These are displayed as shown in FIG. 22.

When push botton S4 is depressed in this display mode the minimum measured value memo display mode is set up, in which the minimum relative altitude or the minimum relative water depth are displayed by display unit 54, as shown in FIG. 22. In this mode, CPU detects this operation in step S41, and sets "2" in display counter B in step S42. CPU enters the display process through step S43, and confirms this in step D36, and goes to step D50. In this step, CPU checks if the watch is operated as the altimeter or the bathometer. When it is used as the altimeter, CPU causes display unit 54 to display the minimum relative altitude in register $H_{MIN}$ and to light the triangle mark in steps D51 and D52. When it is used as the bathometer, the display unit displays the minimum water depth stored in register $W_{MIN}$ and lights the triangle mark in steps D55 and D56. These are displayed as shown in FIG. 22. The display shows that the relative minimum altitude is "−5m". The sign "−" indicates that the present place is lower than the base point.

In the above display, if switch S4 is further pushed, the display unit displays the measuring time again, as shown in FIG. 22. In this case, CPU detects this switch operation in step S41, and sets "3" in display counter B in step S42. CPU confirms this in step S44, and resets display counter B in step S44. Then, the display process is executed to display the measured time in steps D36, D37, and D38.

As described above, in the memo display mode, every time switch S4 is pushed, the measured time, maximum measured value, and minimum measured value at that time are cyclically displayed on display unit 54.

(6) Change from Memo Display Mode to Measurement Mode

The change from the memory display mode to the measurement mode is performed by operating switch S1, as shown in FIG. 22. The switch operation is detected in step S45. "0" is set in mode counter N in step S46. Subsequently, the control by CPU enters the display process, and through steps D3 and D4. According to the value in counter A, an appropriate process is executed. The result of the processing is displayed by display unit 54.

(7) Change to Time Display Mode

For changing the operation mode to time display mode, the wristwatch is set in the measurement mode or the memo display mode, and switch S3 is operated, as shown in FIG. 22. Step S10 detects this, and step S11 confirms that the wristwatch is not yet in the time display mode. Further, step S60 confirms that the wristwatch is not in the set mode, that is, it is still in the measurement mode or the memo display mode. Mode flag M is set to "0", and the time display mode is set up (step S61). The signal "b" is transferred to RS FF 13 and this FF is reset (step S62). Subsequently, the display process is executed, in which the present time from time counter 58 is displayed by display unit 54 (step D2).

After the operation mode is changed to the time display mode, if the switch is operated, an appropriate process is executed in step S58. The time obtained after that process is displayed in step D2.

Advantages of Third Embodiment

As seen from the foregoing, in this invention, using a single pressure sensor, the vertical distance from a first point to a second point can be measured, and the time taken for the user to move over this distance can also be measured. The average ascent/descent speed when the user moves over the distance is automatically calculated on the basis of the measured data. Therefore, the user can know the average ascent/descent speed by a simple operation.

Wristwatch Operated in Fourth Mode

FIGS. 23 through 33 show a wristwatch operated in fourth mode according to a fourth embodiment of the present invention. The wristwatch equipped with a pressure sensor is so constructed that, in the water depth mode, not only water depth but also decompression data such as decompression points and decompression time, which is used when the diver surfaces above water, are displayed according to the U.S. Navy Decompression Tables.

Arrangement of Wristwatch

Figure 23:
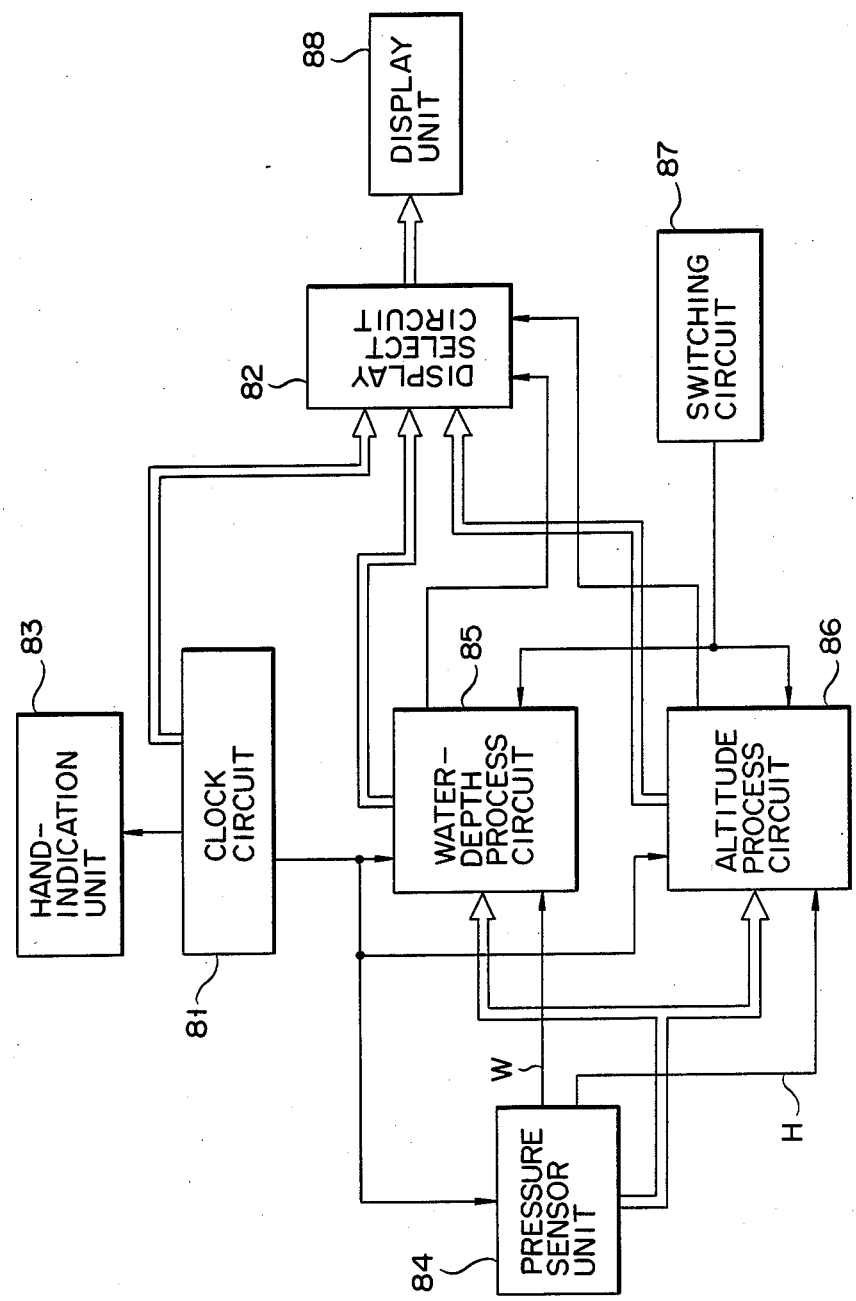
FIG. 23 is a schematic block diagram of an electronic wristwatch according to a fourth preferred embodiment.

FIG. 23 shows a block diagram of the fourth embodiment. Reference numeral 81 designates a clock circuit. Clock circuit 81 outputs time data to display select circuit 82. It also supplies a drive signal to hand indication unit 83, to display the time by hands. Numeral 84 designates a pressure sensor unit. Pressure sensor unit 84 outputs pressure data to water-depth process circuit 85 and altitude process circuit 86. If the pressure sensor is 1.033 kg/cm$^2$ or above, pressure sensor unit 84 outputs an operation signal W to water depth process circuit 85, to cause circuit 85 to operate. If the pressure data is 1.033 kg/cm$^2$ or below, pressure sensor unit 84 outputs an operation signal H to altitude process circuit 86, to cause circuit 86 to operate. Water depth process circuit 85 and altitude process circuit 86 obtain various data from the pressure data, in response to the operation of switching unit 87, and output the obtained data to display select circuit 82. Display select circuit 82 selectively outputs the data supplied from water depth process circuit 85 and altitude process circuit 86 to display unit 88 to display the data.

Figure 24:
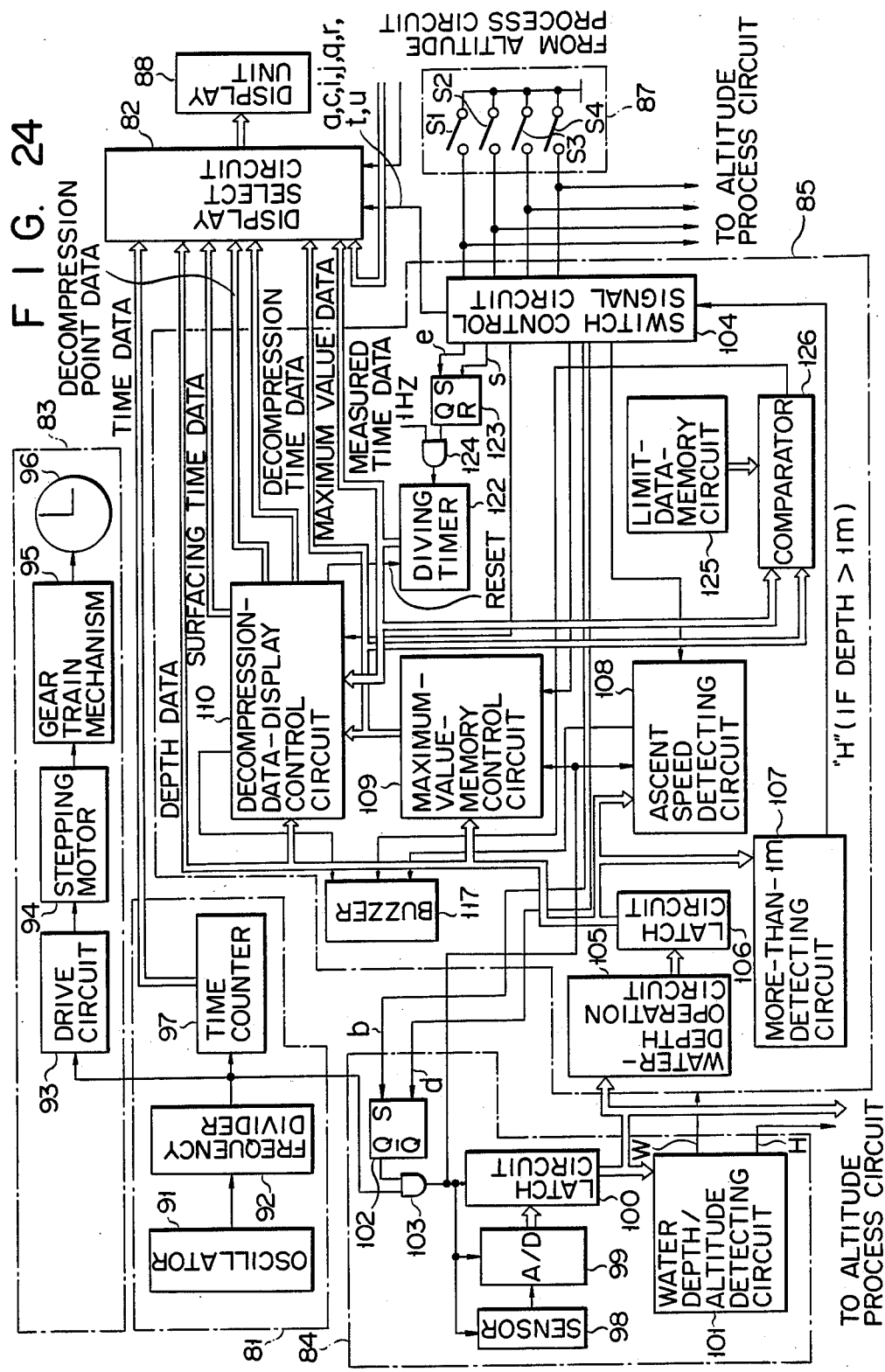
FIG. 24 is an internal circuit diagram of the wristwatch shown in FIG. 23.

FIG. 24 shows a circuit configuration of the circuit in FIG. 23 with the altitude process circuit being excluded. In the figure, oscillator 91 is an oscillating circuit for generating a clock signal at a reference frequency. The clock signal generated by oscillator 91 is transferred to frequency divider 92. Frequency divider 92 divides the clock signal at the reference frequency transferred from oscillator 91, and produces a clock signal at a fixed period, and a 1-Hz control signal and the like. The clock signal is used for time processing and the like, which will be described later. The 1 Hz control signal is used as a timing signal for controlling each block to be described later. Driver circuit 93 receives the clock signal transferred from frequency divider 92, and produces a drive signal for stepping motor 94. Stepping motor 94 drives hands 96 via gear train mechanism made up of cogwheels, for example (not shown), to perform analog time display by hands. Time counter 97 receives the clock signal transferred from oscillator 91. Time counter 97 outputs a time count signal to display select circuit 82. Digital time display is performed in display unit 88 in response to a control signal from switching unit 87 to be described later.

Sensor 98 is a pressure sensor made of, for example, semiconductor. Sensor 98 is provided in the bathometer main body to detect a water pressure. A/D converter 99 is supplied with an analog signal detected by pressure sensor 98, and outputs a digital signal of the pressure data to latch circuit 100. The output of latch circuit 100 is transferred to water depth/altitude detecting circuit 101, which determines whether the pressure data is less or more than 1.033. If it is 1.033 or above, water depth/altitude detecting circuit 101 outputs an operation signal W to water depth process circuit 85 to cause the circuit to operate. If less than 1.033, an operation signal H is output to altitude process circuit 86 to cause the circuit to operate. When sensor 98, A/D converter 99 and latch circuit 100 operate, the 1 Hz control signal transferred from frequency divider 92, and the output signal of AND circuit 103 which receives the output signal of flip-flop (FF) 102, are used for their timing signals. FF 102 is set and reset by control signals "b" and "d" which respectively represent the watch mode and pressure gauge mode, and are transferred from switch control circuit 104 to be described later. Specifically, in the pressure gauge mode, the pressure is measured every 1 second, and stored in latch circuit 100. In the watch mode, the measurement is stopped. The pressure data output from latch circuit 100 is converted into water depth data by water depth operating circuit 105 and the converted data is stored in latch circuit 106 for water depth measurement.

Water depth data stored in latch circuit 106 is applied to more-than-1m detecting circuit 107, ascent speed detecting circuit 108, maximum value storing control circuit 109, decompression data display control unit and display select circuit 82. More-than-1m detecting circuit 107 receives the water depth data stored in latch circuit 106. More-than-1m detecting circuit 107 outputs an "H" (high level) signal if the water depth data is 1 m or above. If the data is 1 m or below, an "L" (low level) signal is output. These signals are applied to switch control circuit 104.

FIG. 25 shows in detail ascent speed detecting circuit 108 in FIG. 24. In the figure, AND circuit 111 fetches the water depth data stored in latch circuit 106 in response to a timing signal. This timing signal is produced by delaying the 1 Hz control signal transferred from frequency divider 92 by a predetermined time by two delay FFs 112 and 113 connected in series. AND circuit 111 outputs the data to latch circuit 114 for speed detection. The water depth data stored in latch circuit 114 is applied to ascent speed detecting unit 115. AND circuit 116 receives a timing signal produced by delaying the 1Hz control signal transferred from frequency divider 92 by delay FF 112 by a predetermined time. AND circuit 116 is also supplied with a control signal "q" for the decompression data display mode transferred from switch control signal circuit 104 to be described later. AND circuit 116 outputs a timing signal for supplying the water depth data to ascent speed detecting unit 115. Ascent speed detecting unit 115 receives the water depth data stored in latch circuit 106, and the water depth data which is stored in latch circuit 114 approximately 1 second earlier, in response to the timing signal as output from AND circuit, which is produced by delaying the control signal by delay FF 112 by a predetermined time. The ascent speed is calculated from the change between these water depth data. If the calculated speed is, for example, 30 cm/s or above, "H" (high level) signal is output to buzzer 117. Buzzer 117 issues a buzzer sound, in response to "H" (high level) signals output from ascent speed detecting unit 115, decompression data display control circuit 110 to be described later, and comparator 126.

FIG. 26 shows in detail maximum value memory control circuit 109 in FIG. 24. In the figure, AND circuit 118 fetches the water depth data stored in latch circuit 106 for water depth measurement, at a predetermined timing, and outputs the data to memory 119. Memory 119 stores the water depth data, and supplies the water depth data to maximum value comparator 120, decompression data display control circuit 110 and comparator 126. Maximum value comparator 120 fetches the value (A) of water depth data stored in memory 119 and the the value (B) of water depth data stored in latch circuit 106 in response to a timing signal as produced by 1-Hz control signal and output via delay FF 121. These values are compared. Only if A<B, an "H" (high level) signal is output to AND circuit 118. Memory memory 119 is updated only if the measured value is larger than the water depth data stored previously. Therefore, memory 119 stores the maximum water-depth data. Memory 119 is cleared by a control signal "s" output from switch control circuit 104 to be described later.

In FIG. 24, diving timer 122 is an adder timer circuit which is started and stopped responsive to the output signal of AND circuit 124. AND circuit 124 receives the 1-Hz signal transferred from frequency divider 92 and the output signal of FF 123. FF 123 is set and reset by a more-than-1m detect signal "e" transferred from switch control circuit 104 to be described later, and rest timer start signal "s". Diving timer 122 starts measuring the diving time, when a depth of more than 1 m is detected, and stops the measuring when reset timer starts. Timer 122 is reset by the reset signal output from decompression data display control circuit 110.

Limit-data-memory circuit 125 is a memory circuit made up of ROM and the like. Limit data memory circuit 125 stores a table for no-decompression limit data which represents the limit time (minutes) that the diver can surface without decompression, with respect to a specific water depth, as shown in FIG. 24. Maximum water depth data stored in memory 119 of maximum value storing control circuit 109, and the diving time from diving timer 122 are respectively compared with the corresponding water depth data and limit time in limit data memory circuit 125. Only if it is impossible to surface without decompression, "H" (high level) signal is output to buzzer 117.

FIG. 27 shows in detail the decompression data memory unit 110. In the figure, maximum water depth memory circuit 127 stores the maximum water depth data in maximum value storing control circuit 109. Maximum water depth memory circuit 127 stores the maximum water depth data from memory 119 of maximum value storing control circuit 109 in response to the output of AND circuit 128. AND circuit 128 receives a control signal "k" which is transferred from switch control circuit 104 to be described later, when water depth mode is switched to decompression mode. Diving time memory circuit 129 stores the diving time transferred from diving timer 122. Diving time memory circuit 129 stores the diving time from diving timer 122 in response to the output of AND circuit 130. AND circuit 130 receives the control signal "k" from switch control circuit 104, which is also used for maximum water depth memory circuit 127.

First-diving-decompression-data read-out circuit 131 receives maximum water depth data stored in maximum water depth memory circuit 127, and the diving time stored in diving time memory circuit 129, and reads out the corresponding data in the decompression table stored in decompression data memory unit 132. Decompression data memory unit 132 is made up of ROM and the like for storing data such as a table for group symbol conversion and a table for repetitive diving time.

Figures 29, 30A:
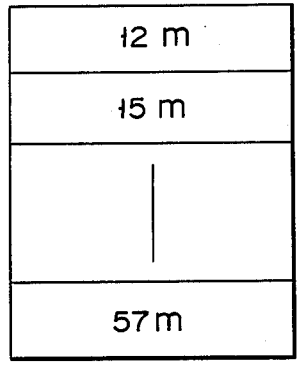
FIG. 29 is a representation of no-compression limit data.
FIG. 30(a) represents a decompression table.

FIGS. 30(a)-(b) show in detail the decompression table. FIG. 30 (a) shows an overall decompression table. Water depths ranging from 12 m to 57 m are illustrated in 3 m steps. FIG. 30 (b) shows in detail the decompression data at depths of 27 m and 30 m. For, example, for diving time of 70 minutes at water depth of 27 m, the diver decompresses for 7 minutes at water depth of 6.0 m or a decompression point, and then after surfacing up to water depth of 3.0 m, he decompresses for 30 minutes. In this case, the total surfacing time is 38 min. 30 sec., provided that the ascent speed is 30 cm/s. For repetitive diving to be given later, repetition symbol N is used.

Decompression points, decompression time and total surfacing time read out from decompression table in decompression data memory unit 132 by decompression data read-out circuit 131, are respectively stored in decompression point water depth memory circuit 133, decompression time timer 134 and total surfacing time memory circuit 135. Decompression point data in decompression point water depth memory circuit 133 is transferred to display select circuit 82. The data is displayed in display unit 88 in response to a control signal "u" for the decompression point supplied from switch control circuit 104. At the same time, the decompression data is transferred to coincidence circuit 136. Coincidence circuit 136 compares the water depth data stored in latch circuit 106, and the decompression point stored in decompression point water depth memory circuit 133. When the two coincide, a coincident signal is output to OR circuit 137 and decompression timer 134. In response to the coincident signal, OR circuit 137 outputs an "H" (high level) signal to buzzer 117. Decompression time timer 134 is a subtraction timer which starts its operation in response to the coincident signal, and outputs a signal to display select circuit 82 and zero detecting circuit 138. Zero detecting circuit 138 detects a zero signal of decompression timer 134, and outputs to OR circuit 137, an "H" (high level) signal for energizing buzzer 117 to OR circuit 137. Zero detecting circuit 138 further outputs a read signal for reading out the next decompression data to decompression data read-out circuit 131.

Memory circuit 139 stores the previous diving maximum water depth data, when repetitive diving is performed. Previous diving maximum-water-depth memory circuit 139 reads out and stores the maximum-water-depth data from maximum water depth memory circuit 127 in response to the output of AND circuit 140. AND circuit 140 receives a control signal, i.e., rest timer start signal "s", which is transferred from switch control circuit 104 when the measurement mode is switched to the non-measurement mode. Memory circuit 141 stores the previous diving time, when repetitive diving is performed. Like maximum-water-depth memory circuit 139, this memory circuit 141 reads out and stores the diving time from diving time memory circuit 129 by AND circuit 142. AND circuit 142 receives the control signal "s" transferred from switch control circuit 104. Rest timer 143 is an addition timer which counts the rest time from the end of a first diving till repetitive diving is started. AND circuit 155 receives the output signal from FF 144 and the 1-Hz signal. Rest timer 143 is started and stopped by the output signal from FF 144, and the output signal of AND circuit 155 which receives the 1 kHz signal. FF 144 is set by the control signal transferred from switch control circuit 104 to be described later, i.e., the rest timer start signal "s". FF 144 is reset by the output signal of OR circuit 157. OR circuit 157 receives a control signal "e" for more-than-1m detection, which is transferred from switch control circuit 104, and a detect signal from 12-hours detecting circuit 156 to be described later. FF 144 is reset by the output signal of OR circuit 157. 12-hours detecting circuit 156 detects whether rest timer 143 has counted twelve hours or not. The detect output of 12-hours detecting circuit is transferred to rest timer 143 as a reset signal. The output of detecting circuit 156 is also transferred to OR circuit 157 as an reset signal. It is also supplied to OR circuit 157, as the reset signal from FF 144.

When the rest time is less that 10 minutes, rest timer 143 outputs an "H" (high level) signal. The "H" signal is transferred to decompression data read-out circuit 131, as an operation signal. The signal is also transferred to repetitive diving decompression data read-out circuit 159 via inverter 158, as an operation signal. The output from reset timer 143 is applied to one-shot multivibrator circuit 169 via inverter 160. The output of one-shot multivibrator circuit 161 is transferred to diving timer 122 as a reset signal. Accordingly, the rest time has passed 10 minutes, diving timer 122 is reset to "0".

Read-out circuit 159 reads out the data from decompression data memory unit 132, when the repetitive diving is performed. In the case of repetitive diving, the group symbol conversion table and the repetitive diving time table are used, in addition to the decompression table stored in decompression data memory unit 132. The group symbol conversion table, as shown in FIG. 31, is a table from which group symbols are selected according to the repetition symbol of the previous diving, and the rest time. In FIG. 31, reset time is typically illustrated with respect to repetition symbol N. Other data are omitted. As shown in FIG. 32, from the repetitive diving time table, time to be added to the actual diving time can be obtained from the group symbol as selected from the group symbol conversion table and the repetitive diving water depth. In FIG. 32, data for symbol H and the related repetitive water depth are typically used, while other data are omitted. Read-out circuit 159 reads out the repetitive symbol of the decompression table, on the basis of the maximum water-depth in previous diving maximum depth memory circuit 139, and the diving time data in previous-diving-time memory circuit 141. Then, on the basis of the read out group symbol, and the maximum water depth data in maximum water depth memory circuit 127 in the repetitive diving, time data is read out which is to be added to the diving time in the repetitive diving time table. Next, the decompression stop point, decompression time and total surfacing time are read out from the decompression table in decompression data memory unit 132. These pieces of data are as the sum of the diving time (actual repetitive diving time) in diving data memory circuit 129, and the above time data. These pieces of read out data are respectively output to decompression point water depth memory circuit 133, decompression time timer 134 and total surfacing time memory circuit 135.

Figure 28:
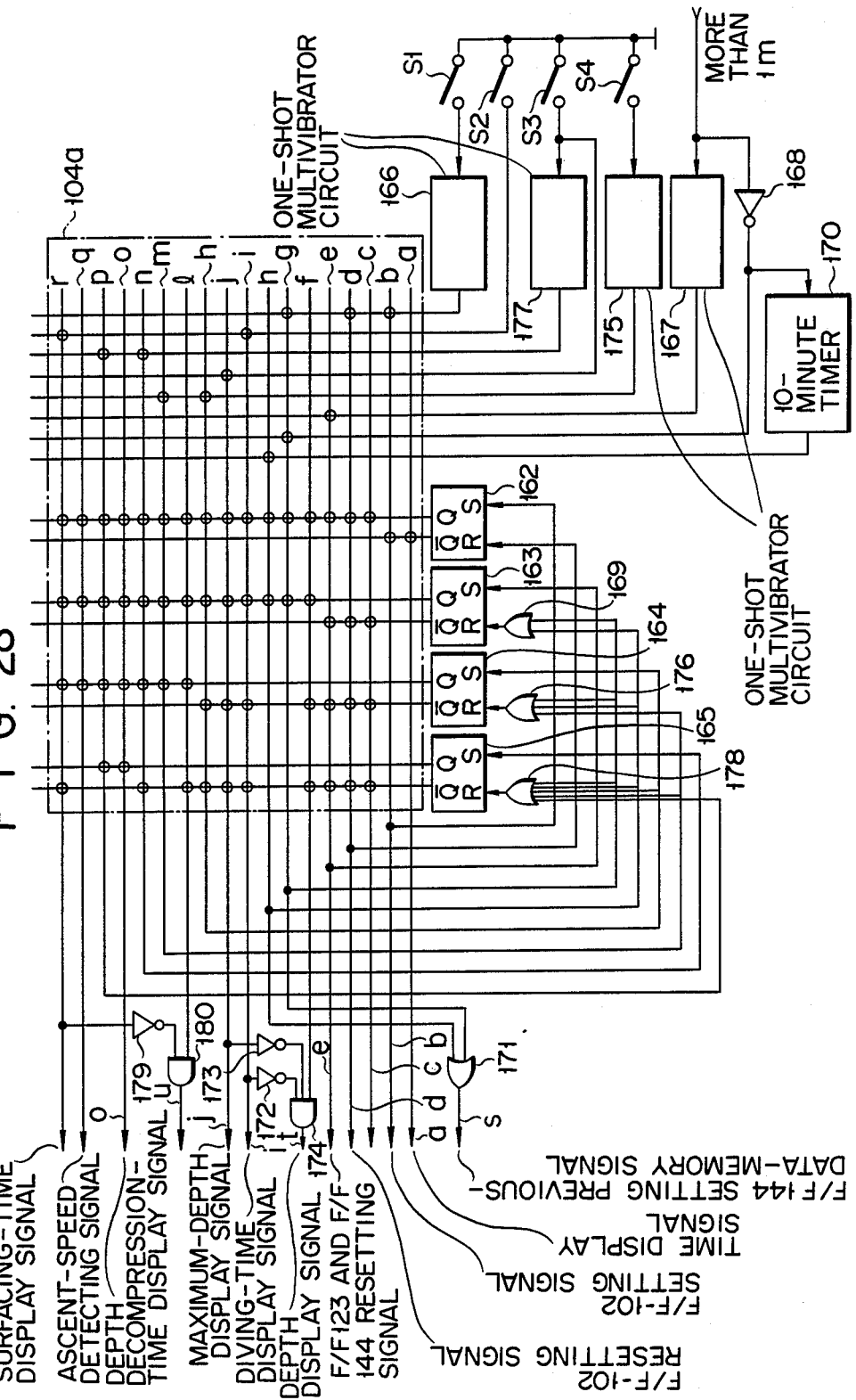
FIG. 28 is a detailed block diagram of the switching control circuit in FIG. 24.

FIG. 28 shows in detail switch control circuit 104 of FIG. 24. This figure shows the display mode, and how the control signal for each block is generated.

Switch control circuit 104 comprises four FFs for selecting the display mode, and control signal generating circuit 104a. A first FF 162 is for selecting either watch mode or pressure gauge mode. A second FF 163 is for selecting either measurement mode or nonmeasurement mode, when pressure gauge mode is used as a bathometer. A third FF 164 is for selecting either water depth measurement mode or decompression data display mode. A fourth FF 165 is for selecting the alternate display of bathometer measurement display or the decompression timer display. Control signal generating circuit 104a is configured in a matrix fashion. Gates are provided at intersections of a plurality of lines that are arranged in the row and column directions. These intersections are marked with symbol "O". The row lines produce "H" signals when all the gates with symbol "O" receives with "H" signals from the row lines.

In the initial stage, the first through fourth FFs 162 through 165 are all reset. Control signal generating circuit 104a outputs a time display signal "a" to display select circuit 82, to set up the watch mode. If key S1 is operated, one-shot multivibrator circuit is triggered and a signal "b" is output from control signal generating circuit 104a. The output signal "b" sets the FF 102 and the first FF 162, to switch the watch mode to pressure meter mode. Then, control signal generating circuit 104a generates a signal "c". The signal "c" is output to display select circuit 82, to display "Om". If key S1 is operated again, one-shot multivibrator circuit 166 is triggered, and control signal generating circuit 104a outputs a signal "d". The output signal "d" resets FF 102 and first FF 162. Pressure gauge mode is switched to the watch mode.

With the wristwatch set in the pressure gauge mode, the diver dives into the water. If an "H" signal (generated when a depth of more than 1 m is detected) is output from more-than-1m detecting circuit 107. The signal triggers one-shot multivibrator circuit 167. Then, control signal generating circuit 104a outputs a signal "e". The signal "e" sets FF 123, drives diving timer 122, and resets FF 144 via OR circuit 157 to stop rest timer 143. The signal further sets second FF 163, to switch the non counting mode to counting mode, and causes a signal "f" to be generated.

In the counting mode, when an "L" signal (generated when a depth of less than 1 m is detected) is output, and the output of inverter 168 is at "H" level, if key S1 is operated and one-shot multivibrator circuit 166 is triggered, a signal "g" is output from control signal generating circuit 104a. The output signal "g" resets second FF 163 via OR circuit 169, to switch the counting mode to non counting mode. Similarly, in the counting mode, the signal, which is generated for a depth of less than 1 m, is input to 10-minute timer 170. When ten minutes has elapsed, and timer 170 outputs an "H" signal, control signal generating circuit 104 outputs a signal "h". The signal "h" resets second FF 163 via OR circuit 169, to switch the counting mode to non counting mode. The output signals "g" and "h" are input to OR circuit 71, which causes signal "s". The signal "s" sets FF 144, and is used as a timer start signal for rest timer 143. The signal "s" is also imput to AND circuits 140 and 142, and used as a signal for storing maximum water-depth and diving time in previous-diving-maximum-water-depth memory circuit 139 and previous diving time memory circuit 141, respectively.

In the counting mode, if key S2 or Key S3 is set to the hold position, control signal generating circuit 104a generates a signal "i" for key S2, and signal "j" for S3. The signal "i" or "j" is output to display select circuit 82. For the signal "i", display section 88 displays diving time during the "hold" operation. For the signal "j", display section 88 displays maximum water depth during the "hold" operation. The signal "f" is directly input to 3-input AND circuit 174, which "j", causes a signal "t". As for the signals "i" and "j", they are input to 3-input AND circuit 174, via inverters 172 and 173, respectively, to cause a signal "t". The signal "t" is output to display select circuit 82. Then, the water depth data stored in latch circuit 106 for water depth measurement, is displayed in display unit 88, when key S2 or S3 is not set to the hold position.

When the decometer is in the counting mode, if key S4 is operated, one-shot multivibrator circuit 175 is triggered. Then, control signal generating circuit 104a outputs a signal "k". The signal "k" sets third FF 164 to switch the water depth measurement mode to decompression data display mode, and causes a signal "1" to be generated. In the decompression data display mode, if key S4 is operated again, one-shot multivibrator circuit 175 is triggered to cause a signal "m" to be output. The signal "m" resets third FF 164 via 3-input OR circuit 176, to switch the decompression data display mode to water depth measurement mode. The signals "g" and "h" also reset third FF via OR circuit 176.

In the decompression data display mode, if key S3 is operated, one-shot multivibrator circuit 177 is triggered. Then, the control signal generating circuit 104a outputs a signal "n". The output signal "n" sets forth FF 165 to produce a signal "o". The signal "o" is output to display select circuit 82. Then, the display unit 88 alternately displays the water depth and decompression time for every 1 second. In the 1-second alternate display mode, if key S3 is operated again, one-shot multivibrator circuit 177 is triggered. Then, control signal generating circuit 104a outputs a signal "p". The signal "p" resets fourth FF 165 via 5-input OR circuit 178, to set up again the decompression point display in the decompression data display mode. 5-input OR circuit 178 receives signals "g", "h", "k" and "m". In the decompression data display mode, a signal "q" is generated. The signal "q" is output as an operation signal for ascent speed detecting circuit 108.

In the decompression data display mode, if key S2 is set to the hold position, a signal "r" is output. The signal "r" is transferred to display select circuit 82. During the "hold" operation, display unit 88 displays the total surfacing time stored in total surfacing time memory circuit 135. The signal "1" is directly input to AND circuit 180. The signal "r" is input to AND circuit 180 via inverter 179. AND circuit 180 then outputs a signal "u". The signal "u" is output to display select circuit 82. Then, display unit 88 displays the decompression point data.

Next, the circuit operation of the embodiment thus constructed will be briefly described. To describe this, display operation based on the operation of keys S1 to S4 when a typical diving is performed, is taken as an example.

Figure 33:
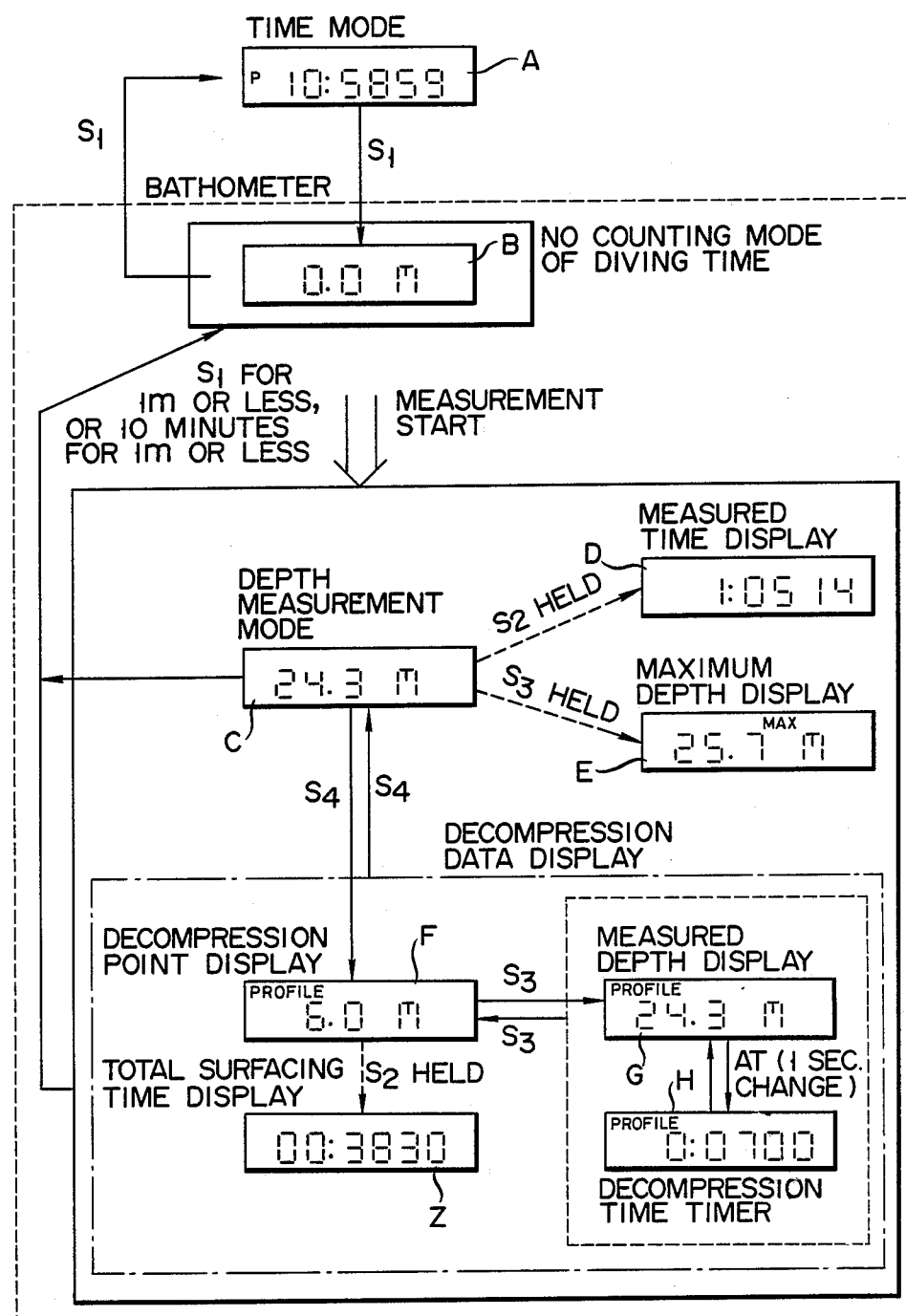
FIG. 33 is an illustration for explaining display states of the display unit.

FIG. 33 shows various displays of display unit 88, which result from the key operations.

Prior to a dive, if the wristwatch is in the watch mode, first to fourth FFs 162 to 165 in switch control circuit 104 are all reset. In response to the signal "a", display unit 88 displays the time, for example, 10:58:59, as shown in FIG. 33. If key S1 is operated, first FF 162 is set, and the watch mode is switched to the pressure gauge mode. In response to the signal "c", display unit 88 displays "0 m" as shown in FIG. 33. If key S1 is operated again, the pressure gauge mode is returned to the watch mode, and the time is displayed again.

Now, the diving is started, and when diving down to a depth of more than 1 m, more-than-1m detecting circuit 107 outputs an "H" signal to switch control circuit 104. Control signal generating circuit 104a outputs the signal "e". This signal sets second FF 163, to switch the non counting mode to counting mode. At the same time, diving timer 122 starts its operation. When diving down more than 1 m, and the wristwatch is in the water depth measurement mode, the display unit 88 displays the water depth. For example, if the diver is at the water depth of 24.3 m, pressure data sensed by sensor 98 is converted into water depth data, and display such as "24:3 m" is performed, as shown in FIG. 33. If key S2 is set to hold position, control signal generating circuit 104a outputs the signal "i". The time measured by diving timer 122 is displayed. If key S3 is set to hold position, a signal "j" is output. Then, the maximum water depth stored in memory 119 of maximum value storing control circuit 109 is displayed. In this example of a dive, as shown in FIG. 33, if 1 hour 5 minutes 14 second has elapsed at the maximum water depth of 25.7 m, "1:5:14" is displayed during the hold of key S2, and "25.7 m" is displayed during the hold of key S3.

When an ascent is started, if key S4 is operated, third FF 164 is set. Water-depth measurement mode is switched to decompression data display mode. Display unit 88 displays a first decompression point. The decompression points and the decompression time are read out from the decompression table (FIG. 30(b)), which is stored in decompression data memory unit 132, on the basis of the maximum water depth and the diving time. In the above example, from the water depth of 27 m and the diving time of 70 minutes (if the data is between two values tabulated in the table, the large one is used), it is recognized that a first decompression time is 7 minutes with a decompression point at water depth of 6.0 m, a second decompression time is 30 minutes with decompression point at water depth of 3.0 m, and the total surfacing time is 38 minutes and 30 seconds. Display unit 88 displays "6 m", i.e., the water depth of the first decompression point. If key S3 is operated, fourth FF 165 is set. In response to the signal "o", 1-second alternately display of water depth measurement display and the decompression timer is performed in display unit 88, as shown in FIG. 33. In the above example, "24.3 m" as the water depth, and "b 7 minutes" as the decompression time are displayed. If key S2 is set to the hold position, in response to the signal "r", the total surfacing time 38 minutes and 30 seconds is displayed while key S2 is set to the hold position, as shown in FIG. 33.

When water-depth measurement mode is switched to decompression data display mode by the operation of key S4, the maximum water depth data in memory 119, and the diving time in diving timer 122 are compared with the data in the no-decompression limit data table stored in limit data memory circuit 125. Specifically, of the water depth in the no-decompression limit data table, the limit time for the water depth which is larger than and proximate to the maximum water depth data, is compared with the surfacing time in diving timer 122. If the diving time exceeds the limit time, comparator 126 outputs an "H" signal to buzzer 117, to drive buzzer 117 to alarm that the surfacing is impossible without decompression. For example, for diving time of 30 minutes or more at water depth of 27 m, the diver surfaces after decompression.

During an ascent for decompression, if the speed is more than 30 cm/s, the speed is detected by ascent speed detecting circuit 108. Buzzer 117 is driven, to indicate the diver that the ascent speed is faster than the predetermined speed. When 7 minutes have passed at the first decompression point (water depth 6 m), the second decompression point (water depth 3.0 m) is displayed. By operating key S3, the water depth and the decompression time are alternately displayed for every 1 second. When 30 minutes have elapsed at the decompression point at 3.0 m, the diver surfaces. When he arrives at the point within water depth of 1 m, more-than-1m detecting circuit 107 detects the water depth of less than 1 m, and key S1 is operated, or when ten minutes have passed after the detection of the water depth of more than 1 m, in response to the signal "s", diving timer 122 is stopped. Then, rest timer 143 starts counting. At the same time, in response to the signal "s", previous diving maximum water depth memory circuit 139 and previous diving time memory circuit 141 respectively store the previous maximum water depth and diving time. The first diving is thus ended through the above operation.

The operation of the embodiment when repetitive diving is performed, will now be described. For example, after the end of the first diving, the diver rests for two hours. Then, the diver dives for 30 minutes at water depth of 30 m. In this case, when the water depth measurement mode is switched to the decompression data display mode, a repetition symbol N in the decompression table is read out on the basis of the previous maximum water depth and diving time by repetitive diving decompression data read-out circuit 159. On the basis of the repetition symbol N and the rest time (2 hours), a group symbol H in the group symbol conversion table of FIG. 31, is read out. On the basis of the previous group symbol H and the repetitive diving water depth 30 m (stored in maximum-water-depth memory circuit 127), additional time 30 minutes in the repetitive diving time table of FIG. 32, is read out. The time 30 minutes is added to repetitive diving time 60 minutes (stored in diving-time memory circuit 129). Data is read out again from the decompression table, on the basis of the time sum. Specifically, for the diving water depth of 30 m, and the diving time of 90 minutes, a first decompression point at water depth of 9.0 m for 3 minutes, the second decompression point at water depth of 6.0 m for 23 minutes, and the third decompression point at water depth of 3.0 m for 57 minutes, and the total surfacing time of 87 minutes and 40 seconds, are read out. Display operation and the like are the same as those of the first diving.

After the end of a dive, when the rest time has elapsed 12 hours, the time elapse is detected by 12-hours detecting circuit 58, and rest timer 55 is reset. The operation is the same as that of the first diving. In other words, after resting for more than 12 hours, the additional time due to the repetitive diving is not required.

Advantages Of Fourth Embodiment

In this embodiment, on the basis of the diving water depth and the diving time, when no-decompression condition comes to its limit, this is detected, and an alarm is issued. Further, when decompression is necessary, decompression data, i.e., decompression points and the decompression time are displayed. This can provide the safe diving.

Watch Operated In Fifth Mode

FIGS. 34 through 41 show a wristwatch operated in fifth mode according to a fifth embodiment of the present invention. This embodiment is so designed that in the altimeter mode, upon setting a target altitude, the wristwatch displays a difference between this and the actual preset altitude, at predetermined time intervals.

Arrangement Of Wristwatch

Figure 34:
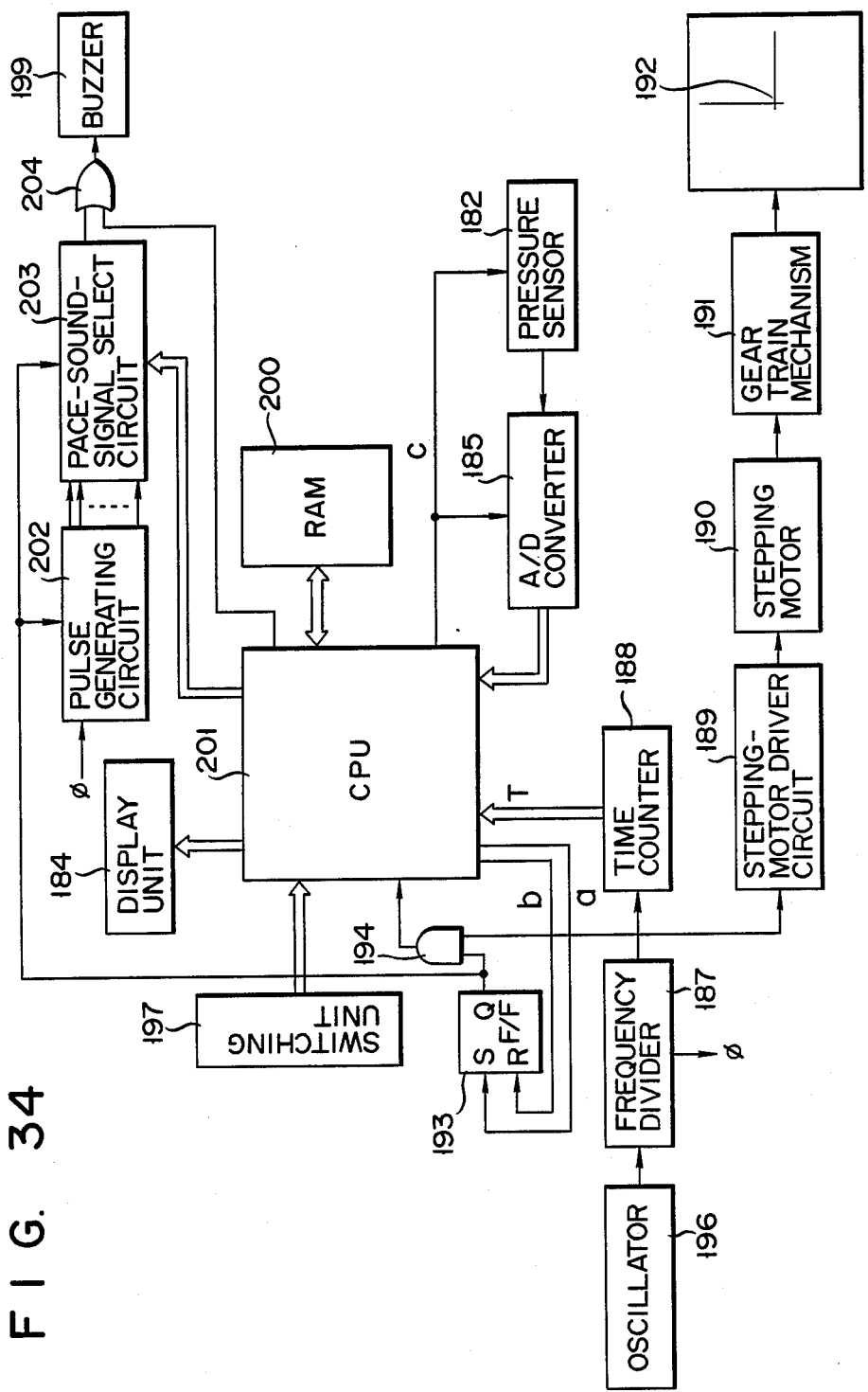
FIG. 34 is a schematic block diagram of an electronic wristwatch according to a fifth preferred embodiment of the invention.

FIG. 34 is a block diagram of this embodiment. Reference numeral 186 is an oscillator, and its output is frequency divided into a signal $\phi$ and a 1 p/s signal by frequency divider 187. The former is sent to pulse generating circuit 202, and the latter is applied to AND gate 194, time counter 188 and stepping motor drive circuit 189. Stepping motor drive circuit 189 receives the 1 p/s signal and drives stepping motor 190. The rotating force of stepping motor 190 is transmitted through gear train mechanism 191, and drives hands 192. Time counter 188 uses hour, minute and second counters, and counts the 1 p/s signal, and then supplies it to CPU 201.

CPU 201 executes various processings under control of a pre-stored micro program, in response to a switch signal from switching unit 197. This embodiment uses a time display mode for displaying time data by display unit 184 and a pressure mode in which the wristwatch functions as an altimeter or a water depth meter. When the operation mode is switched from the time mode to the pressure mode, signal "a" is sent to RS flip-flop 193. By this signal, the flip-flop is set, AND gate 194 is opened, and the 1 p/s signal from frequency divider 187 is introduced as a timing signal for pressure measurement. On the other hand, when the mode is switched from the pressure mode to the time mode, signal "b" is sent to RS flip-flop 193. RS flip-flop 193 is reset, AND gate 194 is enabled to prohibit the 1 p/s signal from being input. In synchronism with the 1 p/s signal, CPU 201 sends operation command signal "c" to pressure sensor 182 and A/D converter 195, which then begin to operate. In this case, pressure sensor 182 detects the pressure at the point where the sensor is located. A/D converter 195 converts it to a digital value in units of $kg/cm^2$, and sends this to CPU 201.

RAM 200 is provided with various registers to be described later. The read and write operation of data for RAM 200 is performed under control of CPU 201.

Pulse generating circuit 202 and pace sound signal select circuit 203 operate in response to operation command signals from RS flip-flop 193. Pulse generating circuit 202 frequency divides signals $\phi$ which is derived from frequency divider 187. By this frequency division, 20 types of pace sound signals (No. 1 to 20) are formed and generated, which are matched with the walking paces of human beings (from fast walking pace to slow walking pace). These pace sound signals are sent to pace sound signal select circuit 203. In response to a pace sound signal designating signal from CPU 201, pace sound signal select circuit 203 selects one signal from the 20 pace sound signals in accordance with the command signal, and sends the selected signal via AND gate 204 to buzzer 199. Buzzer 199 is driven by the pace signal or an alarm signal transferred from CPU 201 via AND gate 204, and emits either a pace sound or an alarm sound.

Display unit 184 displays data sent from RAM 200. In the time display mode, it displays the current time. In the pressure gauge mode, it displays various kinds of measured data.

Figures 35, 36:
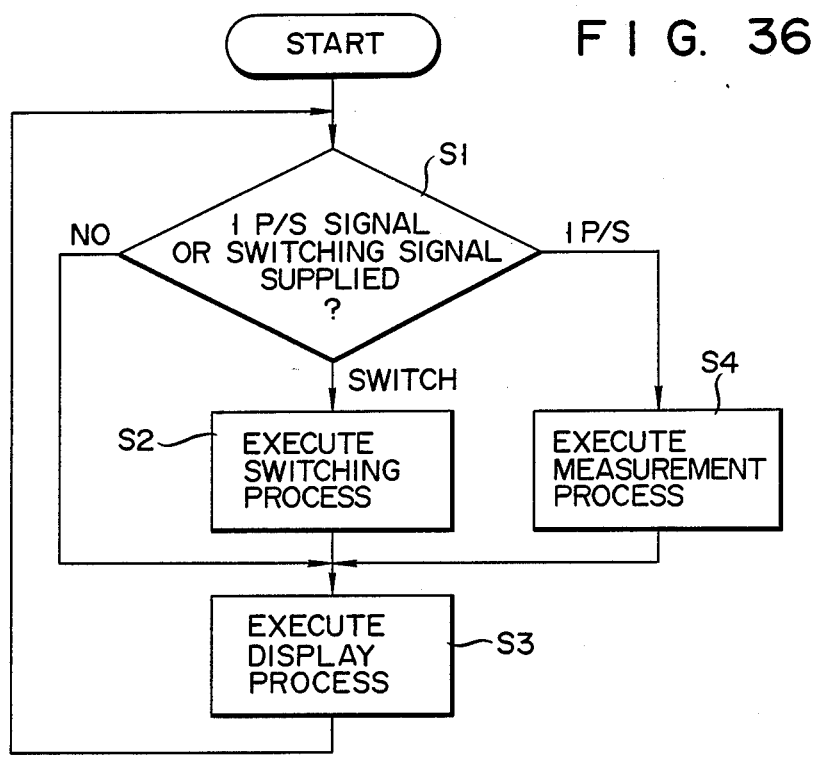
FIG. 35 schematically illustrates a portion of RAM arrangement shown in FIG. 34.
FIG. 36 is a flowchart for representing overall operation of the fifth embodiment.

FIG. 35 shows a major configuration of RAM 200. Register P stores the momentarily changing atmospheric pressures at various points, which are measured at the measuring timing in the altimeter mode. Register P0 stores the pressure at the base point for the altitude. Register H momentarily stores the altitudes of current points relative to that of the base point (hereinafter called "relative altitude"). Memory W is a register for storing the water depth at the present point. Memory TM momentarily stores the time elapsed from the time when measuring was started. Memory AH previously stored the relative altitudes at the target points such as the summit of a mountain and the turn around point in mountain climbing (hereinafter referred to as "target relative altitude"). Memory AT stores a target time taken for one to arrive at the target relative altitude (hereinafter referred to as a target time). Memory ALT stores the check intervals. There is a need for check at fixed time intervals (referred to as "check interval") whether or not the movement such as ascent or descent is performed at a predetermined speed (target altitude/target time). This check will be referred to as "progress check". Register PS stores the number of the pace sound signals which are selected by pace sound signal select circuit 23. Register TM' is used as a ten-second timer when specific measured data to be explained later such as progress check results are displayed for ten seconds at predetermined timings, by display unit 184. Time flag $F_{TM'}$ is reset to indicate that the register TM' is used as a timer. Counter I counts the consecutive number of the next progress check every time the progress check is performed. Mode counter M is a scale-of-2 counter. When its content is "0", the time display mode in which display unit 184 displays time is designated. When it "1", the pressure gauge mode in which the wristwatch operates as either an altimeter or a water depth meter, is designated. Mode counter N is a scale-of-3 counter which operates in the altimeter mode. When its content is "0", the measurement mode is designated in which display unit 184 displays the relative altitude. When it is "1", the set mode is designated in which the target relative altitude and the target time are preset. When it is "2", the automatic display mode is designated in which a time difference between the estimated altitude and the relative altitude of the present point and also the check process result are selectively displayed. Display counter A designates the data, which can be set, in the set mode when mode counter N contains "1". Display counter B designates display data in the automatic display mode when mode counter N contains "2". Flag register Fp is reset to "0" when the wristwatch operates as the altimeter, and is set to "1" when it operates as the bathometer.

Operation Of Fifth Mode

The operation of this embodiment when it is used as an altimeter will be described. FIG. 36 shows a general flowchart giving a general description of the operation. It is determined in step S1 whether or not the switch input from switching unit 197 or the 1 P/S signal as the timing signal for the pressure measurement are present. If neither is present, CPU executes the display process in step S3. In this process, the time is displayed by display unit 184, CPU returns to step S1. However, if, in step S1, the switch input is detected, a corresponding switching process is executed (step S2). If the 1 P/S signal is detected, measurement process for the pressure measurement, for example, is executed (step S4). Afterwards, display process is executed (step S3). In the display process, display unit 184 displays measured data, for example. Then, flow returns to step S1.

Figure 37:
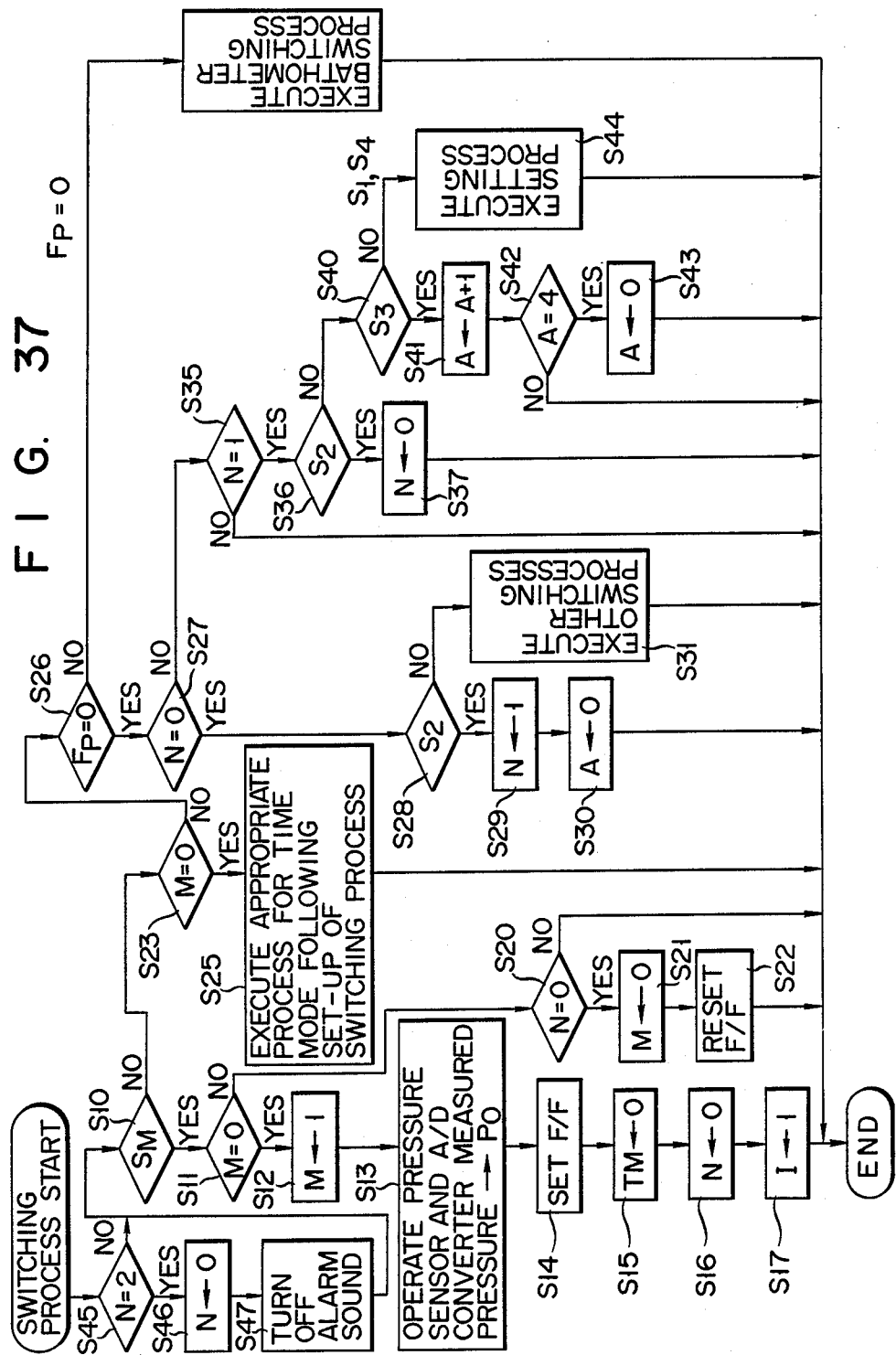
FIG. 37 is a flowchart for explaining in detail the switching process of FIG. 36.
Figure 38:
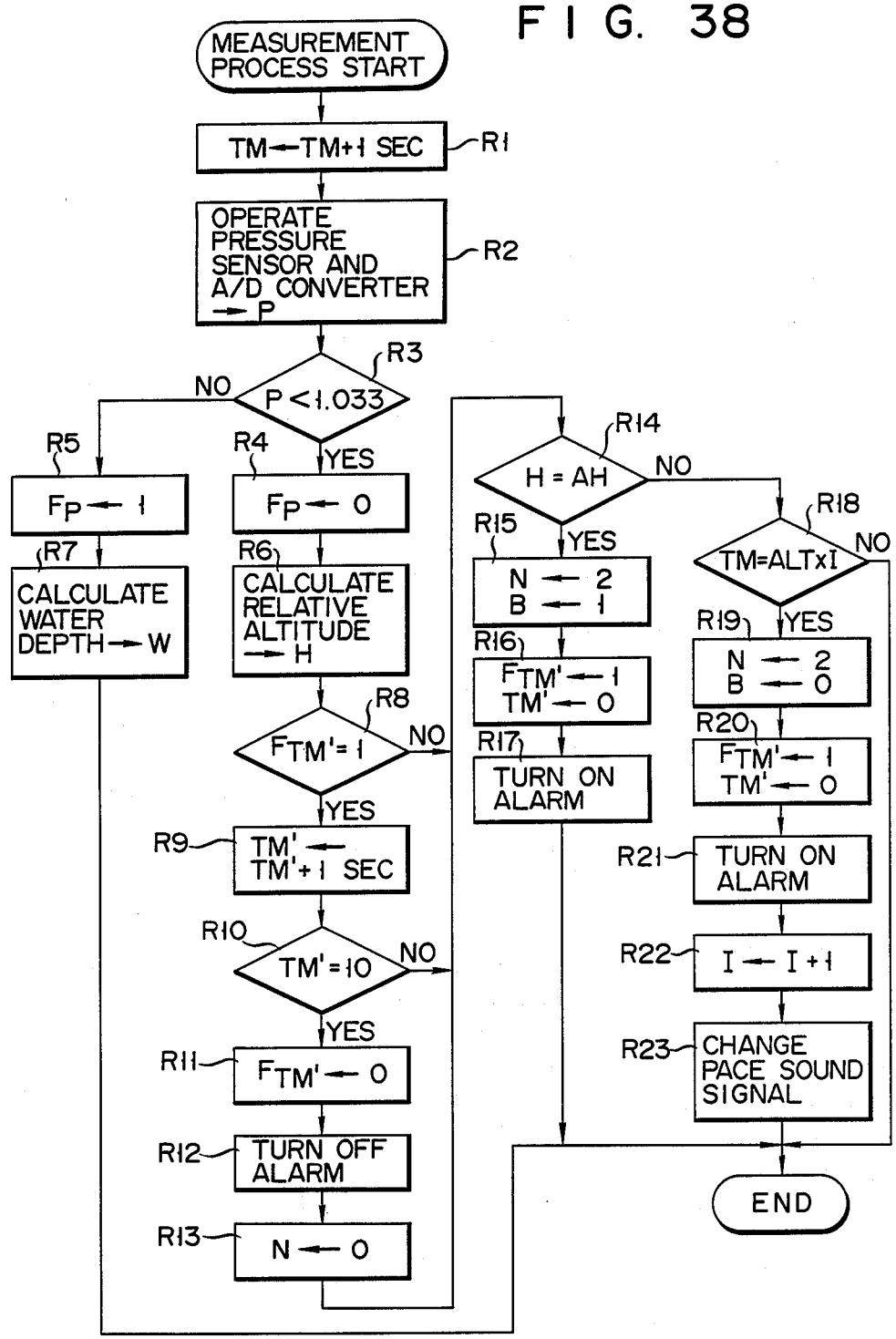
FIG. 38 is a flowchart for explaining in detail the measurement process of FIG. 36.
Figure 39:
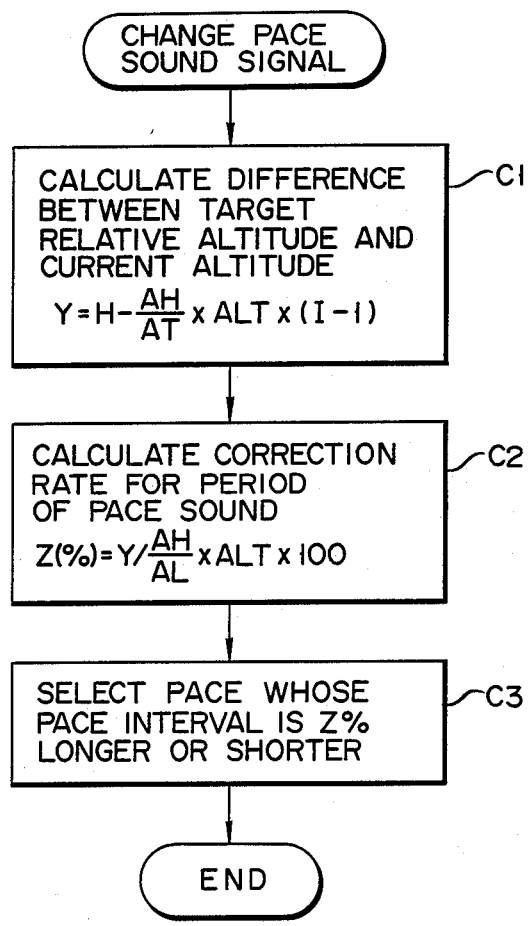
FIG. 39 is a flowchart for explaining in detail the pace sound signal conversion process of FIG. 38.
Figure 40:
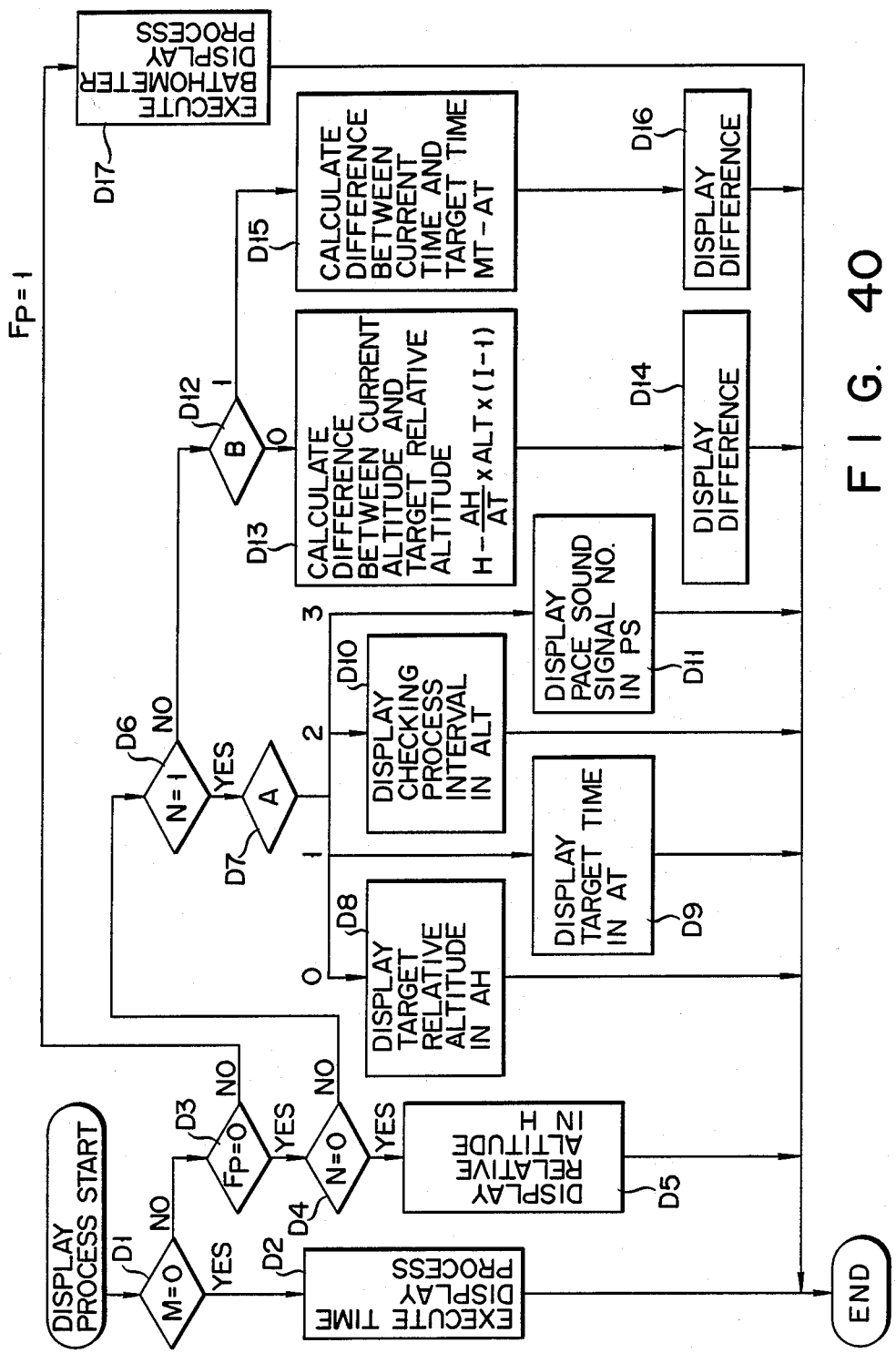
FIG. 40 is a flowchart for explaining in detail the display process of FIG. 36.
Figure 41:
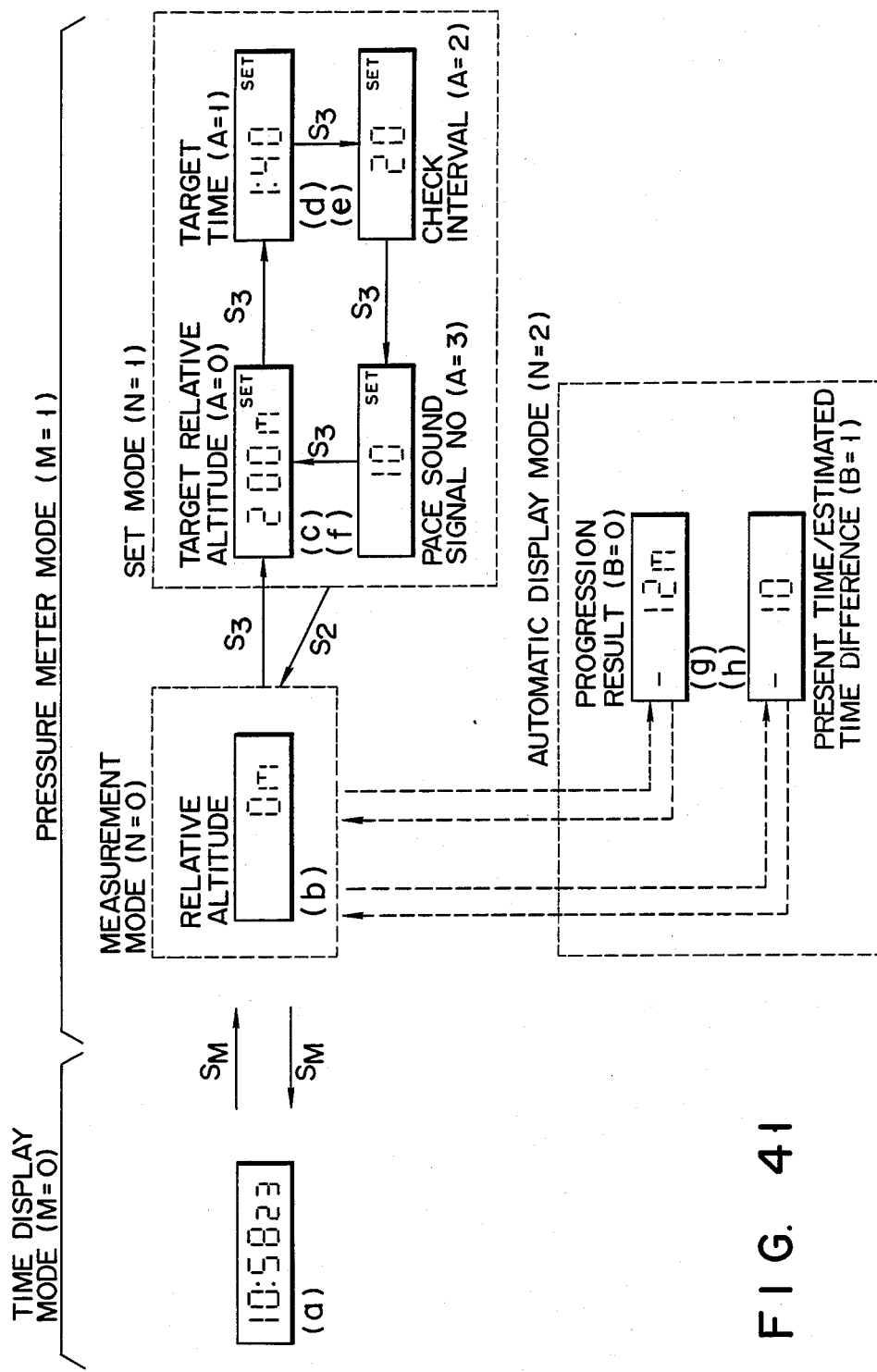
FIG. 41 is an illustration for describing the display states, operation modes and conditions in response to the switching operation according to the fifth preferred embodiment.

FIGS. 37, 38 and 40 are the flowcharts, respectively, illustrating in detail the switching process (step S2), the measurement process (step S4), and the display process (step S3). FIG. 39 is a flowchart illustrating in detail the pace sound signal conversion process in FIG. 38. FIG. 41 shows series of displays by display unit 184 which are for time display mode, the pressure gauge mode, the measurement, setting and automatic display modes. The operation of the embodiment when each switch is operated, will now be described.

(1) Initial Operation

It is assumed that the present mode of the wristwatch is the time display mode, and the present time (10:58:23) is displayed by display unit 184, as shown in FIG. 41. If push-button switch SM is operated, in step S1 in FIG. 36, the switch input is detected. In step S2, CPU enters the switching process, or the flowchart of FIG. 37. Step S10 detects that the switch input is caused by push-button switch SM. Step 11 checks that the mode is still the time display mode. "1" is set to mode counter M, to switch the mode to pressure gauge mode (step S12). An operation command signal "c" is transferred to pressure sensor 182 and analog/digital converter 195. Then, the pressure at the present point is measured. The measured pressure is set in register P0 as an initial pressure, i.e., the pressure at the base point (step S13). A signal "a" is generated, and sets RS flip-flop 193. CPU starts the receipt of the 1 P/S signal as a timing signal for pressure measurement (step S14). In this case, the output signal of RS F/F 193 is transferred to pulse generating circuit 202 and pace sound signal select circuit 203. When the wristwatch is used as an altimeter, pace sound signal select circuit 203 transfers to buzzer circuit 199 via OR gate 204, a pace sound signal relating to the pace sound signal number as set in register PS at that time. In response to this signal, the buzzer circuit generates a pace sound. Next, memory TM is cleared, and mode counter N is set to "0", to designate the measurement mode. Further, counter I is set to "1", in preparation for the progressive check (steps S15 to S17). Thus, when the time display mode is switched to the pressure gauge mode, measurement mode, the relative altitude or the water depth in the measurement mode is automatically designated.

After the above process (step S2 in FIG. 36), control enters the display process (step S3 in FIG. 36), i.e., the flowchart of FIG. 40), it is confirmed that the time display mode has already been switched to pressure gauge mode (step D1). It is further checked if the altitude or the water depth is measure (step D3). If it is the altitude, control advances to step D4. It is confirmed that the measurement mode is designated (step D4). Afterwards, the content of register H, i.e., the relative altitude is displayed by display unit 184 (step D5). In this case, since the initial operation at the base point has not yet been completed, there is not generated a difference of the altitude from the base point, and hence the relative altitude is still "0". Therefore, the display by display unit 184 is as shown in FIG. 41.

After the above processing, the set mode is set up in order to set the target relative altitude, target time, check interval, and the pace sound signal number. For the setting, switch S2 is operated as shown in FIG. 41. Then, in step S28, this operation is detected. "1" is set to mode counter N, to designate the set mode (step S29). Further, "0" is set to display counter A, to designate the target relative altitude set mode. In other words, when the measurement mode is switched to the set mode, the target relative altitude set mode is automatically set up. Then, control enters display process. Through steps D6 and D7, control advances to step D8. In this step, the target altitude set in memory AH is displayed. In this case, since the setting has not yet been made, the target altitude as previously set is displayed.

A new target relative altitude is set by designating the digit by switch S1, and further designating the figure at the designated digit (by the called set-and-select method). In this case, every time the switch operation is done, the corresponding processing is executed in the set process in step S44. The setting to memory AH is progressed, and the data as stored in memory AH at that time is sequentially displayed by display unit 184 (step D8). In this way, the switch operations and the associated processings are repeated, so that and the target relative altitude is set in memory AH. If 200 m is set as the target relative altitude, the display by display unit 184 is as shown in FIG. 41.

Next, the target time set mode is set up, to set the target time. In this case, switch S3 is operated, as shown in FIG. 41. Then, this switch operation is detected in step S40. The content of display counter A is changed from "0" to "1", to set up the target time set mode (step S41). Afterwards, control enters display process via step S42. The target time as set in memory AT, which was previously used, is displayed by display unit 184 (step D9).

Now, a new target time is set by the set-and-select method by operating switches S1 and S4. In this case, for every switch operation, set process in step S44 and the display process in step D9 are repeated. Finally, the target time is set in memory AT. The target time as set is displayed by display untit 184. For example, if 1 hour and 40 minutes is set as the target time, the display by display unit 184 is as shown in FIG. 41.

To set the check interval, the check interval set mode is set up. In this case, switch S3 is operated, as shown in FIG. 41. Then, the switch operation is detected in step S40. The content of display counter A is changed from "1" to "2", to set up the check interval set mode (step S41). Afterwards, control enters the display process via step S42. The check interval as set in memory ALT for a former use is displayed by display unit 4 (step D10).

Now, a new check interval is set by the set-and-select method by operating switches S1 and S4. In this case, for every switch operation, the set process in step S44 and the display process in step D10 are repeated. Finally, the check interval is set in memory ALT. The check interval as set is displayed by display unit 184. For example, if 20 minutes is set as a check interval, the display of display unit 184 is as shown in FIG. 41.

In order to generate a pace sound, which is harmony with an individual average walking speed, a pace sound signal number relating to the pace sound is set. To this end, the pace sound set mode is set up. For setting up this, switch S3 is operated, as shown in FIG. 41. Then, the operation is detected in step S40. The content of display counter is set to "3", to set up the pace sound set mode (step S41). Afterwards, control enters the display mode via step S42. The pace sound signal number as set in register PS for the former use, and left as it is, is displayed by display unit 184 (step D11).

A new pace sound signal number is set by the set-and-select method by operating switches S1 and S4. In this case, for every switch operation, the set process in step S44 and the display process in step D11 are repeated. Finally, the pace sound signal is set in register PS. The pace sound signal number as set is displayed by display unit 184. For example, if a pace sound whose number is 10 is set, the display by display unit 184 is as shown FIG. 41. CPU issues a select command to pace sound signal select circuit 203, to select the pace sound signal relating to the pace sound signal number as set in register PS. As a result, the pace sound is generated by buzzer circuit 199. With the above processings, the setting of the data to be preset is ended. To return the operation mode to the target relative altitude set mode, switch S3 is operated once again, as shown in FIG. 41. This operation is detected in step S40. The content of display counter A is changed from "3" to "4" (step S4). This content change is confirmed (step S42). Then, the content of display counter is set to "0", to set up the target relative altitude set mode (S43). Subsequently, control enters the display process. The target relative altitude as has already been set in memory AH is displayed by display unit 184 (step D8).

After the completion of the above initial setting, the set mode is switched to the measurement mode. In this case, switch S2 is operated, as shown in FIG. 41. Then, the switch operation is detected in step S36. The content of mode counter N is set to "0" again, to set up the measurement mode. Then, control enters the display process. In step D4, it is confirmed that the measurement mode has already been set up. Control advances to step D5, where the display unit control returns to the display mode before the set mode is set up.

Through the above initial operation, the wristwatch is placed in a state that it operates as the altimeter with with the pace sound generation function.

(2) Measurement Operation (A) Measuring Operation Prior To A First Checking Process It is assumed that the measuring point is progressively changed while the wristwatch is placed in the above state, that is, that a climber carrying the wristwatch starts climbing in harmony with the pace sound generated. In this case, the following operation is performed in the measurement process (step S4) and the display process (step S3), which are executed every one second, the following operations. First, the processing for measured time is executed (step R1). An operation command signal is transferred to pressure sensor 182 and analog/digital converting circuit 185, which in turn are operated. The momentarily changing pressure is measured, and the results of measurement are loaded into register P (R2). In step R3, it is checked whether the pressure in register P is above or below 1.033 kg/cm$^2$. If above it, it is determined that the wristwatch is used as a bathometer. Then, flag Fp is set to "1", and control advances to water depth calculation process (step R7). Since the apparatus is now used as an altimeter, control advances from step R3 to step R4. Flag Fp is set to "0" (step R4), and control advances to step R6. In this step, the following processing is executed. The pressure at the base point as set in register P0 is read out. The distance from the base point to the present point, i.e., the relative altitude, is obtained by executing the calculation of the above-defined equation, which is then stored in register H.

Timer flag $F_{TM'}$ checks whether or not register TM' has been set to a 1-minute timer, that is, whether the above automatic display mode (see FIG. 41) has been set up (step R8). In this case, since such mode has not yet been set up, control advances to step R14. In this step, it is checked whether or not the relative altitude at the present point has already reached the target relative altitude. In this case, since the altitude has not yet reached the target relative altitude, control advances to step R18. In this step, it is checked whether the time elapse from the start of the altitude measurement has reached the time to start the checking process. However, the time elapse has not yet been reached that time, control directly enters the display process from step R18. Then the relative altitude as set in the register H at that time is displayed by display unit 184.

(B) Measuring Operation When Each Checking Process Is Set Up

A process similar to that in (A) above is performed (steps R1 to R8 and step 14) and control moves to step R18. In this step, it is detected that time for executing the checking process is reached. Control advances to step R19. In this step, "2" is set in mode counter N, so that the automatic display mode is set up. Display counter B is set to "0", so that the display mode for the progress check results is set up. Then register TM', which is used as a 10-second timer, is cleared and sets timing flag $F_{TM'}$. This flag indicates that register TM' is used as a 10-second timer. An alarm sound is generated by buzzer 199, in order to notifying the user that progress check results are displayed by display unit 184 (R21). In step 22, to set the time for executing the next check process, counter I is incremented by "1". Then, control moves to step R23 (for details, see FIG. 39) where a base sound signal changing process is performed. In this step, the elapsed time since start of measurements is multiplied by the target ascent/descent speed, to obtain an estimated relative altitude. The lapsed time is the product of the content of memory ALT and the result of subtrating "1" from the content of counter I. The estimated relative altitude is a relative altitude at which the user should arrive if he moves at the predetermined speed. Then, a difference Y between that relative altitude and the relative altitude at the present point (step C1). The difference Y is divided by an altitude difference to be moved, or descended or ascended. This altitude difference is obtained by multiplying the target ascent/descent speed by the check interval. The dividing operation provides a correction rate Z (%) for correcting the pace sound generating period to have the predetermined ascent/descent speed. This is performed in step C2. Then, CPU selects the pace sound signal whose pace sound generating period is corrected by the correction rate (%), and updates the content of register PS by the pace sound signal number (step C3). Then, the control enters the display process, and confirms that "0" is set in display counter B (step D12). A process similar to that in step C1 is performed in step D13. In other words, the difference between the estimated relative altitude and the relative altitude of the current point, checking process result, is calculated. In step D14 this check result is displayed by display unit 184 in place of the current relative altitude thus far displayed. For example, if the actual movement is 12 m less than the estimated relative altitude, display unit 184 will show a display as FIG. 41.

(C) Measuring Operation Before 10 Seconds Have Elapsed Since Start If Checking Process A process similar to that of (A) above is performed in steps R1 to R7, and control moves to step R8. In this step, the checking process has already been started by timer flag $F_{TM'}$. It is confirmed that register TM' has been used as a 10-second timer, and the control moves to step R9. Register TM' is incremented by +1, and data showing that one more second has elapsed is recorded. Then it is confirmed in step R10 that ten seconds have not yet elapsed since the checking process was begun. Also, it is verified in step R14 that the target relative altitude has not yet been reached. Control passes through step R18, and reaches the display process. A process similar to that in steps D12 to D14 is performed and similar checking process results are displayed.

(D) Measuring Operation When 10 Seconds Have Elapsed Since Start Of Checking Process A process similar to that in steps R1 to R9 of (C) above is performed, and control moves to step R10. In this step it is confirmed that 10 seconds have elapsed since the start of the checking process. Timer flag $F_{TM'}$ is reset in step R11. The alarm that has been sounding since the start of the checking process is shut off in step R12. In step R13 mode counter N is set to "0" and returned to the measurement mode. The control passes through steps R14 and R18, and the display process is begun. It is confirmed in step D4 that the measurement mode has been returned to. In step D5, the relative altitude of the current point is displayed by display unit 184.

After the above process has been completed, a measurement process similar to that of (A) above is repeated for every second until the next checking process time is reached.

(E) Measurement Process At Time When Target Relative Altitude Is Reached

A process similar to that of (A) above is performed (steps R1 to R8), and control progresses to step R14. In this step it is detected that the target relative altitude has been reached. Mode counter N is set to "2" and the automatic display mode is assumed. In step 15, display counter B is set to "1", and the arrival time difference display mode is assumed. Then timer flag $F_{TM}$ is set and register TM' is cleared in step R16. Buzzer 199 generates an alarm sound to indicate that display unit 184 displays the arrival time difference. The display process is then begun, and control passes through step D12 and advances to step D15. The target time (contained in memory TM) is subtrated from the time elapsed since the start of measuring, to have the difference as the arrival time difference. This is displayed by display unit 184 in step D16. For example, if the arrival occurs 10 minutes later than the target time, the display shown in FIG. 41 is given by display unit 184.

(F) Measuring Operation Before 10 Seconds Have Elapsed Since The Target Relative Altitude Was Reached After the processes of steps R1 to R8 have been performed at each measuring timing, register TM' is incremented by +1. Thus the time elapsed since the target relative altitude was reached in recorded. Then control passes through steps R10, R14 and R18 and the display process is begun. The arrival time difference is displayed by display unit 184 as it was in (E) above.

(G) Measuring Operation At Time When 10 Seconds Have Elapsed Since The Target Relative Altitude Was Reached After the processes of steps R1 to R8 are completed, register TM' is incremented by +1, and the data of register TM' is set to "10" seconds in step R9. In step R10 it is confirmed that the data in register TM' is "10" seconds. Then timer flag $F_{TM}$ is reset in step R11. The alarm sound indicating the display of the arrival time difference is shut off in step R12. The measuring mode is returned to in step R13. After that, controls passes through steps R14 and R18, and the display process is begun. Display unit 184 returns to the display of the relative altitude in steps D4 and D5.

Subsequently, the measuring operation as explained in (a) above is performed at each measuring timing.

(3) Switching From Altimeter Mode To The Time Display Mode

In this case, mode switch SM is operated as shown in FIG. 41. This operation is detected in step S10, and it is confirmed in step 11 that the time display mode was not in effect yet. Control passes through steps S20 to step S21, in which mode counter M is set to "0" to initiate the time display mode. After this, a signal "b" is sent to RS flip-flop 13 and resets the flip-flop. The input of the 1 p/s signal (the measuring timing signal) is prohibited and the measuring process is stopped. The operation of pulse generating circuit 202 and pace sound signal select circuit 203 are stopped and the generating of the pace sound stops. Then the display process is begun. In step D1, it is confirmed that the mode has been switched to the time display mode. The current time is displayed by display unit 184 in step D2.

If the mode switch is operated in the automatic display mode, the measuring mode will be forced into effect, to stop generation of the alarm sound (steps S45, S46 and S47). After that, the predetermined switching processes will be executed.

(4) Other Operations

When the switch is operated in the time display mode, the corresponding process will be performed in step S25. The related time display will be performed in step D2. If switch S2 is operated during the measuring mode, the corresponding process will be performed in step S31.

This invention is not limited to the above embodiment, but can be changed and modified within the scope of this invention.

Advantages Of The Fifth Embodiment

As thus far described in detail in this invention, a travelled vertical distance is measured using a single pressure sensor. The predetermined target vertical distance and the estimated time required to travel this distance are preset. When the estimated time is reached, a difference between the target vertical distance and the vertical distance actually travelled is calculated. This difference is displayed. The progression in travelling in the estimated vertical direction can be easily checked by a very simple operation.

The vertical distance actually travelled and the time required for that can be calculated. The target vertical distance and the estimated time required are preset. When the above estimated time has elapsed, the difference between the target vertical distance and the actual distance travelled is calculated. A pace sound generating means is provided to adjust the time periods one at a time. The walking pace necessary to arrive at the designated point of the estimated vertical distance at the estimated arrival time is very easy to perceive.

Wristwatch Operated In Sixth Mode

FIGS. 42 through 45 show a wristwatch operated in sixth mode according to a sixth embodiment of the present invention. In the embodiment, an altitude and a water depth are displayed by an analog display section for displaying time.

Arrangement Of Wristwatch

FIG. 43 shows an arrangement of liquid crystal display unit 210. Liquid crystal display unit 210 comprises digital display section 210-1 and analog display section 210-2. Digital display section 210-1 includes main digital display section 210-1a, sub-digital display section 210-1b and meter display element U. Main digital display section 210-1a is composed of 8-figured segments of six digits. Sub-digital display section 210-1b is provided above main digital display section 210-1a, and composed of 8-figured segments of four digits. Meter display element U represents the unit for the altitude value when digital display section 210-1 displays an altitude. Analog display section 210-2 comprises circular center display member C, sixty rod-like inner display members A0 to A59, sixty rod-like outer display members B0 to B59, and sixty rod-like outermost display members D0 to D59. Circular center display member C is located in the center portion of analog display section 210-2. Inner display members A0 to A59 are radially arranged on the surface of center display element C. Outer display members B0 to B59 are respectively arranged in line with the corresponding inner display members A0 to A59. Outermost display member D0 to D59 are respectively arranged in line with the corresponding outer display members B0 to B59.

The circuit arrangement of this electronic wristwatch will now be described with reference to FIG. 42. The output of oscillator 211 is frequency divided into a 1 Hz clock signal by frequency divider 212. The clock signal is counted by time counter 213. Time counter 213 is for obtaining time data of hour, minute and second. By counting carry, date counter 214 obtains date data of month and day.

Of the time data obtained by time counter 213, the hour/minute data, minute data and second data are respectively transferred via inner analog display select circuit 215, outer analog display select circuit 216, and outermost analog display select circuit 217, to the corresponding decoder drivers 218 to 220. These data are converted into display drive signals. Then, the signals are supplied to inner display members A0 to A59, outer display members B0 to B59 and outermost display members D0 to D59. The hour/minute/second data obtained by time counter 213 is transferred to decoder driver 222 via main digital display select circuit 221. The data is converted into a display drive signal. Then, the signal is supplied to main digital display member 210-1a. Further, the month/day data obtained by date counter 214 is transferred to decoder driver 224 via sub-digital display select circuit 223. The data is converted into a display drive signal. Then, the signal is supplied to sub-digital display member 210-1b.

Time counter 213 outputs a 10-second signal. The signal is applied to pressure detecting unit 225 and altitude/water depth calculting circuit 226, as an operation command signal. Pressure detecting unit 225 includes a semiconductor pressure sensor. The voltage signal as output from this semiconductor sensor in accordance with the pressure is converted into pressure data of a digital quantity (kg/cm$^2$). The data is supplied to altitude/water depth calculating circuit 226. Altitude/water depth calculating circuit 226 obtains the altitude data (m) and water depth data (m) on the basis of the pressure data from pressure detecting unit 225. In the same manner as that in the first embodiment, if the pressure data from pressure detecting unit 225 is 1.033 kg/cm$^2$ (one atmosphere) or below, it is determined that the apparatus is used as an altimeter, and altitude data is calculated from the pressure data. If it is 1.033 kg/cm$^2$ or above, it is determined that the apparatus is used as a bathometer, and water depth data is calculated from the pressure data. The altitude data or the water depth data as obtained by altitude/water depth calculating circuit 226 is transferred to initial altitude/water data memory unit 227. In addition, these data are transferred to inner analog display select circuit 215 via OR gate 228. These data are further transferred to sub-digital display select circuit 223. Inner analog display select circuit 215 is also supplied with the data in initial altitude/water depth memory unit 227 via OR gate 228.

The output of mode select switch S1 is supplied to T input terminal of T-type flip-flop (T-FF) 229, to invert the logical state of FF 229. T-FF 229 constitutes a mode select circuit. The $\overline{Q}$ output is for the watch mode, and the Q output for pressure measurement mode. FF 229 supplies the output to display select circuit 215 to 217, 221, and 223, as an display mode select signal. Output of altitude/water depth setting switch S2 is applied to setting circuit 230. Each time altitude/water depth setting switch S2 is operated, setting circuit 230 outputs a pulse signal. The signal is supplied to target altitude/water depth memory unit 231. Setting circuit 230 selects the set digit in target altitude/water depth memory 231. Further, setting circuit 230 sets a value that corresponds to the number of operations of altitude/water depth switch S2, at the selected digit. The data in target altitude/water depth memory unit 231 is supplied to outermost analog display select circuit 217 and main digital display select circuit 221. Altitude write switch S3 supplies its output signal to initial altitude/water depth memory unit 227, as an write designation signal, to cause initial altitude/water depth memory unit 227 to store the altitude data obtained by altitude/water depth calculating circuit 226.

Operation Of Wristwatch

If the $\overline{Q}$ output of T-FF 229 is set to high level, that is, if the watch mode is set up, display select circuits 215 to 217, 221, and 223 output the data of timer counter 213 or of the date counter 214. These data are respectively transferred via corresponding decoder driver 218 to 220, 222, and 224, to liquid crystal display unit 210. Consequently, in the watch mode, inner display members A0 to A59 display the hour. Inner display members A0 to A59 and outer display members B0 to B59 display the minute. Outermost display members D0 to D59 display the second. The hour and the minute are displayed by hands. The hour is displayed by the short hand, and the minute by the long hand. The second is displayed on the basis of accumulation of time. In the watch mode, main digital display section 210-1a displays the hours, minute and the second. Subdigital display section 210-1b displays the month and the day. FIG. 44 shows an example of display, in which "the first month, the eighth day, 3 hour, 00 minute, and 23 seconds" are displayed.

In the watch mode, if mode select switch S1 is operated once, T-FF 229 inverts its logical state. The Q output becomes high in level, which means that the mode is switched to pressure measurement mode. If the apparatus is used as an altimeter, and an ascent is made in climbing, the altitude of the start point and the target altitude are previously set. Pressure detecting unit 225 and altitude/water depth calculating circuit 226 are operated once every 10 seconds, in accordance with the 10-second signal from time counter 213. The pressure data as output from pressure detecting unit 25 is converted into the altitude by altitude/water depth calculating circuit 226. The converted data is supplied to initial altitude/water depth memory unit 227. Consequently, if, at the start of the mountain ascent, altitude write switch S3 is operated, the altitude at the start point is automatically set to initial altitude/water depth memory unit 227. The target altitude is set by manually operating altitude setting switch S2.

When altitude setting switch S2 is operated, a desired target altitude is set to target altitude/water depth memory unit 231, under the control of setting circuit 230. Thus, the the altitude at the start point and the target altitude are set. Now, the apparatus is set in the pressure measuring mode, and the ascent starts. When the pressure measuring mode is set up, that is, the Q output of T-FF 229 is high in level, display select circuits 215 to 217, 221, and 223 output the data of altitude/water depth calculating circuit 226, initial altitude/water depth memory unit 227, and target altitude/water depth memory unit 231. The output data are converted into display drive signals by corresponding decoder drivers 218 to 220, 222, and 224.

Then, the signals are supplied to liquid crystal display unit 210. In other words, in the pressure measurement mode, the altitude data at the start point as previously set in initial altitude/water depth memory unit 227, is supplied to inner display members A0 to A59 of analog display section 230-2 via inner analog display select circuit 215 and decoder driver 218. Thus, the altitude at the start point is displayed in an analog manner by display members A0 to A59. The present altitude data obtained by altitude/water depth calculating circuit 226 is supplied to inner display members A0 to A59 via inner analog display select circuit 215 and decoder driver 218. The present altitude data is also supplied to outer display members B0 to B59 via outer analog display select circuit 216 and decoder driver 219. Consequently, by using display members A0 to A59 and B0 to B59, the present altitude is analog-displayed. The target altitude data as previously set in target altitude/water depth memory unit 231 is supplied to outermost display members D0 to D59 via outermost analog display select circuit 217 and decoder driver 220. By using display members D0 to D59, the target altitude is analog-displayed. In this case, the altitude at the start point, and the present altitude are displayed by hands, in the same manner as that for the hour and minute displays which were described above. Specifically, the altitude at the start point is displayed by the short hand, and the present altitude is displayed by the long hand. The target altitude is displayed on the basis of the accumulated value of time, as in the case of the second display. In the analog display of altitudes, one division on the display unit represents 20 m. Therefore, 5 divisions represent 100 m. In other words, 1 hour, 2 hour, . . . , in the time display respectively correspond to 100 m, 200 m, . . . , in the analog altitude display. The present altitude data obtained by altitude/water depth calculating circuit 226 is supplied to sub-digital display select circuit 223. Then, the present altitude is digital-displayed by sub-digital display section 210-1b. The target altitude data previously set in target altitude/water depth memory unit 231 is supplied to main digital display select circuit 221. Consequently, the target altitude is digitally displayed by main digital display section 210-1a. FIG. 45 shows an example of display in this pressure measurement mode. In this example, the altitude at the start point "100" m, the present altitude "400" m, the target altitude "1000" m are displayed. As shown, the present altitude and the target altitude are respectively displayed by analog display section 210-2 and digital display section 210-1. Therefore, the climber can confirm how much distance he has to ascend to reach the target altitude, approximately by analog display section 210-2, and digitally by digital display section 210-1. The climber can also confirm how much distance he has ascended by looking at the display by analog display section 210-2.

While the operation of the wristwatch thus far described is for the altimeter, the same thing is correspondingly applied to the operation when it is used as the bathometer. An altimeter, has been described. The operation when the embodiment is used as a bathometer is also performed in the same manner as above.

Advantages Of Sixth Embodiment

As described in detail above, the sixth embodiment comprises an analog display section and a pressure sensor. A plurality of optical display members circularly arranged are contained in the analog display section. A vertical distance from the base point is calculated on the basis of the pressure detected by this pressure sensor. This vertical distance and the target vertical distance from the base point as previously set, are simultaneously displayed by the analog display section. Therefore, when this embodiment is applied for the altimeter, for example, various kinds of data necessary for the planned climbing can be easily confirmed.

Wristwatch Operated In Seventh Mode

FIGS. 46 to 53 show a wristwatch operated in seventh mode according to a seventh embodiment of the present invention. In this embodiment, a vertical distance from the base point is obtained by using the pressure sensor. The vertical distance is graphically displayed with respect to the time.

Arrangement Of Seventh Embodiment

FIG. 47 shows an external view of this wristwatch. In the figure, reference numeral 241 designates a watch case with pressure sensor 242. A circular opening is formed in the lower part of the upper side of case 241. Pressure sensor 242 is mounted inside case 241 so that the upper surface of pressure sensor 242 is exposed to exterior through the opening. Liquid crystal display unit 244 is provided on the observe side of watch case 241. Liquid crystal display unit 244 displays the time, the altitude and the water depth. In the embodiment, in addition to mode switch SM, push button switches designated by S1 to S3 are provided.

Figure 46:
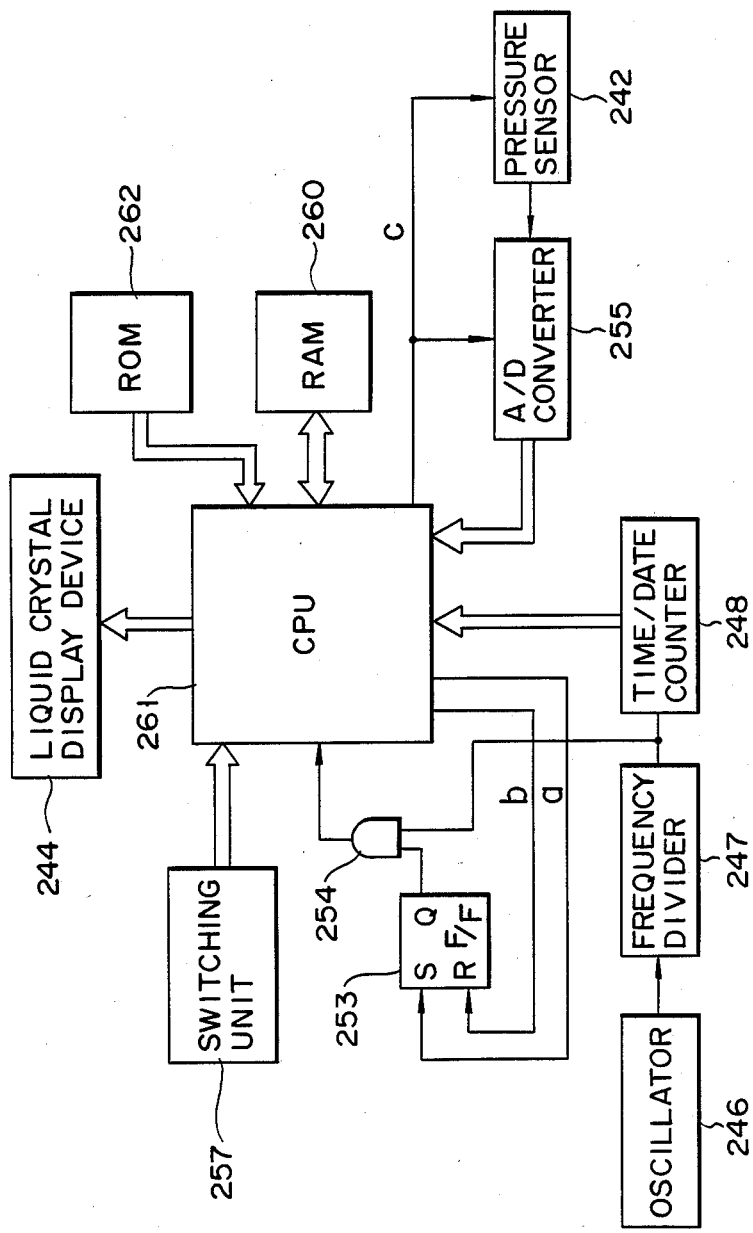
FIG. 46 is a schematic block diagram of an electronic wristwatch according to a seventh preferred embodiment.

FIG. 46 shows a block circuit diagram of the embodiment. In the figure, reference numeral 246 designates an oscillator. The output of oscillator 246 is frequency divided into a 1 p/s signal by frequency divider 247. The 1 p/s signal is supplied to AND gate 254 and timer counter 248. Time counter 248 which includes second, minute and hour counters, counts the 1 p/s signal to have time data. The time data is supplied to CPU 261.

CPU 261 executes various processings according to a previously stored micro program, in response to the switch input signal from switching unit 257. To switch from the time display mode to the pressure gauge mode, a signal "a" is transferred to RS flip-flop to set it. By this setting, AND gate 254 is enabled. Then, CPU 261 receives the 1 p/s signal from frequency divider 247 as a timing signal for pressure measurement. On the other hand, to switch the mode to the watch mode, a signal "b" is transferred to RS flip-flop 253, to set it. By the setting, AND gate 254 is disabled, and prohibits the 1 p/s signal from inputting to CPU 261. In synchronism with the input 1 p/s signal, CPU 261 transfers an operation command signal "c" to pressure sensor 242 and analog/digital converter 255, to cause them to operate. At this time, pressure sensor 242 detects the pressure (atmospheric pressure or water pressure) at the point where the apparatus is located. Analog/digital converter 255 converts the detected pressure into a signal of digital quantity in unit of $kg/cm^2$. The signal is transferred to CPU 261.

The write and read operation of RAM 260 is performed under the control of CPU 261. RAM 260 includes various types of registers to be described later. Liquid crystal display unit displays the various kinds of data transferred from CPU 261. In the bathometer mode, ROM 262 performs the read-out of data under the control of CPU 261. ROM 262 stores the data for avoiding the decompression disease such as the data of U.S. Navy Decompression Tables. These are the data relating to the decompression (i.e., surfacing) process in accordance with the time spent in the water, i.e., the water depth at each decompression point and the decompression time at each decompression point.

FIG. 48 shows a major configuration of RAM 260. Memory TM stores the time elapse from the start of measurement as an altimeter or a bathometer. Mode counter M is a binary counter. If the content is "0", mode counter M designates the time display mode. If it is "1", the pressure gauge mode is designated. Display counter N designates the display data and the display in either mode. In the altimeter mode, and the bathometer mode, register P momentarily stores the current pressure (atmospheric pressure or the water pressure) as measured every measurement timing. Register P0 stores the pressure at the reference point for altitude and water depth (hereinafter referred to as the "base point"). Register PH successively stores the relative altitude at the current point with respect to the base point (hereinafter referred to as the "relative altitude"). Register PW momentarily stores the relative water depth at the current point with respect to the base point (referred to simply as water depth). The content of flag FP is "1" when the apparatus is used as a bathometer is the pressure gauge mode. When the apparatus is used as an altimeter, the content is "0". The memory area of memory "m" is made up of a number of rows respectively affixed with row address m1, m2, . . . . In the bathometer mode or the pressure gauge mode, these rows successively store the water depth or the relative altitude at each point every 60 seconds.

Operation Of Wristwatch

The operation of the embodiment will now be described. FIG. 49 shows a general flowchart illustrating an outline of the operation. It is checked whether the switch input signal from switch section 257 or the 1 p/s signal as the timing signal of the pressure measurement is present or not (step G1). If neither of them is present, a display process is executed in which liquid crystal display device 244 displays time (step G3). Control returns to step G1. If the switch input signal is detected in step G1, the corresponding switching process is executed (step G2). If the 1 p/s signal is detected, the measurement process is executed in which atmospheric pressure or water pressure is measured (step G4). Then, the display process for displaying the measured data by liquid crystal display unit 244 (step S3) is executed, and control returns to step G1.

Figure 50:
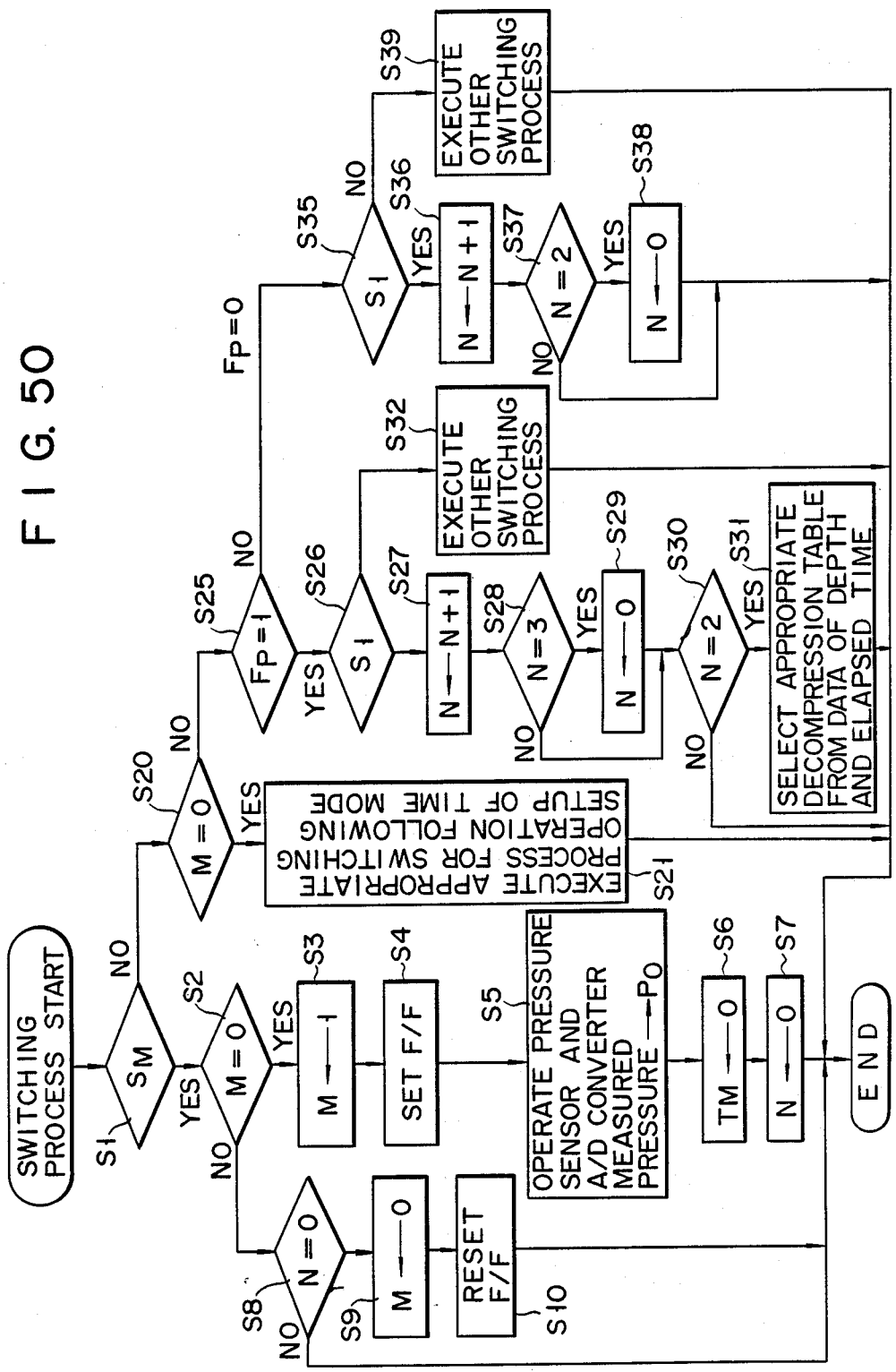
FIG. 50 is a flowchart for explaining in detail the switching operation of FIG. 49.
Figure 51:
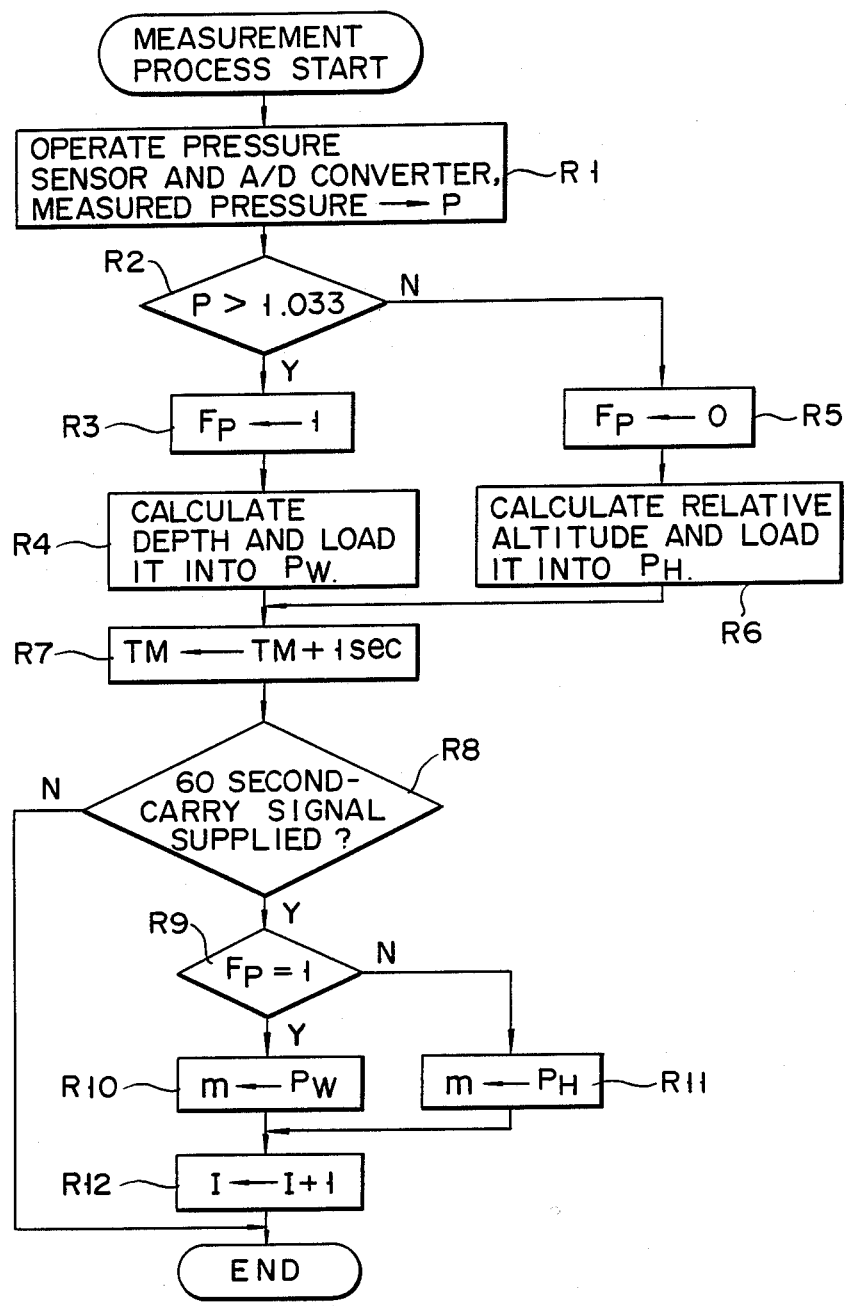
FIG. 51 is a flowchart for explaining in detail the measuring process of FIG. 49.
Figure 53:
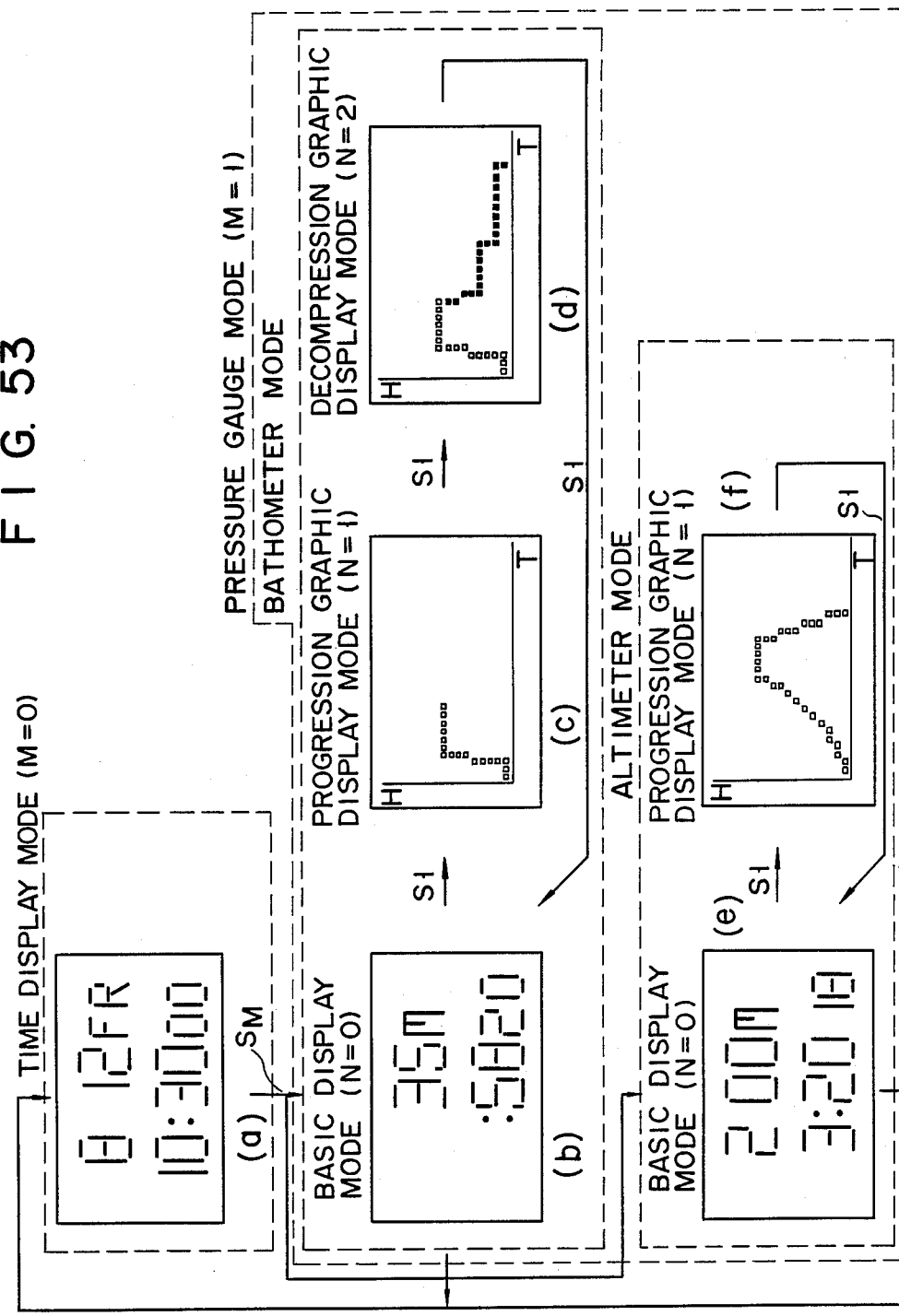
FIG. 53 schematically illustrates the display states, operation mode, and conditions in response to the switching operation.

FIGS. 50, 51, 52 show flowcharts illustrating the details of the switching process (step G2), the measurement process (step G4), and the display processing (step G3). FIG. 53 shows a series of displays by liquid crystal display unit 244 by the respective switch operations. The operation of each switch operation will be described.

(A) Mode Selection Operation

Mode switch SM is operated as shown in FIG. 53. First, switching from the time display mode to the pressure gauge mode will be explained. In step G1 it is recognized that there is a switch input resulting from the operation of switch $S_M$. Control advances to step G2. In step S1 of FIG. 50, it is verified that the switch input was caused by the operation of switch $S_M$. Next, it is verified that the time display mode is still in effect in step S2. In step S3 mode counter M is set to "1" and the bathometer mode is entered. In step S4, the signal "a" is sent to RF flip-flop 253, and the flip-flop is set. Then a 1 p/s signal is applied as a watch timing signal. After this, in response to the 1 p/s signal, operation command signal C is sent to pressure sensor 2 and analog/digital converting circuit 15. The pressure at the current point is measured, and this value is set into register P0 as a base point in step S5. Then in steps S6 and S7, memory TM is cleared and initial settings made, display counter N is set to "0", and the basic display state of the bathometer mode is specified. The display process (step G3, or in other words the flowchart of FIG. 52) is assumed. Either water depth or the elapsed time since the the water depth measurement, or relative altitude or elapsed time is displayed by display unit 244 in step D11. Because the mode is still being switched at the base point, no significant data is displayed.

Through the above processings, the electronic wristwatch is set in the pressure gauge mode, and is operable as the bathometer or the altimeter.

The switching to the time display mode will now be described. As shown in FIG. 53, the basic display mode in the pressure gauge mode is set up. Then, mode switch SM is operated. The operation is detected in step S1. Control advances through step S2 to step S8. It is confirmed that the mode is the basic display mode. "0" is set to mode counter M, to set up the time display mode (step S9). RS flip-flop is reset to inhibit the 1 p/s signal from inputting to CPU, so that the measurement is stopped (step S10). Afterwards, the display process is executed, in which the time data and the date data from time counter 248 are displayed by liquid crystal display unit 244.

As described above, each time mode switch SM is operated, the display mode and the pressure gauge mode are cyclically changed.

(B) Operation Of Bathometer In Pressure Gauge Mode

Through the switch operation and the processing, the basic display state in the pressure gauge mode is set up. The movement from the measuring point starts. (For example, the diver with the wristwatch starts scuba diving.) In this case, the measurement process is executed at the measuring timing every time the 1 p/s signal reaches, in step G4 in FIG. 49. The result is displayed by liquid crystal display unit 244 (step G3). Control enters the flowchart of FIG. 51. At the clock timing, an operation command signal C is transferred to pressure sensor 242 and analog/digital converter 255, to cause them to operate. The process is executed (step R1) in which the water pressure is measured at each point, and the measured pressure is set to register P (step R1). Then, it is checked whether the pressure as set in register P is higher or lower than one atmosphere (step R2). If the value is below one atmosphere, it is decided that the apparatus is used as a bathometer. "1" is set in flag FP (step R3). Control advances to step R4. In this step, the data of register P and the pressure data at the base point as previously set, are read out. The calculation is executed, in which the distance between the base point and the current point, or the water depth is obtained. The obtained data is set in register PW. Afterwards, additional elapse of one second from the previous measuring timing, is stored in memory TM (step R7). If a 60-second carying as transferred every 60 second from time counter 248 is present, control advances through step R9 to step R10. The content of register RW is sequentially stored in the rows in memory "m" which are designated by counter I. Next, in order to designate the row in memory "m" where the water depth will be stored at the next measuring timing, the content of counter I is incremented by "1" (step R12).

In step R8, if the the answer is NO, or if the process in step R10 is completed, control enters the display process. The process is executed (step D5), in which the content of register PW at that time, i.e. the water depth, and the content of memory TM, i.e. the elapsed time from the water depth measurement, are displayed by liquid crystal display unit 244. For example, if at present the water depth is 35 m, and 58 minutes and 20 seconds have elapsed from the start of the water depth measurement, the display by liquid crystal display unit 244 is as shown in FIG. 53.

In the above basic display in the bathometer mode, if switch S1 is operated, the operation is detected in step S26. "1" is set to display counter N, to set up the progression graphic display (step S27). Control enters through steps S28 and S30 to the display process. In the process, the water depth measured every 60 seconds, and stored in memory "m" are graphically displayed by liquid crystal display unit 244. FIG. 53 shows an example of that display.

In this mode, if switch S1 is operated again, the operation is detected in step S26. The content of display counter N is set to "2", to set up the decompression graphic display mode (step S27). Control advances through steps S28 and S30, to step S31. The appropriate decompression table is selected on the basis of the water depth and the elapsed time. Then, control enters the display process. The data of memory "m" is graphically displayed by liquid crystal display unit 224 (step D8). Further, the data of the decompression table is also displayed by liquid crystal display unit 244 (step D9). The latter display is a flashing display, so that the two kinds of display will be distinguished. FIG. 53 shows an example of the display. In the figure, the black dots represent flashing display. Thus, in this embodiment, the optimum decompression process is displayed with easy visual reception of human being. This feature is very effective for the avoidance of decompression disease.

In the above mode, if switch S1 is operated again, the operation is detected in step S26. The content of display counter is set to "3" (step S27). Control advances through step S28 to step S29. The content of display counter N is reset to "0", to set up the basic display. Control advances through step S30 to the display process. Then, the digital display of water depth and elapsed time (step D5) is executed again in step D5.

(C) Altimeter Operation In Pressure Gauge Mode

Through the switch operations and processes in (A) above, the basic display in the altimeter mode is set up. The movement starts from the measurement point. (That is, the climber with this electronic wristwatch starts the ascent of a mountain.) At this time, the measurement process (step G4, i.e., the flowchart in FIG. 51) is executed in response to the 1 p/s signal. Specifically, the atmospheric pressure is measured at the measuring timing. The measured pressure is set in register P. Since the value set in register P is below one atmosphere, control advances through step R2 to step R4. "0" is set to flag FP. Control advances to step R6. There, the process is performed, in which the pressures set in registers P0 and P are read out, and calculated to obtain the relative altitude at the current point, and the relative altitude is recorded in register PH. Afterwards, in the same manner as that in the bathometer mode, the time count process is executed, and another process is executed, in which the relative altitude is successively stored in memory "m" every 60 seconds (steps R5, R6, R7, R9, R10). Next, control enters the display process. In this process, the current content of register PH, i.e., the relative altitude, and the content of memory TM, i.e., the elapsed time from the start of the altitude measurement are displayed by display unit 244 (D11). For example, if, at present, the relative altitude is 200 m, and 3 hours 20 minutes and 18 second have passed from the altitude measurement, the display by liquid crystal display unit 244 is as shown in FIG. 53.

In the basic display in the altimeter mode, if switch S1 is operated, the operation is detected in step S35. The content of display counter N is changed from "0" to "1", to set up the progression graphic display mode (step S36). Afterwards, control enters the display process. The relative altitudes as measured and stored every 60 minutes are displayed by liquid crystal display unit 244 (step D12).

In the above mode, if switch S1 is operated again, the operation is detected in step S35. The content of display counter N is set to "2" (step S36). Control advances through step S37, to step S38. In this step, the content of display counter N is set to "0" to set up the basic display mode. Control enters the display process. The relative altitude, for example, is displayed by liquid crystal display unit 244 (step D11).

(D) Other Operations

In the time display mode, if operations other than the operation by mode switch SM are made, the corresponding process is executed in step S21. In the bathometer mode, if other switches than mode switch SM and switch S1 are operated, the corresponding process is executed in step S32. In the altimeter mode, if switches other than mode switch SM and switch S1 are operated, the corresponding process is executed in step S39.

Advantages Of Seventh Embodiment

In the seventh embodiment, by the use of one pressure sensor, the vertical distance from the base point is obtained. The vertical distance are graphically displayed with respect to time. By a fairly simple operation, progressive changes of altitude and the water depth from the start of measurement can be easily perceived.

Wristwatch Operated In Eighth Mode

Figure 54:
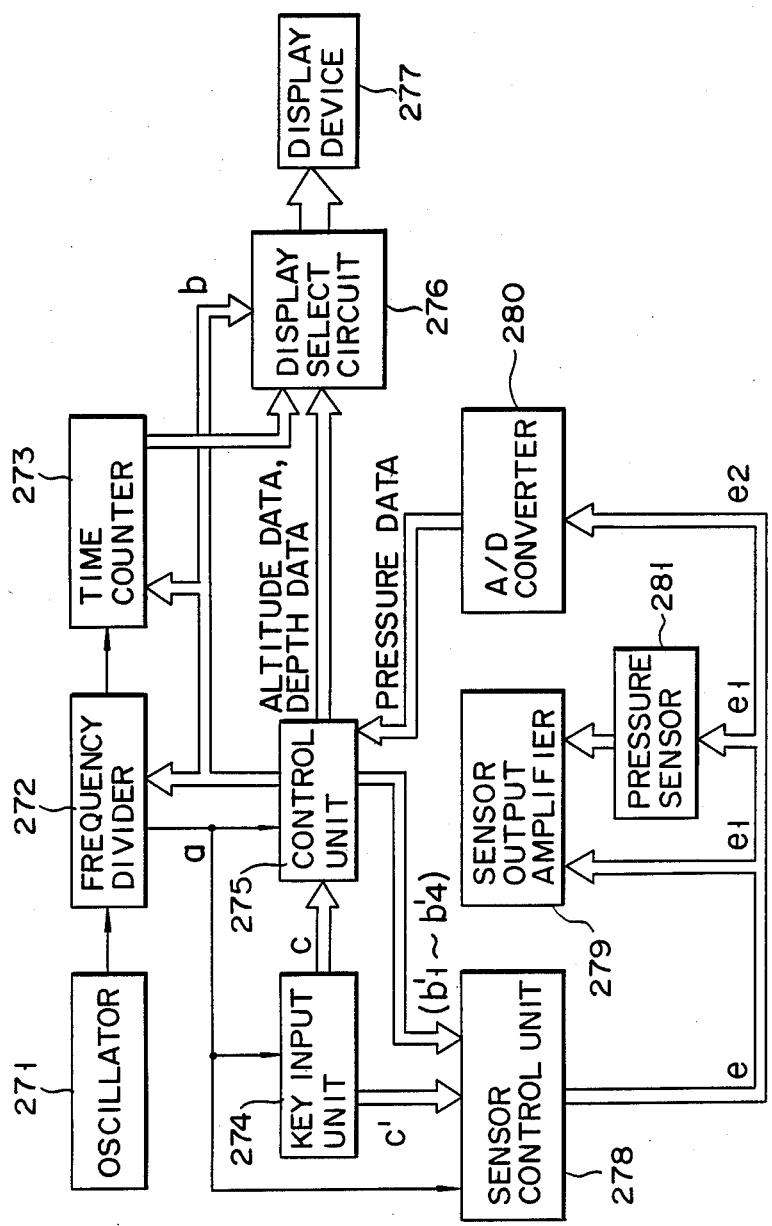
FIG. 54 is a schematic block diagram of an electronic wristwatch according to an eighth preferred embodiment of the invention.

FIGS. 54 to 56 show a wristwatch operated in eighth mode according to an eighth embodiment of the present invention. The wristwatch of this mode is designed so that the periods of pressure sensing by the pressure sensor can be changed according to the need for situations. The power consumed by this apparatus is minimized.

This idea will now be described in detail.

FIG. 54 shows a block diagram of the embodiment. A reference clock signal that is constantly output from oscillator 271 is frequency divided into a signal of a predetermined frequency. The signal is transferred to time counter 273. The signal is also transferred to key input unit 274, control unit 275, and sensor control circuit 278, as a clock signal "a". Time counter 273 counts the transferred signal to have time data. The time data is transferred to display select circuit 276. Key input unit 274 includes various kinds of keys. In response to the key operated, key input signals "c" and "c'" are respectively transferred to control unit 275 and sensor control circuit 278. Control unit 275 executes various kinds of processes in response to the key input signal "c", and according to the prestored micro program. Control unit 275 transfers a control signal "b" to frequency divider 272, time counter 273, and display select circuit 276, and transfers signals "b1" to "b4" to sensor control circuit 278. The configuration of sensor control circuit 278 will be described later. Sensor control circuit 278 is supplied with the clock signal "a", key input signal "c'" and the control signals "b1'" to "b4'". Sensor control circuit 278 transfers an operation command signal "e1" to sensor output amplifier 279 and pressure sensor 281, and an operation command signal "e2" to A/D converter 280, respectively. Only when the operation command signal "e1" is transferred, pressure sensor 28 detects the atmospheric pressure or the water pressure at the point where the apparatus is located. The detected output is transferred to sensor output amplifier 279. Sensor output amplifier 279, like pressure sensor 281, operates when it is supplied with the operation command signal "e1". Sensor output amplifier 279 amplifies the detected output from pressure sensor 281, and transfers the amplified signal to A/D converter 280. A/D converter 280 operates when it is supplied with the operation command signal "e2". A/D converter converts the amplified detected pressure output into data of digital quantity. The pressure data is transferred to control unit 275. At this time, control unit 275 detects whether the pressure is below or above 1.033 kg/cm$^2$. If it is above 1.033 kg/cm$^2$, the data is converted into water depth data. If below 1.033 kg/cm$^2$m, the data is converted into the altitude data. Control unit 275 stores the converted data. Control unit 275 transfers the data to display select circuit 276. Control unit 275 outputs an H level control signal b2', if the pressure data is above 1.033 kg/cm$^2$. If below 1.033 kg/cm$^2$, an L level control signal "b2'" is output. Display select circuit 276 selectively transfers the time data, or altitude data or the water depth data, in response to the control signal "b" from control unit 275, to switch the display by display unit 277. In this way, display unit 277 displays the time data and the altitude data at the current point.

FIG. 55 shows in detail a circuit configuration of sensor control circuit 278.

Sensor control circuit 278 comprises AND gate 294, AND gate 295, carry select circuit 278a, and operation command signal generating circuit 278b. AND circuit 294 receives a second carry (the control signal "b5'") from control unit 275. AND circuit 295 receives a minute carry (the control signal "b3'"). Carry select circuit 278a transfers a signal to these AND gate. Operation command signal generating circuit 278b receives the second carry from AND gate 294, and the minute carry from AND gate 295. On the basis of the supplied carries, operation command signal generating circuit 278b transfers the operation command signals "e1" and "e2". In carry select circuit 278a, the control signal "b1'" becomes high in level, when, in the altitude measurement, the change of the measured data is great (for example, when the measurement is performed when an ascent of a mountain in an automobile is made). The key input signal "c'" becomes high in level only for a fixed time when the key operation for the pressure measurement is performed. The control signal "b1'" and the key input signal "c'" are supplied to NOR gate 290. The logical state of the output of OR gate 290 is inverted by inverter 291. The inverted signal is transferred to delay flip-flops DF1 and DF2, as a reset signal. The logical state of the minute carry signal is inverted by inverter 303. The inverted signal is supplied to delay flips-flops DF1 and DF2, as an input clock signal. Delay flip-flop DF1 receives a fixed voltage $V_{DD}$. The output of flip-flop DF1 is supplied to flip-flop DF2. The logical state of the output signal of delay flip-flop DF2 is inverted by inverter 302. The inverted signal, and the control signal "b2'" which becomes high in the water depth measurement, are supplied to OR gate 292. The output of OR gate 292 is directly supplied to AND gate 295, as a control signal. The output of OR gate 292 is also inverted. The inverted signal is supplied to AND gate 294.

Operation command signal generating circuit 278b will now be described. Operation command signal generating circuit 278b comprises RS flip-flop 305, delay flip-flop DF2X, OR gates 299, and AND gate 300. RS flip-flop 305 is made up of OR gates 296 and 297. For the setting signal of the RS flip-flop 305, the output of AND gate 294 or 295 is used. For the reset signal, the control signal "b4'" is used. OR gate 299 is supplied with the output signal of RS flip-flop 305. The signal produced by delaying the output signal of RS flip-flop 305 for a fixed time by delay flip-flop DF2X, is supplied to AND gate 300. The clock terminal of delay flip-flop DF2X receives the signal produced by inverting the logical state of the clock signal "a" by inverter 298. The output signals of OR gate 299 and AND gate 300 are respectively output to pressure sensor 281 and A/D converter 280, as the operation command signals "e1" and "e2".

Operation Of Wristwatch

The operation of this mode will now be described. When the apparatus is to be used as an altimeter, by operating a specific key of key input unit 274, the mode is switched to the pressure gauge mode. At this time, the key input signal "c'" output from key input unit 274 becomes high for an extremely short time. While the key input signal "c'" is high, the output of inverter 291 is high. Delay flip-flops DF1 and DF2 are reset (see (1) in FIG. 56 (a)). The output of inverter 302 becomes high. Therefore, the output of NOR gate 292 becomes low, and the AND gate 295 is disabled. AND gate 294 is enabled. Accordingly, operation command signal generating circuit 278b receives the second carry. Each time the second carry is present, the measuring operation is performed for a fixed period of time. The measurement result is converted by control unit 275, and the converted data is displayed by display unit 277.

Immediately after the short period of time when the key input signal "c'" is high, delay flip-flops DF1 and DF2 are released from their reset state. Unless the minute carry is present, there is no change in the logical state of the clock input is supplied to the flip-flops. The logical state of the output of delay flip-flops DF1 and DF2 remains unchanged. Accordingly, the logical state of the either input of OR gate 292 is also left as it is, and the control of AND gates 294 and 295 remains unchanged (see (2) in FIG. 56 (a)). There is no change of the operation command signals "e1" and "e2", and the measuring operation made every 1 second is continued.

If the minute carry is present, the clock input to delay flip-flop DF1 and DF2 is changed. The instant that the minute carry is supplied, output of delay flip-flop DF1 becomes high. Because of the time delay, the output of delay flip-flop DF2 remains low level (See (4) in FIG. 56 (a)). Neither input of NOR gate 292 is changed. The controlled state of AND gate 294 and 295 is not changed. The every-1-second measuring operation is continued.

If another minute carry is present, the clock input to delay flip-flop DF2 is changed. The output of delay flip-flop DF1 is input to delay flip-flop DF2. The logical state of the output of delay flip-flop DF2 is changed to H level (see (5) in FIG. 56(b)). Since the apparatus is used as an altimeter, and the control signal "b'" is high, and both inputs of NOR gate 292 is at low level. AND gate 294 is disabled, and AND gate 295 is enabled. Then, the minute carry is supplied to operation command signal generating circuit 278b. In operation operation as that when the second carry is introduced in the water depth measurement mode, is started each time the minute carry is introduced. This operation is continued until the reset signal (control signal "b4'"), which is transferred from control unit 275 to NOR gate 296 after a fixed period of time, is present. In other words, after one or two minutes since switching to the pressure gauge mode, the operation command signals "e1" and "e2" are transferred from sensor control circuit 278 every one second for a fixed period of time, and responsive to this signal, the altitude measurement is performed. Finally, the measuring result is displayed by display unit 277.

At the time of the altitude measurement, control unit 275 converts the pressure data from A/D converter 280 into the altitude data, and transfers the converted data to display unit 277 via display select circuit 276, as described above. Control unit 275 also compares the altitude data at the previous measuring timing (one minute earlier), and the altitude data as currently measured. If there is a great change in the altitude data, the control signal "b1'" is transferred to NOR gate 290 of carry select circuit 278a. In this case, the operation is the same as that immediately after the altitude measurement starts. That is to say, one of the inputs of NOR gate 290 is low, and the other is high. Thus, the same operation is performed (see FIG. 56 (a)). For 1 or 2 seconds, the altitude measurement of one-second period is continued.

When the apparatus is used as a bathometer, the control signal "b2'" transferred from control unit 275 to sensor control circuit 278 is high. The output signal of NOR gate 292 is low in level. AND gate 295 is disabled. This AND gate receives the output signal as a control signal. AND gate 294 is enabled. The gate is supplied with the signal produced by inverting the logical state of the output signal of NOR gate 292, as a control signal. Therefore, operation command signal generating circuit 278b is supplied with the second carry from control unit 275 via AND gate 294. As a result, as shown in FIG. 56 (b), the output of RS flip-flop 305 becomes high at the leading edge of the second carry signal. The output of delay flip-flop DF2X becomes high in synchronism with the clock signal immediately after that output goes high. The output of RS flip-flop 305 goes low again in response to the reset signal, i.e., the control signal "b4'" from control unit 275. Delay flip-flop DF2X also goes low in response to the clock signal coming immediately after that. Consequently, the operation command signal "e2", which is the output of AND gate 300, is output only when both the flip-flops are high. The operation command signal "e1", which is the output of OR gate 299, is output only from the time when the second carry is present, till the reset signal is present. Sensor output amplifier 279, A/D converter, and pressure sensor 281, which operate only when they receives these operation command signals, operate every time the second carry signal comes, for a fixed period of time after the carry signal comes.

As described above, the wristwatch of the embodiment executes the measurement for a fixed time of period at one-second period, when it functions as the bathometer. When it functions as the altimeter, it executes the measurement for a fixed period at one-second period immediately after the measurement starts, and subsequently for a one-minute period. When the altitude greatly changes, it conducts the measurement for a fixed period at one-second period.

Advantages Of Eighth Embodiment

As described above, the operation period of the electronic apparatus equipped with the pressure sensor can be changed according to the need for conditions. Therefore, the measurement is effectively performed. The power dissipation of the apparatus can be minimized.

Wristwatch Operated In Ninth Mode

Figure 57:
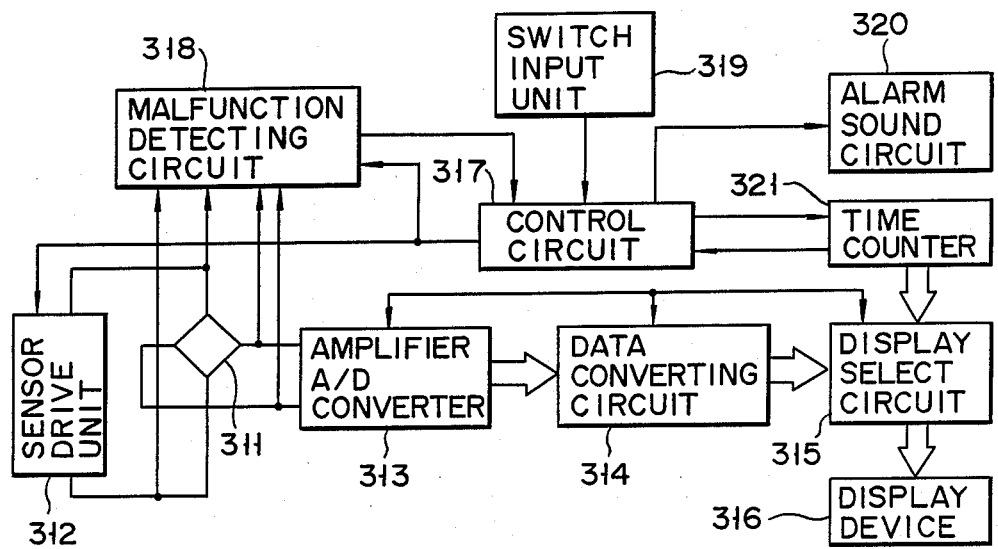
FIG. 57 is a schematic block diagram of an electronic wristwatch according to a ninth preferred embodiment of the invention.
Figure 58:
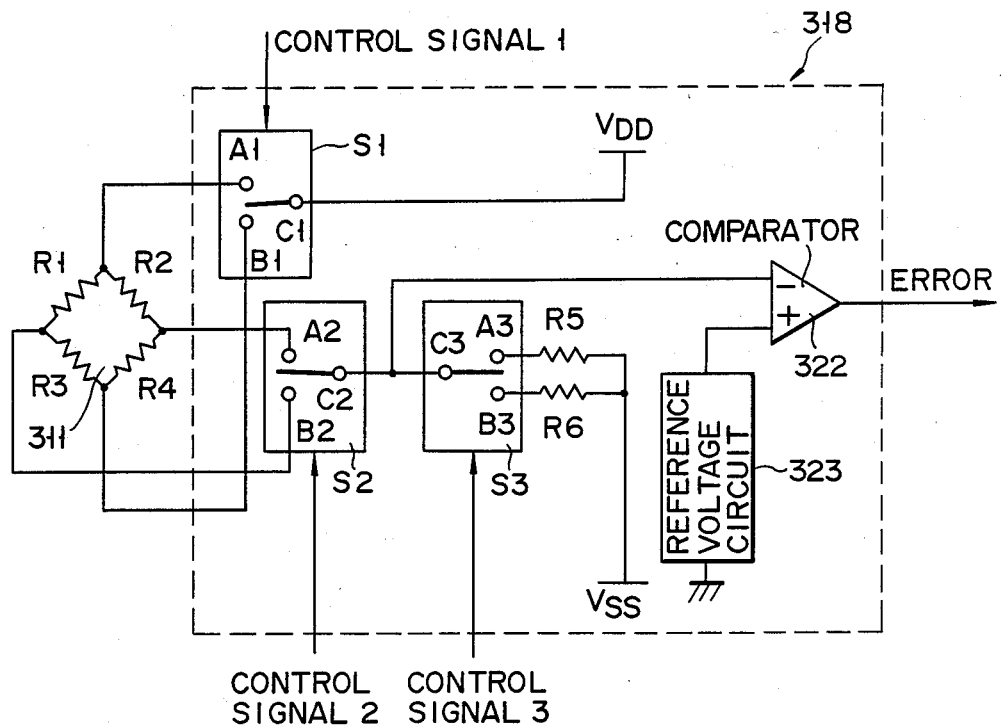
FIG. 58 is a circuit diagram of the sensor driving unit in FIG. 57.

FIGS. 57 to 58 show circuit arrangements according to a ninth embodiment of the present invention. In the embodiment, resistance of a plurality of gauge resistors of the pressure sensor is measured. It is checked if the measured resistance is normal or not. On the basis of the result of check, troubles of the wristwatch, which may be caused by disconnection of wire, for example, is detected. The wristwatch notifies the user of this trouble by appropriate acoustic and visual presentation such as display and sound.

Circuit Arrangement

FIG. 57 shows an overall block circuit diagram of the bathometer. In the figure, sensor 311 is a semiconductor pressure sensor, and contains a Wheatstone bridge circuit including gauge resistors R1 to R4, as shown in detail in FIG. 58. Pressure sensor 311 is drive by sensor drive unit 312. The output voltage at terminals C and D of pressure sensor 311 is transferred to amplifier, and A/D converter 313, where it is amplified and converted into a digital signal. The digital signal is supplied to data converter 314, where the signal is converted into display data representing the detected pressure (the water depth or the altitude). Then, the display data is transferred to display unit 316. There, the detected pressure (the water depth or the altitude) is displayed.

Sensor drive unit 312, amplifier A/D converter 313, data converter 314, and display select circuit 315 are controlled by control signals from control circuit 317. Control circuit 317 comprises a control program and logical operation circuit for controlling the overall operation of the bathometer.

Each voltage at terminals A, B, C, and D of pressure sensor 311 is supplied to trouble detecting circuit 318. Trouble detecting circuit 318 determines whether the voltages at terminals of gauge resistors R1, R2, R3, and R4, (i.e., the resistance) are normal or not. That is to say, it is checked whether resistors R1 to R4 are broken down or disconnected. For the checkup, trouble detecting circuit 318 performs the detection under the control of control circuit 317, in response to the operation signals of three switches S1, S2 and S3, which are transferred from switch input unit 319 via control circuit 317. If any of the resistors is abnormal, trouble detecting circuit 318 outputs an error signal (ERROR). Based on the error signal, control circuit 317 decides that trouble occurred. Control circuit 317 allows alarm sound circuit 320 to sound an alarm, which represents the decision result.

The bathometer also includes time counter 321 which operates under the control of control circuit 317. Time counter outputs time data. The time data is transferred to display unit 316, via display select circuit 315, to display the present time.

The circuit of trouble detecting circuit 318 will now be described in detail, with reference to FIG. 58. In the figure, terminals A and B of pressure sensor 311 are respectively connected to terminals A1 and B1 of switch S2. Terminals C and D of pressure sensor 311 are respectively connected to terminals B2 and A2 of switches S2. Terminal C and D of pressure sensor 311 are respectively connected to terminals B2 and A2 of switchs S2. Terminal C1 of switch S1 is supplied with voltage $V_{DD}$. Terminal C2 of switch S2 is connected to terminal C3 of switch S3. Terminal A3 of switch S3 is supplied with voltage $V_{SS}$, via resistor R5. Terminal B3 is supplied with voltage $V_{SS}$, via resistor R6.

Further, terminals C2 and C3 are both connected to the −(minus) terminal of comparator 322 as an operational amplifier. The +terminal of comparator 322 is supplied with reference voltage $\frac{1}{2} V_{DD}$ from reference voltage circuit 323. The signal of comparison result of comparator 322 is used as an error signal. The switches S1, S2 and S3 are controlled by control signal 1, control signal 2, and control signal 3, which are supplied form control circuit 317. In the normal mode, when the trouble detection of pressure sensor 311 is not performed, terminals C1 and C2 of switches S1 and S2 are respectively in contact with neither terminal A1 nor B2, and neither terminal A2 nor B2.

The resistances of resistors R1 to R4 have equal resistance R0. The resistance of resistor R5 is set to a value which is smaller than 3×R0 and larger than R0. The value of resistor R6 is smaller than $\mu \times R0$ and larger than $\frac{3}{4} \times R0$.

Operation Of Wristwatch

The operation of the wristwatch when the disconnection of gauge resistors is detected, will first be described.

A switch of switch input unit 319 is operated. Then, control signal 3 is transferred from control circuit 317 to trouble detecting circuit 318, to connect terminals C3 and A3 of switch S3. The switch of switch input unit 319 is operated. Then, control signals 1 and 2 are transferred to switches S1 and S2, so that both ends of each gauge resistor are successively connected to terminal C1 of switch S1 and terminal C2 of switch S2. For example, terminal A and terminal C as both ends of gauge resistor R1, are connected to terminal C1 and terminal C2. The following three cases may be considered for the disconnection of gauge resistors of pressure sensor 311. the resistance RT of pressure sensor 311 as seen from terminals C1 and C2 are as follows:

(1) At least the gauge resistor R1 in question is disconnected. In this case, resistance RT is equal to 3R0 or infinitive.

(2) Gauge resistor R1 is normal. Other resistors are disconnected. In this case, resistance RT is equal to R0, irrespective of the number of gauge resistors disconnected.

(3) None of the gauge resistors R1 to R4 are disconnected. In this case, resistance RT is equal to $(\frac{3}{4}) \times R0$. As described earlier, 3×R0 > R5 > R0. In the case of (1), resistance RT is larger than that of resistor R5. In the cases of (2) and (3), the resistance of resistor R5 is larger than resistance RT. Consequently, in the case (1), the voltage drop across resistor R5 is smaller than $V_{DD}/2$, and Vref of the reference voltage (as described earlier, set to $V_{DD}/2$). The output signal of comparator 322 is high. In the cases (2) and (3), the voltages drop across resistor R5 is larger than $V_{DD}/2$, and the output signal of comparator 322 is low. As described above, when the two terminals of gauge resistor R1 are respectively connected to terminals C1 and C2, if comparator 322 outputs a high level signal, gauge resistor R1 is disconnected.

The switches of switch input unit 319 are operated and control signals 1 and 2 are produced. Both ends of each gauge resistor are connected to terminals C1 and C2. If both ends of the disconnected resistor are connected to these terminals C1 and C2, comparator 322 produces an high signal. This is sent to control circuit 317. Upon receipt of this, control circuit 317 drives alarm sound circuit 320 to generate an alarm sound. Hearing this sound, the user knows the disconnection of gauge resistor in pressure sensor 311, and the disconnected gauge resistor.

The opeation of the wristwatch when the gauge resistor is broken down (shortcircuited), will be described.

The switch of switch input unit 319 is operated. Control signal 3 is transferred from control circuit 317 to trouble detecting circuit 318, to connect terminals C3 and B3 of switch S3. Further, the switch of switch input unit 319 is operated again. Control signals 1 and 2 are transferred to switch 1 and switch 2, to connect the two terminals of a gauge resistor to terminals C1 and C2. (Any of gauge resistors R1 to R4 may be connected in this case.) For example, it is now assumed that the two terminals of gauge resistor R1 are connected to terminals C1 and C2, respectively. The following five cases may be considered for breakdown of gauge resistor of pressure sensor 311. The resistance RT of pressure sensor as seen from terminals C1 and C2 are as follows.

(1) At least the gauge resistor resistor R1 in question is shorted. In this case, resistance RT is 0.

(2) Gauge resistor R1 is normal. All other gauge resistors are shorted. In this case, resistance RT is 0.

(3) Gauge resistor R1 is normal. Other two gauge resistor are shorted. In this case, resistance RT is equal to R0/2 (=0.5×R0).

(4) Gauge resistor R1 is normal. One of the gauge resistors is shorted. In this case, resistance is equal to $\frac{2}{3} \times R (=0.87 \times R0)$.

(5) All the gauge resistors are normal. There is no shorting. In this case, resistance RT is equal to $\frac{3}{4} \times R0$ (=0.75×R0).

As described earlier, $\frac{2}{3} \times R0 < R6 < \frac{3}{4} \times R0$. In case (4), the resistance of resistor R6 is larger than resistance RT. Conversely, in case (5), the resistance of resistor 6 is smaller than resistance RT. Consequently, the voltage drop across resistor R6 is larger than $V_{DD}/2$ in case (4). In case (5), it is smaller than $V_{DD}/2$. Comparator 322 which compares the voltage drop and the reference voltage $V_{DD}/2$, outputs a high level signal if none of the resistors are shorted (case (5)). In the other cases (1) to (4), the output of comparator 322 is low in level. The output of comparator 322 is supplied to control circuit 317. Control circuit 371 understands that one or some gauge resistors are broken. To let the user know the breakdown, control circuit 371 drives alarm sound circuit 320 to cause it to issue an alarm. In this way, the user can recognize the breakdown of gauge resistors of pressure sensor 311.

Advantages Of Ninth Embodiment

In the ninth embodiment, the pressure sensor includes a plurality of combined gauge resistors. The resistance of the gauge resistors of the pressure sensor is measured. Further it is checked whether the measured resistance value is normal or not. Based on the check result, the breakdown or the disconnection of gauge resistors are notified acoustically. Therefore, if this embodiment is used, the user can check the trouble of gauge resistors prior to the pressure measurement.

Wristwatch Operated In Tenth Mode

FIG. 59 shows a circuit arrangement according to a tenth embodiment of the present invention. The characteristic change of each gauge resistor of the Wheatstone bridge circuit in the semiconductor pressure is inevitable, due to temperature change. This embodiment is designed to correct such characteristic change. To this end, a temperature sensor is additionally used. The temperature sensor is constructed with a Wheatstone bride circuit containing two P+diffusion resistors and two P−diffusion resistors. Temperature sensed by the sensor is used for correcting the pressure data as measured by the pressure sensor.

Circuit Arrangement

In FIG. 59, reference numeral 331 designates a Wheatstone bridge made up of four gauge resistors, which constitutes a pressure sensor. Battery 332 is connected to two terminal A and B of Wheatstone bridge circuit 331. Switch S1 includes two switches. Terminals B and D are connected to the input terminals of switch S1. The output terminals of two switches of switch S1 are connected to the input terminals of amplifier 323.

In the figure, reference numeral 334 designates another Wheatstone bridge circuit. In Wheatstone bridge circuit 334, P+and P−diffused resistors having different temperature characteristics are so arranged that the resistors having equal resistance are laid out on the opposite sides of the bridge connection. Circuit 334 forms a temperature detecting circuit. Battery 335 is connected to terminals "a" and "b" of temperature detecting circuit (second Wheatstone bridge circuit 334). Switch S2 includes two switches. Terminals "c" and "d" are connected to the input terminals of switch S2. Each output of switch S2, which is made up of two switches, is connected to the input terminals of amplifier 333. Control signals C1 and C2 are alternately output from control circuit 336. Control signals C1 and C2 are respectively supplied to switches S1 and S2, so that the switches are alternately closed. Therefore, the temperature detection by temperature detecting circuit 334 (second Wheatstone bridge circuit) and the pressure detection by pressure sensor 331 are alternately switched.

The output of amplifier 333 is input to A/D converter 337, where it is converted into a digital signal. The digital signal is also input to data converting circuit 338. There, the data conversion of the pressure sensed by pressure sensor 331 is performed, and converted data is subjected to the correction based on the sensed temperature. The corrected value is sent to display circuit 339 and displayed.

Reference numeral 340 designates a time counting circuit, which comprises an oscillator, frequency divider, and timer counter. The time data as obtained by time counting circuit 340 is transferred to display circuit 339 and displayed. A/D converter, data converting circuit 338, display circuit 339, timing counting circuit 340 are controlled by control circuit 336. Switch 341 comprises time data correction switch, which is used for time counting circuit 340. The switch output is supplied to control circuit 336. Wheatstone bridge circuit 334 is formed in the watch LSI chip.

Operation Of Tenth Embodiment

The operation of the embodiment will now be described. To start the pressure measurement, a predetermined switch of switch 341 is operated. By the operation, control circuit 336 alternately outputs control signals C1 and C2. Then, switch S1 and switch S2 are alternately opened. When switch S1 is closed, output voltage V1 of Wheatstone bridge circuit 331 is transferred via switch S1 to amplifier 333, where it is amplified. The amplified voltage is converted into digital signal by A/D converter. Then, the digital signal is transferred to data converting circuit 338, and stored.

Next, control signal C2 is output from control circuit 336. Switch S2 is opened. Then, output voltage V2 of second Wheatstone bridge circuit 334 is transferred via switch S2 to amplifier 333. Output voltage V2 is proportional to the temperature. This is due to the fact that the temperature characteristics of P+and P−diffused resistors are different. The output of amplifier 333 is converted into a digital signal by A/D converter 337. The digital signal is transferred to data converting circuit 338.

Data converting circuit 338 multiplies the data as obtained by pressure sensor 331 by a coefficient, which is obtained by the temperature sensor and depends the temperature. Alternatively, a predetermined value is added to the pressure data. By either of the results, the pressure data sensed by pressure sensor 321 is corrected and the measured value is obtained. The measured value is displayed by display circuit 339.

Advantages Of Tenth Embodiment

As described above, two pairs of resistor with different temperature characteristics are introduced into the Wheatstone bridge circuit for temperature detection. A pair of resistors with equal resistance are connected to opposite sides of the bridge circuit. This temperature circuit is provided in connection with the pressure sensor. The temperature sensing and processing by the Wheatstone bridge circuit is performed by the same processing circuit (pressure measuring circuit) for the pressure sensor. The measured value by the pressure sensor is corrected by the sensed temperature. This enables one to correct the correction of the temperature characteristic of the pressure sensor, by the digital technology. There is no need for connecting metal covered resistors to the pressure sensor, and therefore, there is no increase of the number of necessary parts. Further, there is required no provision of amplifier circuits having such temperature characteristics as to cancel out the temperature characteristics of the pressure sensor. Therefore, the wristwatch of this invention is free from inaccurate temperature correction due to the use of such amplifiers which have essentially variation in temperature characteristics.

For measuring atmospheric pressure accurately temperature is needed as the conversion parameter. The wristwatch can easily detect the temperature for such purposes.

Use of one circuit for temperature and pressure detection simplifies the circuit construction of the wristwatch.

What is claimed is:

1. A compact measuring apparatus, comprising:
   single pressure sensor means;
   pressure data generating means for generating pressure data corresponding to a pressure applied to said pressure sensor means;
   a manual switch for selectively designating a first mode and a second mode;
   mode signal generating means for storing data identifying the mode selectively designated by said manual switch and for delivering a first mode signal when first mode data is stored and a second mode signal when second mode data is stored;
   mode display means for receiving said first mode signal output from said mode signal generating means and indicating that said first mode has been selectively designated, and for receiving said second mode signal and indicating that said second mode has been selectively designated;
   first converting means for receiving said first mode signal which is output from said mode signal generating means and for converting said pressure data which is output from said pressure data generating means to first data corresponding to a water-depth;
   second converting means for receiving said second mode signal which is output from said mode signal generating means and for converting said pressure data which is output from said pressure data generating means to second data corresponding to atmospheric pressure; and
   data display means for selectively displaying either one of the first data derived from said first converting means or the second data derived from said converting means.

2. The measuring apparatus as claimed in claim 1, wherein said first data is water-depth data and said first converting means includes:
   target water-depth data storing means for storing water-depth data corresponding to a target point;
   means for calculating a ratio based on water-depth data corresponding to a present water-depth point and the target point water-depth data stored in said target water-depth data storing means; and
   display control means for controlling said data display means to indicate the ratio obtained by said ratio calculating means.

3. The measuring apparatus as claimed in claim 1, wherein said second data is altitude data and said second converting means includes:
   target altitude data storing means for storing altitude data corresponding to a target point;
   means for calculating a ratio based on altitude data corresponding to a present point and the altitude data for the target point stored in said target altitude data storing means; and
   display control means for controlling said data display means to indicate the ratio obtained by said ratio calculating means.

4. The measuring apparatus as claimed in claim 1, wherein said first data is water-depth data and said first converting means includes:
   target water-depth data storing means for storing water-depth data corresponding to a target point;
   means for acquiring difference data representative of a difference between water-depth data corresponding to a present point and the target water-depth data stored in said target water-depth data storing means; and
   display control means for controlling said data display means to display in digital form the difference data obtained by said acquiring means.

5. The measuring apparatus as claimed in claim 1, wherein said second data is altitude data and said second converting means includes:
   target altitude data storing means for storing altitude data corresponding to a target point;
   means for acquiring difference data representative of a difference between altitude data corresponding to a present point and the data stored in said target altitude data storing means; and
   display control means for controlling said data display means to display in digital form the difference data obtained by said acquiring means.

6. The measuring apparatus as claimed in claim 1, wherein said first data is water-depth data and said first converting means includes:
   storing means for storing preset water-depth data;
   means for checking whether or not water-depth data obtained at a present point corresponds to said preset water-depth data; and
   means for announcing that the water-depth data at the present point corresponds to said preset water-depth data.

7. The measuring apparatus as claimed in claim 1, wherein said second data is altitude data and said second converting means includes:
   means for storing preset altitude data;
   means for determining if altitude data obtained at a present point corresponds to the preset altitude data; and
   means for announcing that the altitude data at the present point corresponds to said preset altitude data.

8. The measuring apparatus as claimed in claim 1, wherein said first data is water-depth data and said first converting means includes:
   means for measuring an elapse of time from a reference point and for producing corresponding time elapse data;
   means for storing water-depth data as measured with respect to said reference point;
   means for calculating an average speed using the time elapse data from said measuring means and the water-depth data from said storing means; and
   display control means for controlling said data display means to display the average speed from said calculating means.

9. The measuring apparatus as claimed in claim 1, wherein said second data is altitude data and said second converting means includes:
   means for measuring an elapse of time from a reference point and for producing corresponding time elapse data;
   means for storing altitude data as measured with respect to said reference point;

means for calculating an average speed using the time elapse data from said measuring means and the altitude data from said storing means; and display control means for controlling said data display means to display the average speed from said calculating means.

10. The measuring apparatus as claimed in claim 1, wherein said first data is water-depth data and said first converting means includes:

means for storing water-depth data corresponding to a target point;

means for storing an estimated time for a user of the apparatus to arrive at the target point;

means for acquiring difference data representative of a difference between water-depth data obtained upon elapse of said estimated time and the stored target point water-depth data; and display control means for controlling said data display means to display the difference data obtained by said acquiring means.

11. The measuring apparatus as claimed in claim 1, wherein said second data is altitude data and said second converting means includes:

means for storing altitude data corresponding to a target point;

means for storing an estimated time for a user of the apparatus to arrive at the target point;

means for acquiring difference data representative of a difference between altitude data obtained upon elapse of said estimated time and the stored target point altitude data; and display control means for controlling said data display means to display the difference data obtained by said acquiring means.

12. The measuring apparatus as claimed in claim 1, wherein said data display means includes an analog display section in which a plurality of display elements are arranged, and means for displaying said first data and said second data in said analog display section.

13. The measuring apparatus as claimed in claim 1, wherein said data display means includes a graph display section in which a plurality of display elements are arranged in a matrix form, said first data is water-depth data, and said first converting means includes:

means for storing plural pieces of water-depth data with respect to time; and display control means for displaying a plurality of water-depth data from said storing means with respect to time in said graph display section.

14. The measuring apparatus as claimed in claim 1, wherein said data display means includes a graph display section in which a plurality of display elements are arranged in a matrix form, said second data is altitude data, and said second converting means includes:

means for storing plural pieces of altitude data with respect to time; and display control means for displaying a plurality of altitude data from said storing means with respect to time in said graph display section.

15. The measuring apparatus as claimed 1, wherein said first data represents water depth and said first converting means includes:

diving time measuring means for measuring diving time;

decompression data storing means for storing plural pieces of decompression data in accordance with water depth and diving time;

means for reading out predetermined decompression data from said decompression data storing means in connection with water depth data and said diving time measuring means; and display control means for controlling said data display means to display said predetermined decompression data read out from said storing means.

16. The measuring apparatus as claimed in claim 1, wherein said first data is water-depth data and said first converting means includes:

means for measuring diving time;

means for storing data representative of limits for time and depth of dives allowing a user of the apparatus to surface without decompression intervals;

means for detecting whether or not an elapsed diving time and a water depth attained by the user correspond to limit points, including means for comparing the attained water-depth and the diving time of said measuring means with the diving time and depth limits data in said storing means; and means for announcing that the diving time and water depth correspond to said limit points.

17. The measuring apparatus as claimed in claim 1, including a wristwatch case for housing components of the apparatus, and said pressure sensor means is a semiconductor sensor partially exposed to the outside through an opening in said wristwatch case.

18. The measuring apparatus as claimed in claim 1, wherein said second data is altitude data, and comprising a temperature sensor for producing temperature data representative of a sensed temperature, and means for obtaining temperature-compensated altitude data using the pressure data of said pressure data generating means and the temperature data produced by said temperature sensor.

19. The measuring apparatus as claimed in claim 1, wherein said pressure sensor means is a semiconductor pressure sensor.

20. The measuring apparatus as claimed in claim 1, comprising drive means for sequentially driving said pressure sensor means according to a predetermined periodic signal.

21. The measuring apparatus as claimed in claim 1, comprising drive means for sequentially driving said pressure sensor means including means for selectively supplying a plurality of signals at different periods.

22. The measuring apparatus as claimed in claim 1, wherein said first data corresponding to said water-depth is water-depth data, and said second data corresponding to said atmospheric pressure is altitude data.

23. A compact measuring apparatus, comprising:

single pressure sensor means;

designating means for selectively designating a first mode and a second mode;

first drive means for driving said pressure sensor means for each first period when said first mode is designated by said designating means;

second drive means for driving said pressure sensor means for each second time period when said second mode is designated by said designating means, the second time period being longer than said first time period;

converting means for converting a pressure detected by said pressure sensor means for said each first time period to first data corresponding to a water depth when said first mode is designated by said designating means, and for converting a pressure detected by said pressure sensor means for said each second time period to second data corresponding to atmospheric pressure when said second mode is designated by said designating means; and display means for selectively displaying either one of the first data or the second data derived from said converting means.

24. The measuring apparatus as claimed in claim 23, wherein the first data corresponding to said water depth is water-depth data, and said second data corresponding to said atmospheric pressure data is altitude data.

25. A compact measuring apparatus, comprising:
single pressure sensor means;
pressure data generating means for generating pressure data corresponding to a pressure applied to said pressure sensor means;
comparing means for comparing said pressure data generated from said pressure data generating means with reference data, and for producing a first mode signal when said pressure data is greater than said reference data and a second mode signal when said pressure data is smaller than said reference data;
mode display means for receiving said first mode signal output from said comparing means and indicating that said first mode has been selectively designated, and for receiving said second mode signal and indicating that said second mode has been selectively designated;
first converting means for receiving said first mode signal which is output from said comparing means and for converting said pressure data which is output from said pressure data generating means to first data corresponding to a water-depth;
second converting means for receiving said second mode signal which is output from said comparing means and for converting said pressure data which is output from said pressure data generating means to second data corresponding to atmospheric pressure; and
data display means for selectively displaying either one of the first data derived from said first converting means or the second data derived from said second converting means.

26. The measuring apparatus as claimed in claim 25, wherein said reference data corresponds to a pressure of 1.033 kg/cm$^2$.

27. The measuring apparatus as claimed in claim 25, wherein said comparing means includes means for producing said first mode signal when said pressure data represents more than 1.033 kg/cm$^2$, and for producing said second mode signal when said pressure data represents less than 1.033 kg/cm$^2$.

28. The measuring apparatus as claimed in claim 25, including a wristwatch case for housing components of the apparatus, and said pressure sensor means is a semiconductor sensor partially exposed to the outside through an opening in said wristwatch case.

29. The measuring apparatus as claimed in claim 25, wherein said first data corresponding to said water-depth is water-depth data, and said second data corresponding to said atmospheric pressure is altitude data.

30. A compact measuring apparatus, comprising:
single pressure sensor means;
pressure data generating means for generating pressure data corresponding to a pressure applied to said pressure sensor means;
comparing means for comparing said pressure data generated from said pressure data generating means with reference data, and for producing a first mode signal when said pressure data is greater than said reference data and a second mode signal when said pressure data is smaller than said reference data;
first drive means for driving said pressure sensor means for each first time period when said first mode signal is produced by said comparing means;
second drive means for driving said pressure sensor means for each second time period when said second mode signal is produced by said comparing means, the second time period being longer than said first time period;
converting means for converting pressure data generated by said pressure data generating means for said each first time period to first data corresponding to a water depth when said first mode signal is produced by said comparing means, and for converting pressure data generated by said pressure data generating means for said each second time period to second data corresponding to atmospheric pressure when said second mode signal is produced by said comparing means; and
display means for selectively displaying either one of the first data or the second data derived from said converting means.

31. The measuring apparatus as claimed in claim 30, wherein said reference data corresponds to a pressure of 1.033 kg/cm$^2$.

32. The measuring apparatus as claimed in claim 30, wherein said comparing means includes means for producing said first mode signal when said pressure data represents more than 1.033 kg/cm$^2$, and for producing said second mode signal when said pressure data represents less than 1.033 kg/cm$^2$.

33. The measuring apparatus as claimed in claim 30, including a wristwatch case for housing components of the apparatus, and said pressure sensor means is a semiconductor sensor partially exposed to the outside through an opening in said wristwatch case.

34. The measuring apparatus as claimed in claim 30, wherein said first data corresponding to said water-depth is water-depth data, and said second data corresponding to said atmospheric pressure is altitude data.

* * * * *